United States Patent
Togashi

(10) Patent No.: US 7,652,869 B2
(45) Date of Patent: Jan. 26, 2010

(54) MULTILAYER CAPACITOR

(75) Inventor: Masaaki Togashi, Tokyo (JP)

(73) Assignee: TDK Corporation, Tokyo (JP)

( * ) Notice: Subject to any disclaimer, the term of this patent is extended or adjusted under 35 U.S.C. 154(b) by 276 days.

(21) Appl. No.: 11/498,218

(22) Filed: Aug. 3, 2006

(65) Prior Publication Data

US 2007/0041146 A1    Feb. 22, 2007

(30) Foreign Application Priority Data

Aug. 19, 2005   (JP)   ............................ P2005-238841
Aug. 19, 2005   (JP)   ............................ P2005-238856

(51) Int. Cl.
    *H01G 4/228* (2006.01)
(52) U.S. Cl. ................. 361/306.3; 361/306.1; 361/303; 361/321.1; 361/321.2; 361/313
(58) Field of Classification Search ............. 361/306.1, 361/306.3, 321.1, 321.2, 311–313, 303–305, 361/308.1
    See application file for complete search history.

(56) References Cited

U.S. PATENT DOCUMENTS

| 6,212,060 | B1 |   | 4/2001 | Liu |   |
|---|---|---|---|---|---|
| 6,243,253 | B1 | * | 6/2001 | DuPre et al. | ............. 361/306.3 |
| 6,292,351 | B1 | * | 9/2001 | Ahiko et al. | ............. 361/306.3 |
| 6,407,906 | B1 | * | 6/2002 | Ahiko et al. | ............. 361/306.1 |
| 6,452,781 | B1 |   | 9/2002 | Ahiko et al. |   |
| 6,914,767 | B2 | * | 7/2005 | Togashi et al. | ............. 361/303 |
| 6,940,710 | B1 | * | 9/2005 | Lee et al. | ................. 361/321.2 |
| 2002/0041006 | A1 |   | 4/2002 | Ahiko et al. |   |

FOREIGN PATENT DOCUMENTS

| JP | A-11-135356 | 5/1999 |
|---|---|---|
| JP | A-2000-252131 | 9/2000 |
| JP | A 2001-319828 | 11/2001 |
| JP | A-2002-118032 | 4/2002 |
| JP | A 2002-299152 | 10/2002 |
| JP | A 2003-068568 | 3/2003 |
| JP | A-2007-053305 | 3/2007 |

* cited by examiner

*Primary Examiner*—Nguyen T Ha
(74) *Attorney, Agent, or Firm*—Oliff & Berridge, PLC

(57) ABSTRACT

A multilayer capacitor comprises a multilayer body and a plurality of terminal electrodes formed on a side face of the multilayer body. The multilayer body includes an inner layer portion in which a plurality of dielectric layers and a plurality of inner electrodes are alternately laminated, and an outer layer portion in which a plurality of dielectric layers are laminated. In the outer layer portion, a conduction path electrically connecting a plurality of different positions in at least one of the plurality of terminal electrodes to each other is arranged. A current flowing through the terminal electrode electrically connected to the conduction path is shunted into the conduction path. This lowers the equivalent series inductance of the multilayer capacitor.

9 Claims, 26 Drawing Sheets

Fig.13
(a) 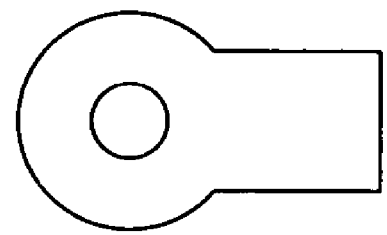
(b) 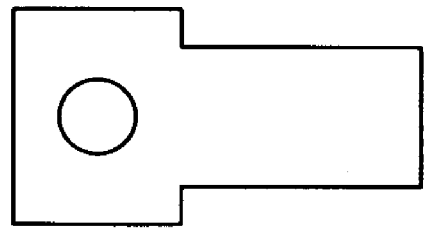
(c) 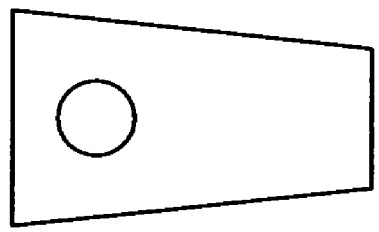

Fig.14
(a) 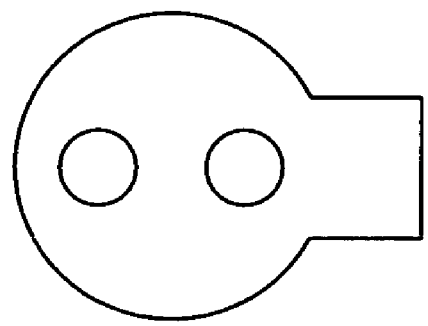
(b) 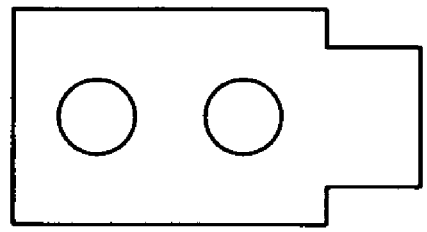
(c) 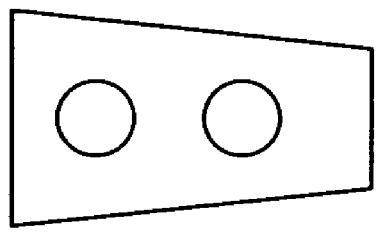

MULTILAYER CAPACITOR

BACKGROUND OF THE INVENTION

1. Field of the Invention

The present invention relates to a multilayer capacitor.

2. Related Background Art

Recently, as power circuits used in electronic devices have been attaining higher frequencies, multilayer capacitors employed in the power circuits have further been demanded to conform to high-frequency circuits. For realizing low impedance in high-frequency circuits as well, it has been required for multilayer capacitors to lower their equivalent series inductance (ESL). For responding to such a request, Japanese Patent Application Laid-Open No. 2002-299152 discloses a multilayer capacitor which arranges a plurality of terminal electrodes such that those adjacent to each other have polarities opposite to each other, so that magnetic fields generated thereby cancel each other out, thereby lowering the equivalent series inductance.

SUMMARY OF THE INVENTION

However, the multilayer capacitor described in Japanese Patent Application Laid-Open No. 2002-299152 cannot further lower the equivalent series inductance, which makes it necessary to further lower the equivalent series inductance in order to respond to circuits with a higher frequency.

For solving the problem mentioned above, it is an object of the present invention to provide a multilayer capacitor which can further lower the equivalent series inductance.

For achieving the above-mentioned object, in one aspect, the present invention provides a multilayer capacitor comprising a multilayer body including an inner layer portion having a plurality of dielectric layers and a plurality of inner electrodes alternately laminated therein, and an outer layer portion having a plurality of dielectric layers laminated therein; and a plurality of terminal electrodes formed on a side face parallel to a laminating direction of the multilayer body; wherein a conduction path electrically connecting a plurality of different positions in at least one of the plurality of terminal electrodes to each other is formed within the outer layer portion.

In another aspect, the present invention provides a multilayer capacitor comprising a multilayer body including an inner layer portion having a plurality of dielectric layers and a plurality of inner electrodes alternately laminated therein, and an outer layer portion having a plurality of dielectric layers laminated therein; and a plurality of terminal electrodes formed on a side face of the multilayer body; wherein the plurality of inner electrodes include a plurality of first inner electrodes and a plurality of second inner electrodes alternately arranged with each other; wherein the plurality of terminal electrodes include a plurality of first terminal electrodes and a plurality of second terminal electrodes; wherein the plurality of first and second terminal electrodes are electrically insulated from each other; wherein each of the first inner electrodes is electrically connected to each of the plurality of first terminal electrodes through a lead conductor; wherein each of the second inner electrodes is electrically connected to each of the plurality of second terminal electrodes through a lead conductor; and wherein a conduction path electrically connecting a plurality of different positions in at least one of the plurality of terminal electrodes to each other is formed within the outer layer portion.

In still another aspect, the present invention provides a multilayer capacitor comprising a multilayer body including an inner layer portion having a plurality of dielectric layers and a plurality of inner electrodes alternately laminated therein, and an outer layer portion having a plurality of dielectric layers laminated therein; and a plurality of terminal electrodes formed on a side face of the multilayer body; wherein the plurality of inner electrodes include a plurality of first inner electrodes and a plurality of second inner electrodes alternately arranged with each other; wherein the plurality of terminal electrodes include a plurality of first terminal electrodes and a plurality of second terminal electrodes; wherein the plurality of first and second terminal electrodes are electrically insulated from each other; wherein each of the first inner electrodes is electrically connected to one of the plurality of first terminal electrodes through a lead conductor, while each of the plurality of first terminal electrodes is electrically connected to at least one of the plurality of first inner electrodes through the lead conductor; wherein each of the second inner electrodes is electrically connected to one of the plurality of second terminal electrodes through a lead conductor, while each of the plurality of second terminal electrodes is electrically connected to at least one of the plurality of second inner electrodes through the lead conductor; and wherein a conduction path electrically connecting a plurality of different positions in at least one of the plurality of terminal electrodes to each other is formed within the outer layer portion.

In still another aspect, the present invention provides a multilayer capacitor comprising a multilayer body including an inner layer portion having a plurality of dielectric layers and a plurality of inner electrodes alternately laminated therein, and an outer layer portion having a plurality of dielectric layers laminated therein; and a plurality of terminal electrodes formed on a side face of the multilayer body; wherein a conduction path electrically connecting a plurality of different positions in at least one of the plurality of terminal electrodes to each other is formed within the outer layer portion.

In these multilayer capacitors in accordance with the present invention, the conduction path is formed within the outer layer portion. This conduction path electrically connects a plurality of different positions to each other in at least one terminal electrode in a plurality of terminal electrodes. Therefore, a current flowing through a terminal electrode electrically connected to the conduction path is shunted through the conduction path. As a result, the equivalent series inductance of the multilayer capacitor is lowered.

Preferably, the conduction path is formed within the outer layer portion by a plurality of lead conductors laminated by way of at least one dielectric layer, and a through hole conductor electrically connecting the plurality of lead conductors; wherein each of the plurality of lead conductors extends so as to be led to the side face of the multilayer body formed with the terminal electrode electrically connected to the conduction path, and is electrically connected to each of the plurality of different positions in the terminal electrode.

Preferably, at least three lead conductors are provided and are laminated by way of at least one dielectric layer within the outer layer portion; and wherein the at least three lead conductors are electrically connected together by the through hole conductor. In this case, a plurality of conduction paths are substantially formed, which makes it possible to further lower the equivalent series inductance.

Preferably, the terminal electrode is formed on the side face of the multilayer body parallel to the laminating direction so as to cover both of at least a portion of the side face parallel to the laminating direction and at least a portion of a side face of the multilayer body intersecting the laminating direction; wherein the conduction path is formed by at least one lead conductor laminated between the dielectric layers within the outer layer portion and a through hole conductor electrically connected to the lead conductor; wherein the lead conductor extends so as to be led to the side face of the multilayer body formed with the terminal electrode electrically connected to the conduction path and is electrically connected to at least one of the plurality of different positions in the terminal electrode; wherein the through hole conductor is electrically connected to at least one of the plurality of different positions in the terminal electrode electrically connected to the conduction path; wherein the position of the terminal electrode electrically connected to the lead conductor is located at a portion of the terminal electrode covering at least a portion of the side face of the multilayer body parallel to the laminating direction; and wherein the position of the terminal electrode electrically connected to the through hole conductor is located at a portion of the terminal electrode covering at least a portion of the side face of the multilayer body intersecting the laminating direction. This can shorten the length of the conduction path, whereby the equivalent series resistance can further be lowered.

Preferably, at least two lead conductors are provided and are laminated by way of at least one dielectric layer within the outer layer portion; and wherein the at least two lead conductors are electrically connected by a through hole conductor. In this case, a plurality of conduction paths are substantially formed, which makes it possible to further lower the equivalent series inductance.

Preferably, a plurality of through hole conductors are provided. This yields a plurality of conduction paths connected in parallel, which can further lower the equivalent series inductance.

Preferably, the outer layer portion formed with the conduction path is positioned closer to a side face of the multilayer body opposing a mounting surface than is the inner layer portion. When the conduction path exists on the mounting surface side at the time of mounting the multilayer capacitor to a substrate or the like, a current flowing from or into the substrate can effectively be shunted. This can further lower the equivalent series inductance.

For achieving the above-mentioned object, in still another aspect, the present invention provides a multilayer capacitor comprising a multilayer body including an inner layer portion having a plurality of first inner electrodes and a plurality of second inner electrodes laminated with a dielectric layer interposed therebetween, and an outer layer portion positioned so as to hold the inner layer portion while having a plurality of dielectric layers laminated therein; and a plurality of first terminal electrodes and a plurality of second terminal electrodes formed on the multilayer body while being insulated from each other; wherein the plurality of first and second terminal electrodes have respective portions formed on side faces parallel to a laminating direction of the multilayer body; wherein each of the first inner electrodes has a first lead conductor electrically connected to the portion of the first terminal electrode formed on the side face of the multilayer body; wherein each of the second inner electrodes has a second lead conductor electrically connected to the portion of the second terminal electrode formed on the side face of the multilayer body; and wherein the outer layer portion is formed with a conduction path electrically connecting the first inner electrode positioned closest to the outer layer portion in the plurality of first inner electrodes to at least one of the first terminal electrodes.

In the multilayer capacitor in accordance with this aspect of the invention, the outer layer portion is formed with a conduction path which electrically connects the first inner electrode and the first terminal electrode (the portion formed on the side face parallel to the laminating direction of the multilayer body), whereby a current flowing between the first terminal electrode and first inner electrode is shunted into respective fractions flowing through the first lead conductor and the conduction path. This can lower the equivalent series inductance. Since the conduction path is electrically connected to the first inner electrode positioned closest to the outer layer portion in the first inner electrodes, the line length of the conduction path can be made relatively short. This can suppress the equivalent series inductance occurring in the conduction path. Since the conduction path is formed in the outer layer portion, the multilayer capacitor in accordance with this aspect of the invention is simple to form the conduction path and can attain a structure which is relatively easy to manufacture.

Preferably, the first terminal electrode connected to the conduction path further comprises a portion formed on a side face perpendicular to the laminating direction of the multilayer body; the conduction path includes a through hole conductor penetrating through the outer layer portion in the laminating direction; one end of the through hole conductor is electrically connected to the first inner electrode positioned closest to the outer layer portion in the first inner electrodes; and the other end of the through hole conductor is electrically connected to the portion of the first terminal electrode formed on the side face perpendicular to the laminating direction of the multilayer body.

In this case, the conduction path is electrically connected to the first terminal electrode (the portion formed on the side face parallel to the laminating direction of the multilayer body) and the first inner electrode positioned closest to the outer layer portion in the first inner electrodes, whereby the conduction path becomes shorter. This can further lower the equivalent series inductance occurring in the conduction path. Since the through hole conductor is formed in the outer layer portion, the through hole conductor is simple to form, whereby a structure which is relatively easy to manufacture can be obtained.

Preferably, the conduction path includes a third lead conductor arranged in the outer layer portion and electrically connected to the first terminal electrode; and a through hole conductor, electrically connected to the first inner electrode positioned closest to the outer layer portion in the first inner electrodes and the third lead conductor, penetrating through the outer layer portion in the laminating direction.

Since the conduction path thus includes the third lead conductor and through hole conductor, the third lead conductor also shunts the current. This can further lower the equivalent series inductance.

Preferably, the conduction path includes a plurality of third lead conductors, the plurality of third lead conductors are placed in a row in the laminating direction, and the through hole conductor is electrically connected to the plurality of third lead conductors. When the conduction path has a plurality of third lead conductors as such, a greater number of shunt paths are formed, whereby the equivalent series inductance can further be lowered.

Preferably, the conduction path includes a plurality of through hole conductors; and wherein the plurality of through hole conductors are electrically connected to the third lead conductor. When the conduction path has a plurality of through hole conductors as such, a greater number of shunt paths are formed, whereby the equivalent series inductance can further be lowered.

Preferably, the outer layer portion is further formed with a conduction path electrically connecting the second inner electrode positioned closest to the outer layer portion in the second inner electrodes and at least one of the second terminal electrodes. Such a structure shunts the current not only on the first terminal electrode side but also on the second terminal electrode side. This can further lower the equivalent series inductance.

Preferably, the first inner electrode has a plurality of first lead conductors respectively corresponding to the plurality of first terminal electrodes, and the second inner electrode has a plurality of second lead conductors respectively corresponding to the plurality of second terminal electrodes.

The present invention can provide a multilayer capacitor which can further lower the equivalent series inductance.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

FIG. 13 is a view showing modified examples of the form of a lead conductor included in an outer layer portion;

FIG. 14 is a view showing other modified examples of the form of a lead conductor included in an outer layer portion;

DESCRIPTION OF THE PREFERRED EMBODIMENTS

In the following, preferred embodiments of the present invention will be explained in detail with reference to the accompanying drawings. In the explanation, constituents identical to each other or those having functions identical to each other will be referred to with numerals identical to each other without repeating their overlapping descriptions.

First Embodiment

Figure 1:
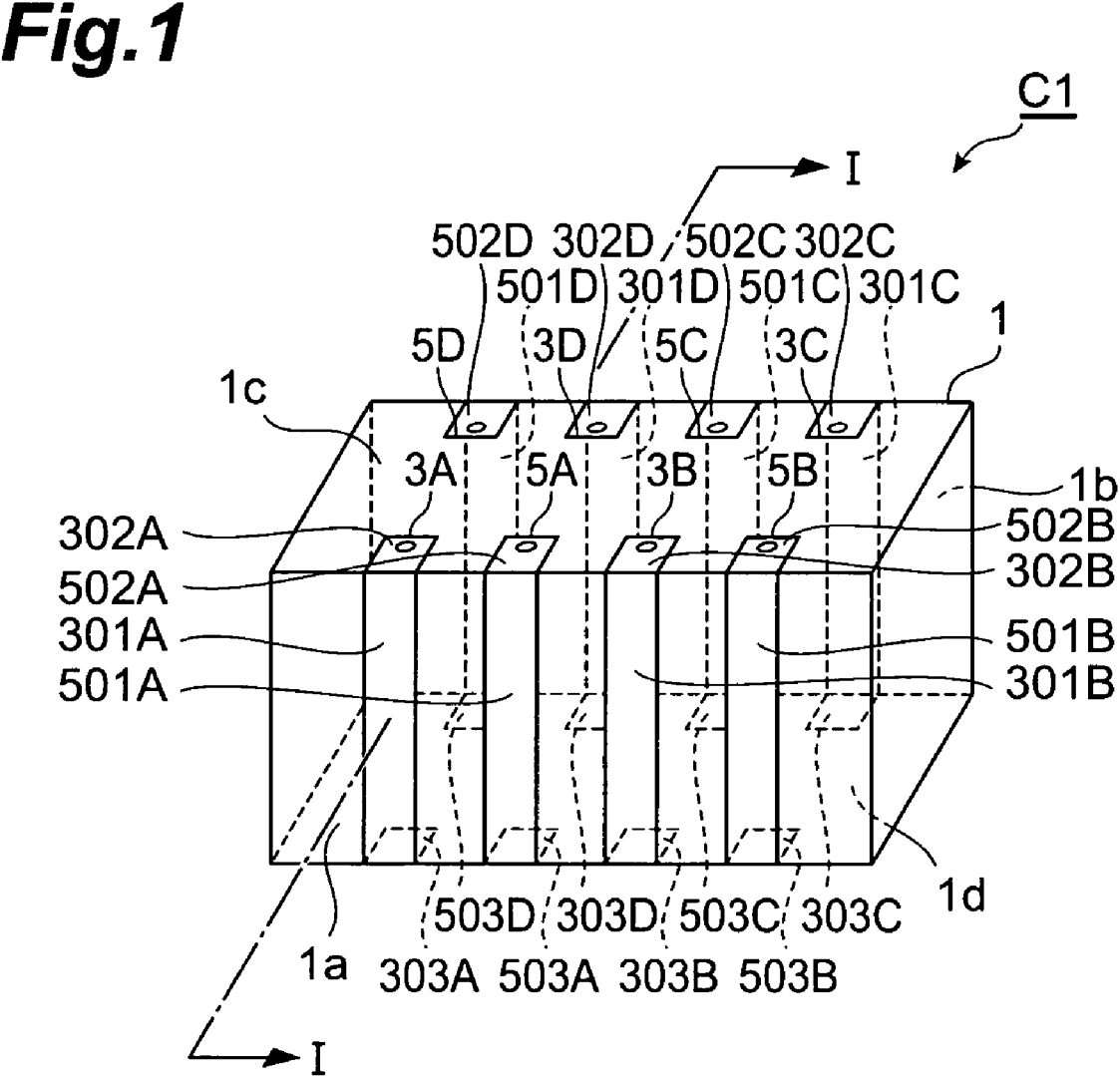
FIG. 1 is a perspective view of the multilayer capacitor in accordance with a first embodiment.
Figure 2:
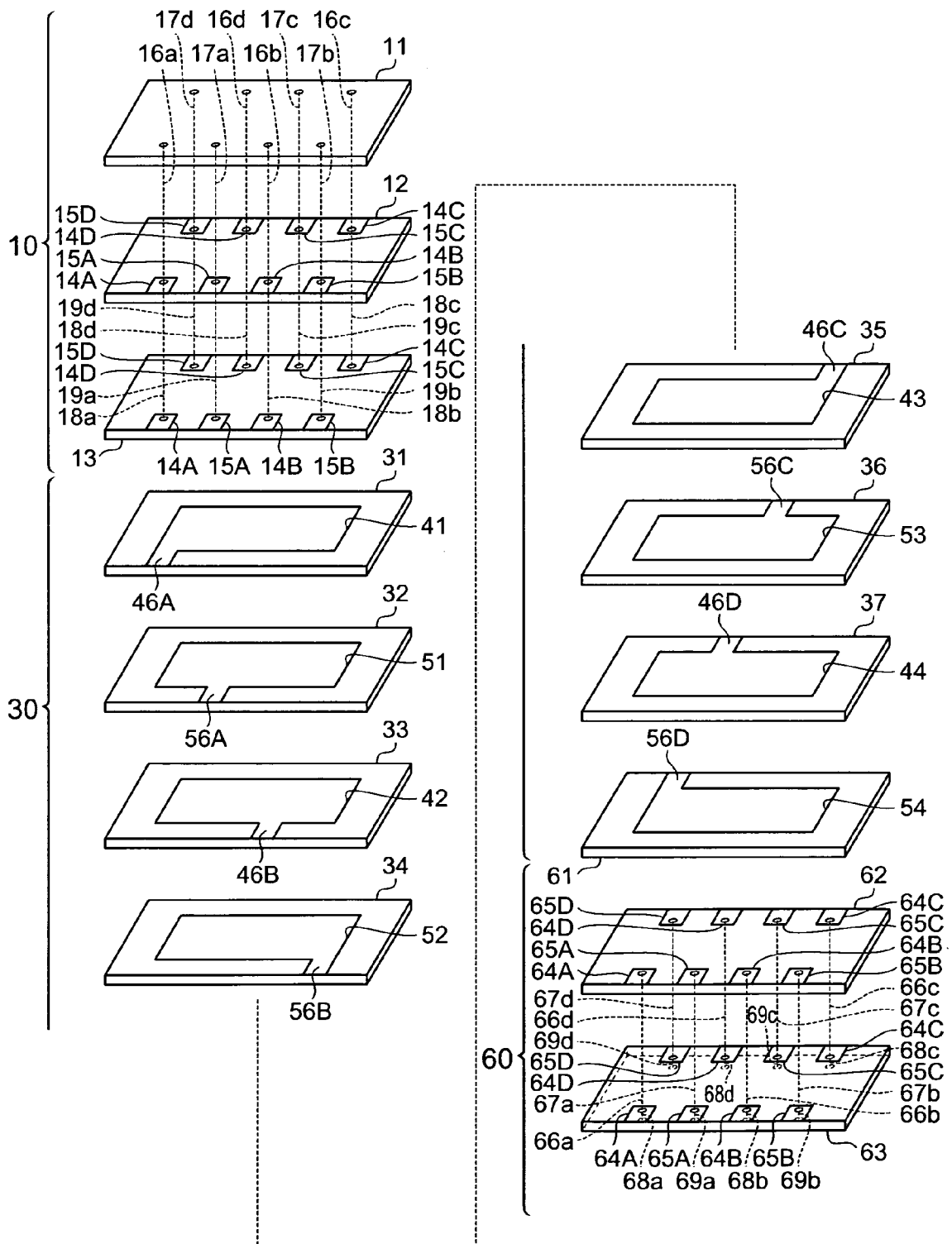
FIG. 2 is an exploded perspective view of the multilayer body included in the multilayer capacitor in accordance with the first embodiment.

With reference to FIGS. 1 and 2, the structure of the multilayer capacitor C1 in accordance with a first embodiment will be explained. FIG. 1 is a perspective view of the multilayer body included in the multilayer capacitor C1 in accordance with the first embodiment. FIG. 2 is an exploded perspective view of the multilayer body included in the multilayer capacitor in accordance with the first embodiment.

As shown in FIG. 1, the multilayer capacitor C1 comprises a multilayer body 1 including an inner layer portion 30 and outer layer portions 10, 60; a plurality of (4 in this embodiment) first terminal electrodes 3A to 3D formed on the multilayer body 1; and a plurality of (4 in this embodiment) second terminal electrodes 5A to 5D similarly formed on the multilayer body 1.

The first terminal electrodes 3A, 3B and second terminal electrodes 5A, 5B are positioned on a side face 1a of the multilayer body 1. The first terminal electrodes 3C, 3D and second terminal electrodes 5C, 5D are positioned on the side face 1b of the multilayer body 1. The first terminal electrodes 3A to 3D and second terminal electrodes 5A to 5D are electrically insulated from each other.

The terminal electrodes 3A, 3B include first terminal conductor portions 301A, 301B covering the side face 1a of the multilayer body 1 along a direction in which the inner layer portion 30 and outer layer portions 10, 60 are laminated (hereinafter simply referred to as "laminating direction") and second terminal conductor portions 302A, 303A, 302B, 303B continuous with the first terminal conductor portions 301A, 301B. The second terminal conductor portions 302A, 302B cover respective portions of a side face 1c. The side face 1c is adjacent to the side face 1a in a direction circulating along the laminating direction, while intersecting the laminating direction of the multilayer body 1. The second terminal conductor portions 303A, 303B cover respective portions of a side face 1d. The side face 1d is adjacent to the side face 1a in a direction circulating along the laminating direction, while intersecting the laminating direction of the multilayer body 1. The side faces 1a, 1b of the multilayer body 1 are faces parallel to the laminating direction.

The first terminal electrodes 3C, 3D include first terminal conductor portions 301C, 301D covering the side face 1b of the multilayer body 1 along the laminating direction and second terminal conductor portions 302C, 303C, 302D, 303D continuous with the first terminal conductor portions 301C, 301D. The second terminal conductor portions 302C, 302D cover respective portions of the side face 1c. The side face 1c is adjacent to the side face 1b in a direction circulating along the laminating direction, while intersecting the laminating direction of the multilayer body 1. The second terminal conductor portions 303C, 303D cover respective portions of the side face 1d. The side face 1d is adjacent to the side face 1b in a direction circulating along the laminating direction, while intersecting the laminating direction of the multilayer body 1.

The second terminal electrodes 5A, 5B include first terminal conductor portions 501A, 501B covering the side face 1a of the multilayer body 1 along the laminating direction and second terminal conductor portions 502A, 503A, 502B, 503B continuous with the first terminal conductor portions 501A, 501B. The second terminal conductor portions 502A, 502B cover respective portions of the side face 1c. The second terminal conductor portions 503A, 503B cover respective portions of the side face 1d.

The second terminal electrodes 5C, 5D include first terminal conductor portions 501C, 501D covering the side face 1b of the multilayer body 1 along the laminating direction and second terminal conductor portions 502C, 503C, 502D, 503D continuous with the first terminal conductor portions 501C, 501D. The second terminal conductor portions 502C, 502D cover respective portions of the side face 1c. The second terminal conductor portions 503C, 503D cover respective portions of the side face 1d.

As shown in FIG. 2, the multilayer body 1 has the inner layer portion 30 and a pair of outer layer portions 10, 60 holding the inner layer portion 30 therebetween.

The outer layer portion 10 is constructed by laminating a plurality of (3 in this embodiment) dielectric layers 11 to 13. In the actual multilayer capacitor C1, the dielectric layers 11 to 13 are integrated to such an extent that their boundaries are indiscernible.

Lead conductors 14A to 14D, 15A to 15D are laminated between the dielectric layers 11, 12 and between the dielectric layers 12, 13. Namely, the lead conductors 14A to 14D, 15A to 15D are laminated between a plurality of dielectric layers 11 to 13 by way of one dielectric layer within the outer layer portion 10.

Each lead conductor 14A extends so as to be led to the side face 1a of the multilayer body 1 formed with the terminal electrode 3A, and has one end portion electrically connected to the terminal electrode 3A. Each lead conductor 14B extends so as to be led to the side face 1a of the multilayer body 1 formed with the terminal electrode 3B, and has one end portion electrically connected to the terminal electrode 3B. Each lead conductor 14C extends so as to be led to the side face 1b of the multilayer body 1 formed with the terminal electrode 3C, and has one end portion electrically connected to the terminal electrode 3C. Each lead conductor 14D extends so as to be led to the side face 1b of the multilayer body 1 formed with the terminal electrode 3D, and has one end portion electrically connected to the terminal electrode 3D.

Each lead conductor 15A extends so as to be led to the side face 1a of the multilayer body 1 formed with the terminal electrode 5A, and has one end portion electrically connected to the terminal electrode 5A. Each lead conductor 15B extends so as to be led to the side face 1a of the multilayer body 1 formed with the terminal electrode 5B, and has one end portion electrically connected to the terminal electrode 5B. Each lead conductor 15C extends so as to be led to the side face 1b of the multilayer body 1 formed with the terminal electrode 5C, and has one end portion electrically connected to the terminal electrode 5C. Each lead conductor 15D extends so as to be led to the side face 1b of the multilayer body 1 formed with the terminal electrode 5D, and has one end portion electrically connected to the terminal electrode 5D.

Through hole conductors 16a to 16d, 17a to 17d penetrating through the dielectric layer 11 in the thickness direction are formed at respective positions corresponding to the lead conductors 14A to 14D, 15A to 15D in the dielectric layer 11.

The through hole conductor 16a has one end portion electrically connected to the second terminal conductor portion 302A of the first terminal electrode 3A, and the other end portion electrically connected to the lead conductor 14A positioned between the dielectric layers 11, 12. The through hole conductor 16b has one end portion electrically connected to the second terminal conductor portion 302B of the first terminal electrode 3B, and the other end portion electrically connected to the lead conductor 14B positioned between the dielectric layers 11, 12. The through hole conductor 16c has one end portion electrically connected to the second terminal conductor portion 302C of the first terminal electrode 3C, and the other end portion electrically connected to the lead conductor 14C positioned between the dielectric layers 11, 12. The through hole conductor 16d has one end portion electrically connected to the second terminal conductor portion 302D of the first terminal electrode 3D, and the other end portion electrically connected to the lead conductor 14D positioned between the dielectric layers 11, 12.

The through hole conductor 17a has one end portion electrically connected to the second terminal conductor portion 502A of the second terminal electrode 5A, and the other end portion electrically connected to the lead conductor 15A positioned between the dielectric layers 11, 12. The through hole conductor 17b has one end portion electrically connected to the second terminal conductor portion 502B of the second terminal electrode 5B, and the other end portion electrically connected to the lead conductor 15B positioned between the dielectric layers 11, 12. The through hole conductor 17c has one end portion electrically connected to the second terminal conductor portion 502C of the second terminal electrode 5C, and the other end portion electrically connected to the lead conductor 15C positioned between the dielectric layers 11, 12. The through hole conductor 17*d* has one end portion electrically connected to the second terminal conductor portion 502D of the second terminal electrode 5D, and the other end portion electrically connected to the lead conductor 15D positioned between the dielectric layers 11, 12.

Through hole conductors 18*a* to 18*d*, 19*a* to 19*d* penetrating through the dielectric layer 12 in the thickness direction are formed at respective positions corresponding to the lead conductors 14A to 14D, 15A to 15D in the dielectric layer 12.

The through hole conductor 18*a* has one end portion electrically connected to the lead conductor 14A positioned between the dielectric layers 11, 12, and the other end portion electrically connected to the lead conductor 14A positioned between the dielectric layers 12, 13. The through hole conductor 18*b* has one end portion electrically connected to the lead conductor 14B positioned between the dielectric layers 11, 12, and the other end portion electrically connected to the lead conductor 14B positioned between the dielectric layers 12, 13. The through hole conductor 18*c* has one end portion electrically connected to the lead conductor 14C positioned between the dielectric layers 11, 12, and the other end portion electrically connected to the lead conductor 14C positioned between the dielectric layers 12, 13. The through hole conductor 18*d* has one end portion electrically connected to the lead conductor 14D positioned between the dielectric layers 11, 12, and the other end portion electrically connected to the lead conductor 14D positioned between the dielectric layers 12, 13.

The through hole conductor 19*a* has one end portion electrically connected to the lead conductor 15A positioned between the dielectric layers 11, 12, and the other end portion electrically connected to the lead conductor 15A positioned between the dielectric layers 12, 13. The through hole conductor 19*b* has one end portion electrically connected to the lead conductor 15B positioned between the dielectric layers 11, 12, and the other end portion electrically connected to the lead conductor 15B positioned between the dielectric layers 12, 13. The through hole conductor 19*c* has one end portion electrically connected to the lead conductor 15C positioned between the dielectric layers 11, 12, and the other end portion electrically connected to the lead conductor 15C positioned between the dielectric layers 12, 13. The through hole conductor 19*d* has one end portion electrically connected to the lead conductor 15D positioned between the dielectric layers 11, 12, and the other end portion electrically connected to the lead conductor 15D positioned between the dielectric layers 12, 13.

When the dielectric layers 11 to 13 and lead conductors 14A to 14D are laminated, each of pairs of the through hole conductors 16*a*, 18*a*; 16*b*, 18*b*; 16*c*, 18*c*; and 16*d*, 18*d* are placed substantially linearly in the laminating direction, so as to be electrically connected to each other. Thus, each of sets of the through hole conductors 16*a*, 18*a* and lead conductors 14A, the through hole conductors 16*b*, 18*b* and lead conductors 14B, the through hole conductors 16*c*, 18*c* and lead conductors 14C, and the through hole conductors 16*d*, 18*d* and lead conductors 14D form a conduction path within the outer layer portion 10. Thus, the conduction path formed for each terminal electrode electrically connects a plurality of (3 in this embodiment) different positions in the terminal electrode.

The conduction path formed by the through hole conductors 16*a*, 18*a* and two lead conductors 14A is electrically connected to different positions of the first terminal conductor portion 301A in the first terminal electrode 3A at respective one end portions of the two lead conductors 14A, and the second terminal conductor portion 302A different from the first terminal conductor portion 301A of the first terminal electrode 3A at one end portion of the through hole conductor 16*a*. Thus, the conduction path formed for the first terminal electrode 3A electrically connects three different positions in the first terminal electrode 3A.

Therefore, the lead conductors 14A are electrically connected to the first terminal electrode 3A at a position in the first terminal electrode 3A, specifically at a position in the first terminal conductor portion 301A covering at least a portion of the side face 1*a* parallel to the laminating direction of the multilayer body 1. The through hole conductor 16*a* is electrically connected to the first terminal electrode 3A at a position in the first terminal electrode 3A, specifically at a position in the second terminal conductor portion 302A covering at least a portion of the side face 1*c* intersecting the laminating direction of the multilayer body 1.

The conduction path formed by the through hole conductors 16*b*, 18*b* and two lead conductors 14B is electrically connected to different positions of the first terminal conductor portion 301B in the first terminal electrode 3B at respective one end portions of the two lead conductors 14B, and the second terminal conductor portion 302B different from the first terminal conductor portion 301B of the first terminal electrode 3B at one end portion of the through hole conductor 16*b*. Thus, the conduction path formed for the first terminal electrode 3B electrically connects three different positions in the first terminal electrode 3B.

Therefore, the lead conductors 14B are electrically connected to the first terminal electrode 3B at a position in the first terminal electrode 3B, specifically at a position in the first terminal conductor portion 301B covering at least a portion of the side face 1*a* parallel to the laminating direction of the multilayer body 1. The through hole conductor 16*b* is electrically connected to the first terminal electrode 3B at a position in the first terminal electrode 3B, specifically at a position in the second terminal conductor portion 302B covering at least a portion of the side face 1*c* intersecting the laminating direction of the multilayer body 1.

The conduction path formed by the through hole conductors 16*c*, 18*c* and two lead conductors 14C is electrically connected to different positions of the first terminal conductor portion 301C in the first terminal electrode 3C at respective one end portions of the two lead conductors 14C, and the second terminal conductor portion 302C different from the first terminal conductor portion 301C of the first terminal electrode 3C at one end portion of the through hole conductor 16*c*. Thus, the conduction path formed for the first terminal electrode 3C electrically connects three different positions in the first terminal electrode 3C.

Therefore, the lead conductors 14C are electrically connected to the first terminal electrode 3C at a position in the first terminal electrode 3C, specifically at a position in the first terminal conductor portion 301C covering at least a portion of the side face 1*b* parallel to the laminating direction of the multilayer body 1. The through hole conductor 16*c* is electrically connected to the first terminal electrode 3C at a position in the first terminal electrode 3C, specifically at a position in the second terminal conductor portion 302C covering at least a portion of the side face 1*c* intersecting the laminating direction of the multilayer body 1.

The conduction path formed by the through hole conductors 16*d*, 18*d* and two lead conductors 14D is electrically connected to different positions of the first terminal conductor portion 301D in the first terminal electrode 3D at respective one end portions of the two lead conductors 14D, and the second terminal conductor portion 302D different from the first terminal conductor portion 301D of the first terminal electrode 3D at one end portion of the through hole conductor 16*d*. Thus, the conduction path formed for the first terminal electrode 3D electrically connects three different positions in the first terminal electrode 3D.

Therefore, the lead conductors 14D are electrically connected to the first terminal electrode 3D at a position in the first terminal electrode 3D, specifically at a position in the first terminal conductor portion 301D covering at least a portion of the side face 1*b* parallel to the laminating direction of the multilayer body 1. The through hole conductor 16*d* is electrically connected to the first terminal electrode 3D at a position in the first terminal electrode 3D, specifically at a position in the second terminal conductor portion 302D covering at least a portion of the side face 1*c* intersecting the laminating direction of the multilayer body 1.

Each of the conduction paths formed for the first terminal electrodes 3A to 3D in the outer layer portion 10 is unconnected to and electrically insulated from the second terminal electrodes 5A to 5D in the outer layer portion 10.

When the dielectric layers 11 to 13 and lead conductors 15A to 15D are laminated, each of pairs of the through hole conductors 17*a*, 19*a*; 17*b*, 19*b*; 17*c*, 19*c*; and 17*d*, 19*d* are placed substantially linearly in the laminating direction, so as to be electrically connected to each other. Thus, each of sets of the through hole conductors 17*a*, 19*a* and lead conductors 15A, the through hole conductors 17*b*, 19*b* and lead conductors 15B, the through hole conductors 17*c*, 19*c* and lead conductors 15C, and the through hole conductors 17*d*, 19*d* and lead conductors 15D form a conduction path within the outer layer portion 10. Thus, the conduction path formed for each terminal electrode electrically connects a plurality of (3 in this embodiment) different positions in the terminal electrode.

The conduction path formed by the through hole conductors 17*a*, 19*a* and two lead conductors 15A is electrically connected to different positions of the first terminal conductor portion 501A in the second terminal electrode 5A at respective one end portions of the two lead conductors 15A, and the second terminal conductor portion 502A different from the first terminal conductor portion 501A of the second terminal electrode 5A at one end portion of the through hole conductor 17*a*. Thus, the conduction path formed for the second terminal electrode 5A electrically connects three different positions in the second terminal electrode 5A.

Therefore, the lead conductors 15A are electrically connected to the second terminal electrode 5A at a position in the second terminal electrode 5A, specifically at a position in the second terminal conductor portion 501A covering at least a portion of the side face 1*a* parallel to the laminating direction of the multilayer body 1. The through hole conductor 17*a* is electrically connected to the second terminal electrode 5A at a position in the second terminal electrode 5A, specifically at a position in the second terminal conductor portion 502A covering at least a portion of the side face 1*c* intersecting the laminating direction of the multilayer body 1.

The conduction path formed by the through hole conductors 17*b*, 19*b* and two lead conductors 15B is electrically connected to different positions of the first terminal conductor portion 501B in the second terminal electrode 5B at respective one end portions of the two lead conductors 15B, and the second terminal conductor portion 502B different from the first terminal conductor portion 501B of the second terminal electrode 5B at one end portion of the through hole conductor 17*b*. Thus, the conduction path formed for the second terminal electrode 5B electrically connects three different positions in the second terminal electrode 5B.

Therefore, the lead conductors 15B are electrically connected to the second terminal electrode 5B at a position in the second terminal electrode 5B, specifically at a position in the second terminal conductor portion 501B covering at least a portion of the side face 1*a* parallel to the laminating direction of the multilayer body 1. The through hole conductor 17*b* is electrically connected to the second terminal electrode 5B at a position in the second terminal electrode 5B, specifically at a position in the second terminal conductor portion 502B covering at least a portion of the side face 1*c* intersecting the laminating direction of the multilayer body 1.

The conduction path formed by the through hole conductors 17*c*, 19*c* and two lead conductors 15C is electrically connected to different positions of the first terminal conductor portion 501C in the second terminal electrode 5C at respective one end portions of the two lead conductors 15C, and the second terminal conductor portion 502C different from the first terminal conductor portion 501C of the second terminal electrode 5C at one end portion of the through hole conductor 17*c*. Thus, the conduction path formed for the second terminal electrode 5C electrically connects three different positions in the second terminal electrode 5C.

Therefore, the lead conductors 15C are electrically connected to the second terminal electrode 5C at a position in the second terminal electrode 5C, specifically at a position in the second terminal conductor portion 501C covering at least a portion of the side face 1*b* parallel to the laminating direction of the multilayer body 1. The through hole conductor 17*c* is electrically connected to the second terminal electrode 5C at a position in the second terminal electrode 5C, specifically at a position in the second terminal conductor portion 502C covering at least a portion of the side face 1*c* intersecting the laminating direction of the multilayer body 1.

The conduction path formed by the through hole conductors 17*d*, 19*d* and two lead conductors 15D is electrically connected to different positions of the first terminal conductor portion 501D in the second terminal electrode 5D at respective one end portions of the two lead conductors 15D, and the second terminal conductor portion 502D different from the first terminal conductor portion 501D of the second terminal electrode 5D at one end portion of the through hole conductor 17*d*. Thus, the conduction path formed for the second terminal electrode 5D electrically connects three different positions in the second terminal electrode 5D.

Therefore, the lead conductors 15D are electrically connected to the second terminal electrode 5D at a position in the second terminal electrode 5D, specifically at a position in the second terminal conductor portion 501D covering at least a portion of the side face 1*b* parallel to the laminating direction of the multilayer body 1. The through hole conductor 17*d* is electrically connected to the second terminal electrode 5D at a position in the second terminal electrode 5D, specifically at a position in the second terminal conductor portion 502D covering at least a portion of the side face 1*d* intersecting the laminating direction of the multilayer body 1.

Each of the conduction paths formed for the second terminal electrodes 5A to 5D in the outer layer portion 10 is unconnected to and electrically insulated from the first terminal electrodes 3A to 3D in the outer layer portion 10.

A plurality of (2 in this embodiment) lead conductors 14A laminated between the dielectric layers are electrically connected to each other through the through hole conductor 18*a*. A plurality of (2 in this embodiment) lead conductors 14B laminated between the dielectric layers are electrically connected to each other through the through hole conductor 18*b*. A plurality of (2 in this embodiment) lead conductors 14C laminated between the dielectric layers are electrically connected to each other through the through hole conductor 18*c*. A plurality of (2 in this embodiment) lead conductors 14D laminated between the dielectric layers are electrically connected to each other through the through hole conductor 18*d*.

A plurality of (2 in this embodiment) lead conductors 15A laminated between the dielectric layers are electrically connected to each other through the through hole conductor 19*a*. A plurality of (2 in this embodiment) lead conductors 15B laminated between the dielectric layers are electrically connected to each other through the through hole conductor 19*b*. A plurality of (2 in this embodiment) lead conductors 15C laminated between the dielectric layers are electrically connected to each other through the through hole conductor 19*c*. A plurality of (2 in this embodiment) lead conductors 15D laminated between the dielectric layers are electrically connected to each other through the through hole conductor 19*d*.

The outer layer portion 60 is constructed by laminating a plurality of (3 in this embodiment) dielectric layers 61 to 63. In the actual multilayer capacitor C1, the dielectric layers 61 to 63 are integrated to such an extent that their boundaries are indiscernible.

Lead conductors 64A to 64D, 65A to 65D are laminated between the dielectric layers 61, 62 and between the dielectric layers 62, 63. Namely, the lead conductors 64A to 64D, 65A to 65D are laminated between a plurality of dielectric layers 61 to 63 by way of one dielectric layer within the outer layer portion 60.

Each lead conductor 64A extends so as to be led to the side face 1*a* of the multilayer body 1 formed with the terminal electrode 3A, and has one end portion electrically connected to the terminal electrode 3A. Each lead conductor 64B extends so as to be led to the side face 1*a* of the multilayer body 1 formed with the terminal electrode 3B, and has one end portion electrically connected to the terminal electrode 3B. Each lead conductor 64C extends so as to be led to the side face 1*b* of the multilayer body 1 formed with the terminal electrode 3C, and has one end portion electrically connected to the terminal electrode 3C. Each lead conductor 64D extends so as to be led to the side face 1*b* of the multilayer body 1 formed with the terminal electrode 3D, and has one end portion electrically connected to the terminal electrode 3D.

Each lead conductor 65A extends so as to be led to the side face 1*a* of the multilayer body 1 formed with the terminal electrode 5A, and has one end portion electrically connected to the terminal electrode 5A. Each lead conductor 65B extends so as to be led to the side face 1*a* of the multilayer body 1 formed with the terminal electrode 5B, and has one end portion electrically connected to the terminal electrode 5B. Each lead conductor 65C extends so as to be led to the side face 1*b* of the multilayer body 1 formed with the terminal electrode 5C, and has one end portion electrically connected to the terminal electrode 5C. Each lead conductor 65D extends so as to be led to the side face 1*b* of the multilayer body 1 formed with the terminal electrode 5D, and has one end portion electrically connected to the terminal electrode 5D.

Through hole conductors 66*a* to 66*d*, 67*a* to 67*d* penetrating through the dielectric layer 62 in the thickness direction are formed at respective positions corresponding to the lead conductors 64A to 64D, 65A to 65D in the dielectric layer 62.

The through hole conductor 66*a* has one end portion electrically connected to the lead conductor 64A positioned between the dielectric layers 61, 62, and the other end portion electrically connected to the lead conductor 64A positioned between the dielectric layers 62, 63. The through hole conductor 66*b* has one end portion electrically connected to the lead conductor 64B positioned between the dielectric layers 61, 62, and the other end portion electrically connected to the lead conductor 64B positioned between the dielectric layers 62, 63. The through hole conductor 66*c* has one end portion electrically connected to the lead conductor 64C positioned between the dielectric layers 61, 62, and the other end portion electrically connected to the lead conductor 64C positioned between the dielectric layers 62, 63. The through hole conductor 66*d* has one end portion electrically connected to the lead conductor 64D positioned between the dielectric layers 61, 62, and the other end portion electrically connected to the lead conductor 64D positioned between the dielectric layers 62, 63.

The through hole conductor 67*a* has one end portion electrically connected to the lead conductor 65A positioned between the dielectric layers 61, 62, and the other end portion electrically connected to the lead conductor 65A positioned between the dielectric layers 62, 63. The through hole conductor 67*b* has one end portion electrically connected to the lead conductor 65B positioned between the dielectric layers 61, 62, and the other end portion electrically connected to the lead conductor 65B positioned between the dielectric layers 62, 63. The through hole conductor 67*c* has one end portion electrically connected to the lead conductor 65C positioned between the dielectric layers 61, 62, and the other end portion electrically connected to the lead conductor 65C positioned between the dielectric layers 62, 63. The through hole conductor 67*d* has one end portion electrically connected to the lead conductor 65D positioned between the dielectric layers 61, 62, and the other end portion electrically connected to the lead conductor 65D positioned between the dielectric layers 62, 63.

Through hole conductors 68*a* to 68*d*, 69*a* to 69*d* penetrating through the dielectric layer 63 in the thickness direction are formed at respective positions corresponding to the lead conductors 64A to 64D, 65A to 65D in the dielectric layer 63.

The through hole conductor 68*a* has one end portion electrically connected to the second terminal conductor portion 303A of the first terminal electrode 3A, and the other end portion electrically connected to the lead conductor 64A positioned between the dielectric layers 62, 63. The through hole conductor 68*b* has one end portion electrically connected to the second terminal conductor portion 303B of the first terminal electrode 3B, and the other end portion electrically connected to the lead conductor 64B positioned between the dielectric layers 62, 63. The through hole conductor 68*c* has one end portion electrically connected to the second terminal conductor portion 303C of the first terminal electrode 3C, and the other end portion electrically connected to the lead conductor 64C positioned between the dielectric layers 62, 63. The through hole conductor 68*d* has one end portion electrically connected to the second terminal conductor portion 303D of the first terminal electrode 3D, and the other end portion electrically connected to the lead conductor 64D positioned between the dielectric layers 62, 63.

The through hole conductor 69*a* has one end portion electrically connected to the second terminal conductor portion 503A of the second terminal electrode 5A, and the other end portion electrically connected to the lead conductor 65A positioned between the dielectric layers 62, 63. The through hole conductor 69*b* has one end portion electrically connected to the second terminal conductor portion 503B of the second terminal electrode 5B, and the other end portion electrically connected to the lead conductor 65B positioned between the dielectric layers 62, 63. The through hole conductor 69*c* has one end portion electrically connected to the second terminal conductor portion 503C of the second terminal electrode 5C, and the other end portion electrically connected to the lead conductor 65C positioned between the dielectric layers 62, 63. The through hole conductor 69*d* has one end portion electrically connected to the second terminal conductor portion 503D of the second terminal electrode 5D, and the other end portion electrically connected to the lead conductor 65D positioned between the dielectric layers 62, 63.

When the dielectric layers 61 to 63 and lead conductors 64A to 64D are laminated, each of pairs of the through hole conductors 66*a*, 68*a*; 66*b*, 68*b*; 66*c*, 68*c*; and 66*d*, 68*d* are placed substantially linearly in the laminating direction, so as to be electrically connected to each other. Thus, each of sets of the through hole conductors 66*a*, 68*a* and lead conductors 64A, the through hole conductors 66*b*, 68*b* and lead conductors 64B, the through hole conductors 66*c*, 68*c* and lead conductors 64C, and the through hole conductors 66*d*, 68*d* and lead conductors 64D form a conduction path within the outer layer portion 60. Thus, the conduction path formed for each terminal electrode electrically connects a plurality of (3 in this embodiment) different positions in the terminal electrode.

The conduction path formed by the through hole conductors 66*a*, 68*a* and two lead conductors 64A is electrically connected to different positions of the first terminal conductor portion 301A in the first terminal electrode 3A at respective one end portions of the two lead conductors 64A, and the second terminal conductor portion 303A different from the first terminal conductor portion 301A of the first terminal electrode 3A at one end portion of the through hole conductor 68*a*. Thus, the conduction path formed for the first terminal electrode 3A electrically connects three different positions in the first terminal electrode 3A.

Therefore, each lead conductor 64A is electrically connected to the first terminal electrode 3A at a position in the first terminal electrode 3A, specifically at a position in the first terminal conductor portion 301A covering at least a portion of the side face 1*a* parallel to the laminating direction of the multilayer body 1. The through hole conductor 66*a* is electrically connected to the first terminal electrode 3A at a position in the first terminal electrode 3A, specifically at a position in the second terminal conductor portion 303A covering at least a portion of the side face 1*d* intersecting the laminating direction of the multilayer body 1.

The conduction path formed by the through hole conductors 66*b*, 68*b* and two lead conductors 64B is electrically connected to different positions of the first terminal conductor portion 301B in the first terminal electrode 3B at respective one end portions of the two lead conductors 64B, and the second terminal conductor portion 303B different from the first terminal conductor portion 301B of the first terminal electrode 3B at one end portion of the through hole conductor 68*b*. Thus, the conduction path formed for the first terminal electrode 3B electrically connects three different positions in the first terminal electrode 3B.

Therefore, each lead conductor 64B is electrically connected to the first terminal electrode 3B at a position in the first terminal electrode 3B, specifically at a position in the first terminal conductor portion 301B covering at least a portion of the side face 1*a* parallel to the laminating direction of the multilayer body 1. The through hole conductor 66*b* is electrically connected to the first terminal electrode 3B at a position in the first terminal electrode 3B, specifically at a position in the second terminal conductor portion 303B covering at least a portion of the side face 1*d* intersecting the laminating direction of the multilayer body 1.

The conduction path formed by the through hole conductors 66*c*, 68*c* and two lead conductors 64C is electrically connected to different positions of the first terminal conductor portion 301C in the first terminal electrode 3C at respective one end portions of the two lead conductors 64C, and the second terminal conductor portion 303C different from the first terminal conductor portion 301C of the first terminal electrode 3C at one end portion of the through hole conductor 68*c*. Thus, the conduction path formed for the first terminal electrode 3C electrically connects three different positions in the first terminal electrode 3C.

Therefore, each lead conductor 64C is electrically connected to the first terminal electrode 3C at a position in the first terminal electrode 3C, specifically at a position in the first terminal conductor portion 301C covering at least a portion of the side face 1*b* parallel to the laminating direction of the multilayer body 1. The through hole conductor 66*c* is electrically connected to the first terminal electrode 3C at a position in the first terminal electrode 3C, specifically at a position in the second terminal conductor portion 303C covering at least a portion of the side face 1*d* intersecting the laminating direction of the multilayer body 1.

The conduction path formed by the through hole conductors 66*d*, 68*d* and two lead conductors 64D is electrically connected to different positions of the first terminal conductor portion 301D in the first terminal electrode 3D at respective one end portions of the two lead conductors 64D, and the second terminal conductor portion 303D different from the first terminal conductor portion 301D of the first terminal electrode 3D at one end portion of the through hole conductor 68*d*. Thus, the conduction path formed for the first terminal electrode 3D electrically connects three different positions in the first terminal electrode 3D.

Therefore, each lead conductor 64D is electrically connected to the first terminal electrode 3D at a position in the first terminal electrode 3D, specifically at a position in the first terminal conductor portion 301D covering at least a portion of the side face 1*b* parallel to the laminating direction of the multilayer body 1. The through hole conductor 66*d* is electrically connected to the first terminal electrode 3D at a position in the first terminal electrode 3D, specifically at a position in the second terminal conductor portion 303D covering at least a portion of the side face 1*d* intersecting the laminating direction of the multilayer body 1.

Each of the conduction paths formed for the first terminal electrodes 3A to 3D in the outer layer portion 60 is unconnected to and electrically insulated from the second terminal electrodes 5A to 5D in the outer layer portion 60.

When the dielectric layers 61 to 63 and lead conductors 65A to 65D are laminated, each of pairs of the through hole conductors 67*a*, 69*a*; 67*b*, 69*b*; 67*c*, 69*c*; and 67*d*, 69*d* are placed substantially linearly in the laminating direction, so as to be electrically connected to each other. Thus, each of sets of the through hole conductors 67*a*, 69*a* and lead conductors 65A, the through hole conductors 67*b*, 69*b* and lead conductors 65B, the through hole conductors 67*c*, 69*c* and lead conductors 65C, and the through hole conductors 67*d*, 69*d* and lead conductors 65D form a conduction path within the outer layer portion 60. Thus, the conduction path formed for each terminal electrode electrically connects a plurality of (3 in this embodiment) different positions in the terminal electrode.

The conduction path formed by the through hole conductors 67*a*, 69*a* and two lead conductors 65A is electrically connected to different positions of the first terminal conductor portion 501A in the second terminal electrode 5A at respective one end portions of the two lead conductors 65A, and the second terminal conductor portion 503A different from the first terminal conductor portion 501A of the second terminal electrode 5A at one end portion of the through hole conductor 67a. Thus, the conduction path formed for the second terminal electrode 5A electrically connects three different positions in the second terminal electrode 5A.

Therefore, each lead conductor 65A is electrically connected to the second terminal electrode 5A at a position in the second terminal electrode 5A, specifically at a position in the first terminal conductor portion 501A covering at least a portion of the side face 1a parallel to the laminating direction of the multilayer body 1. The through hole conductor 67a is electrically connected to the second terminal electrode 5A at a position in the second terminal electrode 5A, specifically at a position in the second terminal conductor portion 503A covering at least a portion of the side face 1d intersecting the laminating direction of the multilayer body 1.

The conduction path formed by the through hole conductors 67b, 69b and two lead conductors 65B is electrically connected to different positions of the first terminal conductor portion 501B in the second terminal electrode 5B at respective one end portions of the two lead conductors 65B, and the second terminal conductor portion 503B different from the first terminal conductor portion 501B of the second terminal electrode 5B at one end portion of the through hole conductor 67b. Thus, the conduction path formed for the second terminal electrode 5B electrically connects three different positions in the second terminal electrode 5B.

Therefore, each lead conductor 65B is electrically connected to the second terminal electrode 5B at a position in the second terminal electrode 5B, specifically at a position in the first terminal conductor portion 501B covering at least a portion of the side face 1a parallel to the laminating direction of the multilayer body 1. The through hole conductor 67b is electrically connected to the second terminal electrode 5B at a position in the second terminal electrode 5B, specifically at a position in the second terminal conductor portion 503B covering at least a portion of the side face 1d intersecting the laminating direction of the multilayer body 1.

The conduction path formed by the through hole conductors 67c, 69c and two lead conductors 65C is electrically connected to different positions of the first terminal conductor portion 501C in the second terminal electrode 5C at respective one end portions of the two lead conductors 65C, and the second terminal conductor portion 503C different from the first terminal conductor portion 501C of the second terminal electrode 5C at one end portion of the through hole conductor 67c. Thus, the conduction path formed for the second terminal electrode 5C electrically connects three different positions in the second terminal electrode 5C.

Therefore, each lead conductor 65C is electrically connected to the second terminal electrode 5C at a position in the second terminal electrode 5C, specifically at a position in the first terminal conductor portion 501C covering at least a portion of the side face 1b parallel to the laminating direction of the multilayer body 1. The through hole conductor 67c is electrically connected to the second terminal electrode 5C at a position in the second terminal electrode 5C, specifically at a position in the second terminal conductor portion 503C covering at least a portion of the side face 1d intersecting the laminating direction of the multilayer body 1.

The conduction path formed by the through hole conductors 67c, 69c and two lead conductors 65D is electrically connected to different positions of the first terminal conductor portion 501D in the second terminal electrode 5D at respective one end portions of the two lead conductors 65D, and the second terminal conductor portion 503D different from the first terminal conductor portion 501D of the second terminal electrode 5D at one end portion of the through hole conductor 67d. Thus, the conduction path formed for the second terminal electrode 5D electrically connects three different positions in the second terminal electrode 5D.

Therefore, each lead conductor 65D is electrically connected to the second terminal electrode 5D at a position in the second terminal electrode 5D, specifically at a position in the first terminal conductor portion 501D covering at least a portion of the side face 1b parallel to the laminating direction of the multilayer body 1. The through hole conductor 67d is electrically connected to the second terminal electrode 5D at a position in the second terminal electrode 5D, specifically at a position in the second terminal conductor portion 503D covering at least a portion of the side face 1d intersecting the laminating direction of the multilayer body 1.

Each of the conduction paths formed for the second terminal electrodes 5A to 5D in the outer layer portion 60 is unconnected to and electrically insulated from the first terminal electrodes 3A to 3D in the outer layer portion 60.

A plurality of (2 in this embodiment) lead conductors 64A laminated between the dielectric layers are electrically connected to each other through the through hole conductor 66a. A plurality of (2 in this embodiment) lead conductors 64B laminated between the dielectric layers are electrically connected to each other through the through hole conductor 66b. A plurality of (2 in this embodiment) lead conductors 64C laminated between the dielectric layers are electrically connected to each other through the through hole conductor 66c. A plurality of (2 in this embodiment) lead conductors 64D laminated between the dielectric layers are electrically connected to each other through the through hole conductor 66d.

A plurality of (2 in this embodiment) lead conductors 65A laminated between the dielectric layers are electrically connected to each other through the through hole conductor 67a. A plurality of (2 in this embodiment) lead conductors 65B laminated between the dielectric layers are electrically connected to each other through the through hole conductor 67b. A plurality of (2 in this embodiment) lead conductors 65C laminated between the dielectric layers are electrically connected to each other through the through hole conductor 67c. A plurality of (2 in this embodiment) lead conductors 65D laminated between the dielectric layers are electrically connected to each other through the through hole conductor 67d.

As shown in FIG. 2, the inner layer portion 30 is constructed by alternately laminating a plurality of (7 in this embodiment) dielectric layers 31 to 37 with a plurality of (4 each in this embodiment) first and second inner electrodes 41 to 44, 51 to 54. In the actual multilayer capacitor C1, the dielectric layers 31 to 37 are integrated to such an extent that their boundaries are indiscernible.

Each of the first inner electrodes 41 to 44 has a rectangular form. The first inner electrodes 41 to 44 are formed at respective positions separated by predetermined distances from side faces parallel to the laminating direction in the multilayer body 1.

The first inner electrode 41 is electrically connected to the first terminal electrode 3A through a lead conductor 46A. The first inner electrode 42 is electrically connected to the first terminal electrode 3B through a lead conductor 46B. The first inner electrode 43 is electrically connected to the first terminal electrode 3C through a lead conductor 46C. The first inner electrode 44 is electrically connected to the first terminal electrode 3D through a lead conductor 46D. Consequently, the plurality of first terminal electrodes 3A to 3D are each electrically connected to at least one of the plurality of first inner electrodes 41 to 44 through the lead conductors 46A to 46D.

The lead conductor 46A is integrally formed with the first inner electrode 41, and extends therefrom so as to reach the side face 1a of the multilayer body 1. The lead conductor 46B is integrally formed with the first inner electrode 42, and extends therefrom so as to reach the side face 1a of the multilayer body 1. The lead conductor 46C is integrally formed with the first inner electrode 43, and extends therefrom so as to reach the side face 1b of the multilayer body 1. The lead conductor 46D is integrally formed with the first inner electrode 44, and extends therefrom so as to reach the side face 1b of the multilayer body 1.

Each of the second inner electrodes 51 to 54 has a rectangular form. The second inner electrodes 51 to 54 are formed at respective positions separated by predetermined distances from side faces parallel to the laminating direction in the multilayer body 1.

The second inner electrode 51 is electrically connected to the second terminal electrode 5A through a lead conductor 56A. The second inner electrode 52 is electrically connected to the second terminal electrode 5B through a lead conductor 56B. The second inner electrode 53 is electrically connected to the second terminal electrode 5C through a lead conductor 56C. The second inner electrode 54 is electrically connected to the second terminal electrode 5D through a lead conductor 56D. Consequently, the plurality of second terminal electrodes 5A to 5D are each electrically connected to at least one of the plurality of second inner electrodes 51 to 54 through the lead conductors 56A to 56D.

The lead conductor 56A is integrally formed with the second inner electrode 51, and extends therefrom so as to reach the side face 1a of the multilayer body 1. The lead conductor 56B is integrally formed with the second inner electrode 52, and extends therefrom so as to reach the side face 1a of the multilayer body 1. The lead conductor 56C is integrally formed with the second inner electrode 53, and extends therefrom so as to reach the side face 1b of the multilayer body 1. The lead conductor 56D is integrally formed with the second inner electrode 54, and extends therefrom so as to reach the side face 1b of the multilayer body 1.

Figure 3:
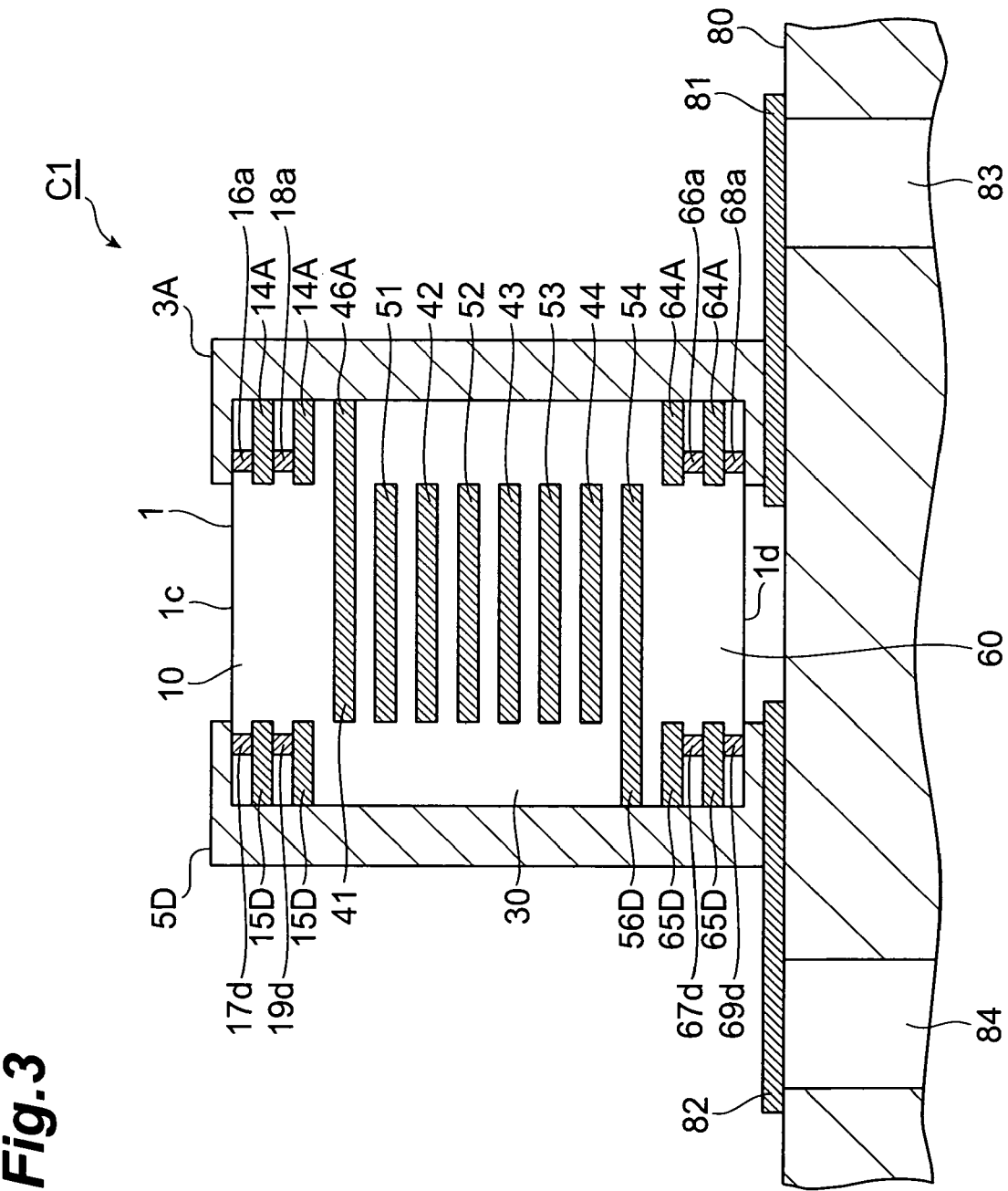
FIG. 3 is a sectional view showing the multilayer capacitor in accordance with the first embodiment mounted on a substrate.

FIG. 3 is a sectional view showing the multilayer capacitor C1 mounted on a substrate 80 taken along the line I-I of FIG. 1. In FIG. 3, the multilayer capacitor C1 is mounted such that the first terminal electrode 3A and second terminal electrode 5D of the multilayer capacitor C1 are connected to an anode land 81 and a cathode land 82 which are formed on the substrate 80, respectively. Leads 83, 84 provided in the substrate are connected to the anode land 81 and cathode land 82, respectively. In FIG. 3, areas corresponding to the dielectric layers 11 to 13, 31 to 37, 61 to 63 and leads 83, 84 are not hatched for easier viewing of the drawing.

As shown in FIG. 3, each of sets of the lead conductors 14A and through hole conductors 16a, 18a in the outer layer portion 10 and the lead conductors 64A and through hole conductors 66a, 68a in the outer layer portion 60 form a conduction path into which a shunt current that is a part of the current flowing through the first terminal electrode 3A flows, and from which the shunt current flows into the first terminal electrode 3A again without flowing into the remaining terminal electrodes 3B to 3D, 5A to 5D.

Each of sets of the lead conductors 14B and through hole conductors 16b, 18b in the outer layer portion 10 and the lead conductors 64B and through hole conductors 66b, 68b in the outer layer portion 60 form a conduction path into which a shunt current that is a part of the current flowing through the first terminal electrode 3B flows, and from which the shunt current flows into the first terminal electrode 3B again without flowing into the remaining terminal electrodes 3A, 3C, 3D, 5A to 5D.

Each of sets of the lead conductors 14C and through hole conductors 16c, 18c in the outer layer portion 10 and the lead conductors 64C and through hole conductors 66c, 68c in the outer layer portion 60 form a conduction path into which a shunt current that is a part of the current flowing through the first terminal electrode 3C flows, and from which the shunt current flows into the first terminal electrode 3C again without flowing into the remaining terminal electrodes 3A, 3B, 3D, 5A to 5D.

Each of sets of the lead conductors 14D and through hole conductors 16d, 18d in the outer layer portion 10 and the lead conductors 64D and through hole conductors 66d, 68d in the outer layer portion 60 form a conduction path into which a shunt current that is a part of the current flowing through the first terminal electrode 3D flows, and from which the shunt current flows into the first terminal electrode 3D again without flowing into the remaining terminal electrodes 3A to 3C, 5A to 5D.

Each of sets of the lead conductor 15A and through hole conductors 17a, 19a in the outer layer portion 10 and the lead conductors 65A and through hole conductors 67a, 69a in the outer layer portion 60 form a conduction path into which a shunt current that is a part of the current flowing through the second terminal electrode 5A flows, and from which the shunt current flows into the second terminal electrode 5A again without flowing into the remaining terminal electrodes 3A to 3D, 5A to 5C.

Each of sets of the lead conductors 15B and through hole conductors 17b, 19b in the outer layer portion 10 and the lead conductors 65B and through hole conductors 67b, 69b in the outer layer portion 60 form a conduction path into which a shunt current that is a part of the current flowing through the second terminal electrode 5B flows, and from which the shunt current flows into the second terminal electrode 5B again without flowing into the remaining terminal electrodes 3A to 3D, 5A, 5C, 5D.

Each of sets of the lead conductors 15C and through hole conductors 17c, 19c in the outer layer portion 10 and the lead conductors 65C and through hole conductors 67c, 69c in the outer layer portion 60 form a conduction path into which a shunt current that is a part of the current flowing through the second terminal electrode 5C flows, and from which the shunt current flows into the second terminal electrode 5C again without flowing into the remaining terminal electrodes 3A to 3D, 5A, 5B, 5D.

Each of sets of the lead conductors 15D and through hole conductors 17d, 19d in the outer layer portion 10 and the lead conductors 65D and through hole conductors 67d, 69d in the outer layer portion 60 form a conduction path into which a shunt current that is a part of the current flowing through the second terminal electrode 5D flows, and from which the shunt current flows into the second terminal electrode 5D again without flowing into the remaining terminal electrodes 3A to 3D, 5A to 5C.

In the multilayer capacitor C1, as shown in FIG. 3, the outer layer portion 60 formed with the conduction paths is positioned closer to the side face 1d opposing the mounting surface of the substrate 80 than is the inner layer portion 30.

In the multilayer capacitor C1, each of the terminal electrodes 3A to 3D, 5A to 5D is formed with a conduction path electrically connecting a plurality of positions in each terminal electrode. When the multilayer capacitor C1 is mounted on a substrate or the like, a current flowing through the terminal electrode electrically connected to each conduction path is shunted into the conduction path. Shunting the current into a plurality of conduction paths lowers the inductance value, whereby the multilayer capacitor C1 can lower the equivalent series inductance.

In the multilayer capacitor C1, conduction paths for partly shunting currents flowing through the terminal electrodes 3A to 3D, 5A to 5D are formed only within the outer layer portions 10, 60 in the multilayer body 1. Therefore, it will be sufficient if only the dielectric layers 11, 12, 62, 63 within the outer layer portions 10, 60 are formed with openings for through hole conductors. As a result, the multilayer capacitor C1 can be manufactured easily.

The conduction paths formed within the outer layer portions 10, 60 in the multilayer capacitor C1 are connected to the positions of first and second terminal conductor portions of their corresponding terminal electrodes. This can shorten the lengths of conduction paths formed within the outer layer portions as compared with the case where each of a plurality of positions of terminal electrodes electrically connected to conduction paths is a first terminal conductor portion, for example. Therefore, the multilayer capacitor C1 can further lower the equivalent series inductance.

In the multilayer capacitor C1, a plurality of (2) each of the lead conductors 14A to 14D, 15A to 15D, 64A to 64D, 65A to 65D within the outer layer portions 10, 60 are connected to the terminal electrodes 3A to 3D, 5A to 5D in the laminating direction. These lead conductors 14A to 14D, 15A to 15D, 64A to 64D, 65A to 65D are laminated within the outer layer portions 10, 60 by way of dielectric layers. When there are a plurality of lead conductors connected to each terminal electrode so as to form a conduction path as such, there are substantially a plurality of conduction paths into which the current flowing through the terminal electrode is shunted. This further lowers the equivalent series inductance of the multilayer capacitor C1.

In the multilayer capacitor C1, as shown in FIG. 3, conduction paths (the lead conductors 64A to 64D, 65A to 65D, and through hole conductors 66a to 66d, 67a to 67d, 68a to 68d, 69a to 69d) are formed within the outer layer portion 60. In the mounting state shown in FIG. 3, the outer layer portion 60 is positioned closer to the side face 1d opposing the mounting surface of the substrate 80 than is the inner layer portion 30. Thus forming conduction paths on the substrate 80 side can effectively shunt currents flowing into and out of the substrate 80, whereby the equivalent series inductance can further be lowered. When conduction paths are located on the mounting surface side of the substrate 80, current paths can become shorter, whereby the equivalent series inductance can further be lowered.

In the multilayer capacitor C1, the terminal electrodes 3A to 3D, 5A to 5D are arranged alternately. Therefore, when the first terminal electrodes 3A to 3D and second terminal electrodes 5A to 5D are connected with reversed polarities, currents flow through adjacent lead conductor 46A to 46D, 56A to 56D are directed opposite to each other, whereby magnetic fields generated by the lead conductors 46A to 46D, 56A to 56D cancel each other out. As a result, the multilayer capacitor C1 can further lower the equivalent series inductance.

Figure 4:
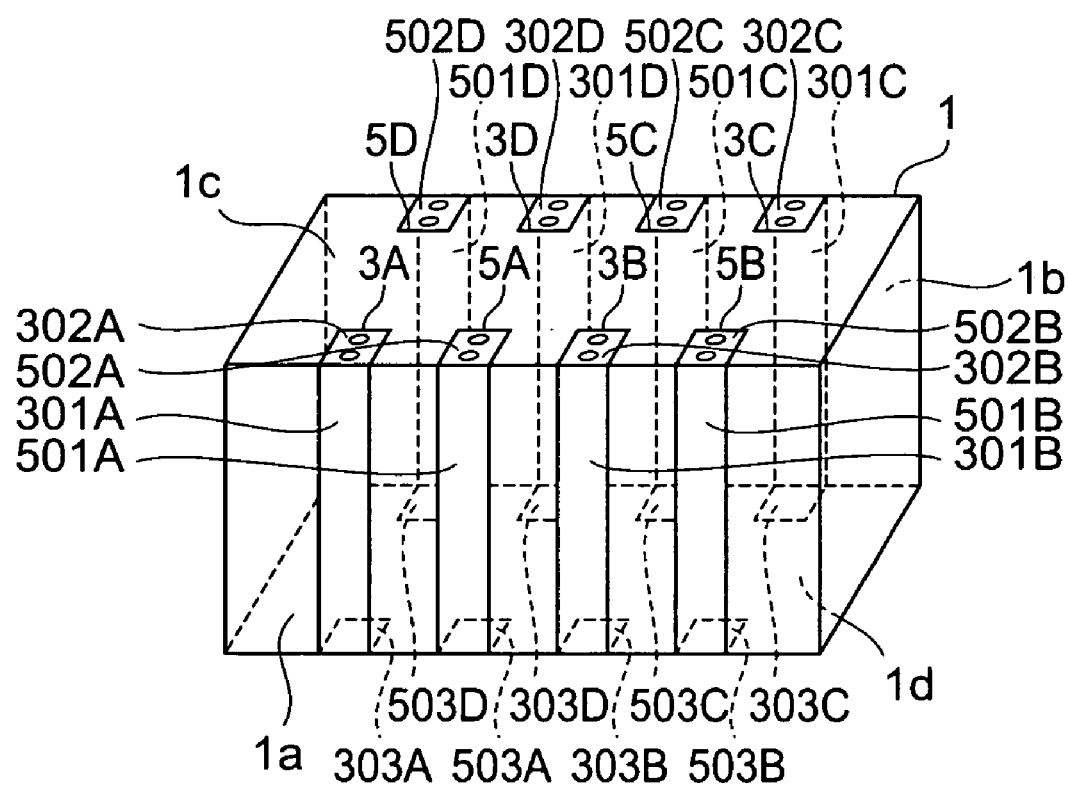
FIG. 4 is a perspective view showing a modified example of the multilayer capacitor in accordance with the first embodiment.
Figure 5:
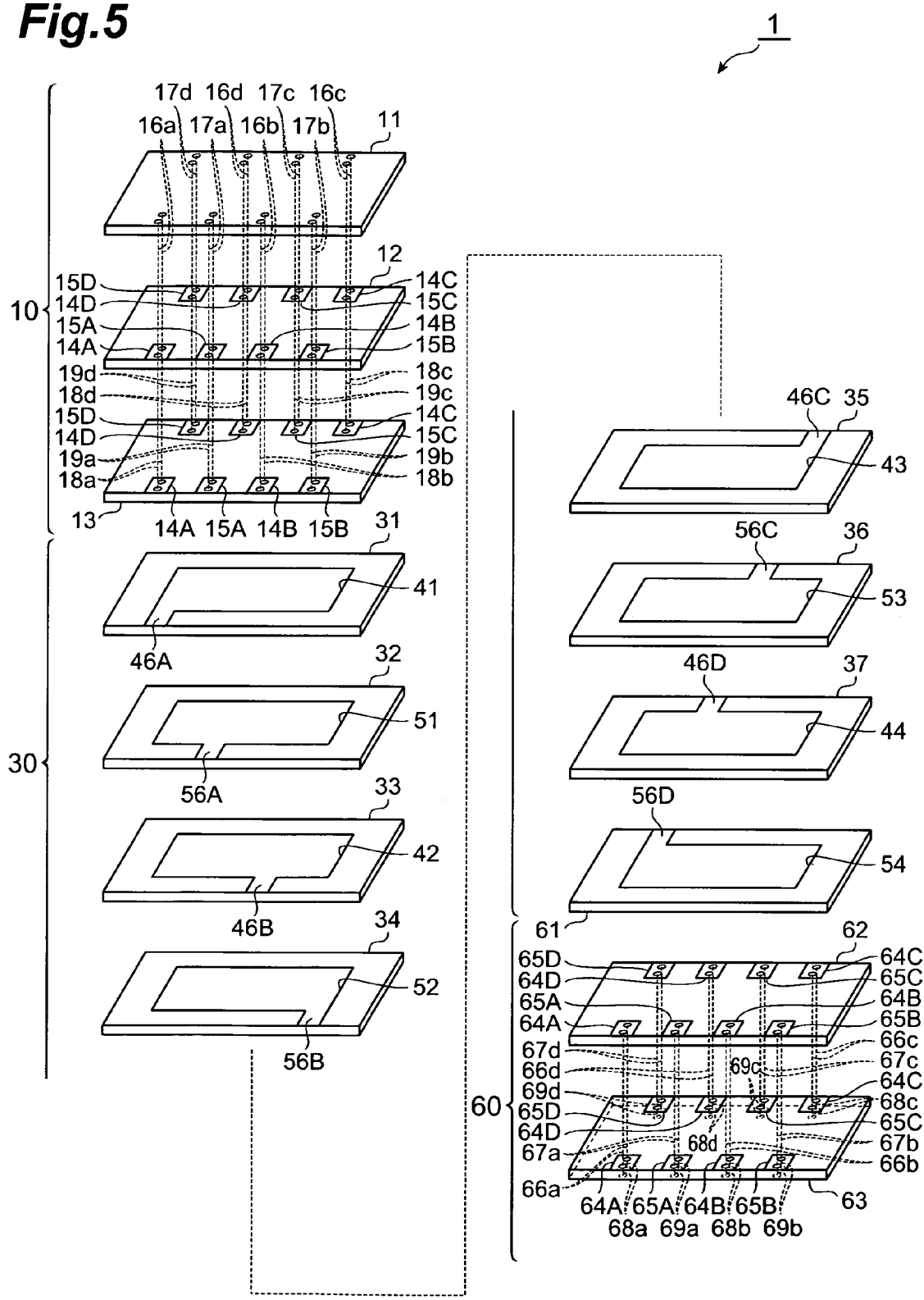
FIG. 5 is an exploded perspective view of the multilayer body included in the modified example of the multilayer capacitor in accordance with the first embodiment.

With reference to FIGS. 4 and 5, a modified example of the multilayer capacitor in accordance with this embodiment will be explained. FIG. 4 is a perspective view showing the modified example of the multilayer capacitor in accordance with this embodiment. FIG. 5 is an exploded perspective view of the multilayer body included in the modified example of the multilayer capacitor in accordance with this embodiment. As shown in FIGS. 4 and 5, there may be a plurality of (2 in this modified example) through hole conductors penetrating through dielectric layers in one laminating direction in order to electrically connect lead conductors included in the outer layer portion in the multilayer capacitor in accordance with this modified example.

In this modified example, pairs of through hole conductors 16a to 16d, 18a to 18d connecting their corresponding lead conductors 14A to 14D and first terminal electrodes 3A to 3D are formed parallel to the laminating direction. Pairs of through hole conductors 66a to 66d, 68a to 68d connecting their corresponding lead conductors 64A to 64D and first terminal electrodes 3A to 3D are formed parallel to the laminating direction. Therefore, in the modified example of the multilayer capacitor C1, a plurality of conduction paths are formed for each of the plurality of first terminal electrodes 3A to 3D in the laminating direction.

Pairs of through hole conductors 17a to 17d, 19a to 19d connecting their corresponding lead conductors 15A to 15D and second terminal electrodes 5A to 5D are formed parallel to the laminating direction. Pairs of through hole conductors 67a to 67d, 69a to 69d connecting their corresponding lead conductors 65A to 65D and second terminal electrodes 5A to 5D are formed parallel to the laminating direction. Therefore, in the modified example of the multilayer capacitor C1, a plurality of conduction paths are formed for each of the plurality of second terminal electrodes 5A to 5D in the laminating direction.

When a plurality of through hole conductors electrically connecting a plurality of lead conductors are provided for each lead conductor as such, a plurality of conduction paths can be formed for each terminal electrode. Providing a plurality of conduction paths in parallel as shown in the modified example can further lower the equivalent series inductance.

Second Embodiment

Figure 6:
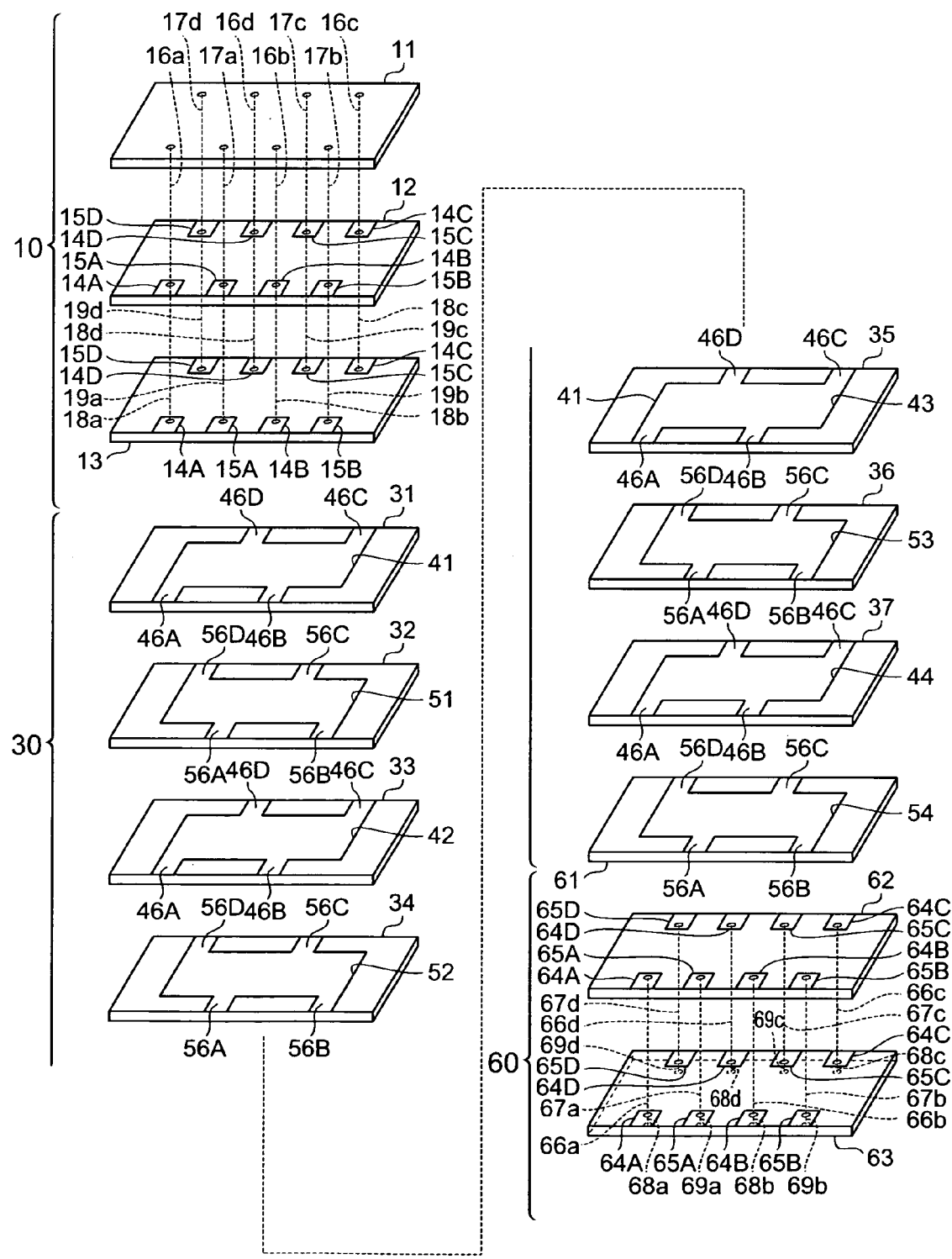
FIG. 6 is an exploded perspective view of the multilayer body included in the multilayer capacitor in accordance with a second embodiment.

With reference to FIG. 6, the structure of the multilayer capacitor in accordance with a second embodiment will be explained. The multilayer capacitor in accordance with the second embodiment differs from the multilayer capacitor C1 in accordance with the first embodiment in that inner electrodes are connected to each of a plurality of terminal electrodes through lead conductors. FIG. 6 is an exploded perspective view of the multilayer body included in the multilayer capacitor in accordance with the second embodiment.

As with the multilayer capacitor C1 in accordance with the first embodiment, the multilayer capacitor in accordance with the second embodiment comprises a multilayer body 1, first terminal electrodes 3A to 3D formed on the multilayer body 1, and second terminal electrodes 5A to 5D similarly formed on the multilayer body 1, which are not depicted. The terminal electrodes 3A to 3D, 5A to 5D include first terminal conductor portions 301A to 301D, 501A to 501D, and second terminal conductor portions 302A to 302D, 303A to 303D, 502A to 502D, 503A to 503D.

As shown in FIG. 6, the multilayer body 1 includes an inner layer portion 30 and a pair of outer layer portions 10, 60 holding the inner layer portion 30 therebetween.

The outer layer portion 10 is constructed by alternately laminating a plurality of (3 in this embodiment) dielectric layers 11 to 13 with lead conductors 14A to 14D, 15A to 15D.

The lead conductors 14A, 14B, 15A, 15B extend so as to be led to a side face 1a of the multilayer body 1 formed with the terminal electrodes 3A, 3B, 5A, 5B, while having respective one end portions electrically connected to their corresponding terminal electrodes 3A, 3B, 5A, 5B. The lead conductors 14C, 14D, 15C, 15D extend so as to be led to a side face 1b of the multilayer body 1 formed with the terminal electrodes 3C, 3D, 5C, 5D, while having respective one end portions electrically connected to their corresponding terminal electrodes 3C, 3D, 5C, 5D.

In each of dielectric layers 11, 12, through hole conductors 16a to 16d, 17a to 17d, 18a to 18d, 19a to 19d penetrating through the dielectric layer 11 in the thickness direction are formed at respective positions corresponding to the lead conductors 14A to 14D, 15A to 15D. The through hole conductors 16a to 16d, 17a to 17d have respective one end portions electrically connected to the second terminal conductor portions 302A to 302D, 502A to 502D of the terminal electrodes 3A to 3D, 5A to 5D, and the respective other end portions electrically connected to the lead conductors 14A to 14D, 15A to 15D positioned between the dielectric layers 11, 12. The through hole conductors 18a to 18d, 19a to 19d have respective one end portions electrically connected to the lead conductors 14A to 14D, 15A to 15D positioned between the dielectric layers 11, 12, and the respective other end portions electrically connected to the lead conductors 14A to 14D, 15A to 15D positioned between the dielectric layers 12, 13.

Therefore, when the dielectric layers 11 to 13 and lead conductors 14A to 14D are laminated, each of pairs of the through hole conductors 16a, 18a; 16b, 18b; 16c, 18c; and 16d, 18d are placed substantially linearly in the laminating direction, so as to be electrically connected to each other. Thus, each of sets of the through hole conductors 16a, 18a and lead conductors 14A, the through hole conductors 16b, 18b and lead conductors 14B, the through hole conductors 16c, 18c and lead conductors 14C, and the through hole conductors 16d, 18d and lead conductors 14D form a conduction path within the outer layer portion 10.

The conduction paths are electrically connected to the first terminal conductor portions 301A to 301D of the first terminal electrodes 3A to 3D at respective one end portions of the lead conductors 14A to 14D, and to the second terminal conductor portions 302A to 302D of the first terminal electrodes 3A to 3D at respective one end portions of the through hole conductors 16a to 16d. Thus, each of the conduction paths formed for the first terminal electrodes 3A to 3D electrically connects three different positions in its corresponding first terminal electrode 3A to 3D.

When the dielectric layers 11 to 13 and lead conductors 15A to 15D are laminated, each of pairs of the through hole conductors 17a, 19a; 17b, 19b; 17c, 19c; and 17d, 19d are placed substantially linearly in the laminating direction, so as to be electrically connected to each other. Thus, each of sets of the through hole conductors 17a, 19a and lead conductors 15A, the through hole conductors 17b, 19b and lead conductors 15B, the through hole conductors 17c, 19c and lead conductors 15C, and the through hole conductors 17d, 19d and lead conductors 15D form a conduction path within the outer layer portion 10.

The conduction paths are electrically connected to the first terminal conductor portions 501A to 501D of the second terminal electrodes 5A to 5D at respective one end portions of the lead conductors 15A to 15D, and to the second terminal conductor portions 502A to 502D of the second terminal electrodes 5A to 5D at respective one end portions of the through hole conductors 17a to 17d. Thus, each of the conduction paths formed for the second terminal electrodes 5A to 5D electrically connects three different positions in its corresponding second terminal electrode 5A to 5D.

The outer layer portion 60 is constructed by alternately laminating a plurality of (3 in this embodiment) dielectric layers 61 to 63 with lead conductors 64A to 64D, 65A to 65D.

The lead conductors 64A, 64B, 65A, 65B extend so as to be led to the side face 1a of the multilayer body 1 formed with the terminal electrodes 3A, 3B, 5A, 5B, and have respective one end portions electrically connected to their corresponding terminal electrodes 3A, 3B, 5A, 5B. The lead conductors 64C, 64D, 65C, 65D extend so as to be led to the side face 1b of the multilayer body 1 formed with the terminal electrodes 3C, 3D, 5C, 5D, and respective one end portions electrically connected to their corresponding terminal electrodes 3C, 3D, 5C, 5D.

In each of dielectric layers 61, 62, through hole conductors 66a to 66d, 67a to 67d, 68a to 68d, 69a to 69d penetrating through the dielectric layer 62 are formed at respective positions corresponding to the lead conductors 64A to 64D, 65A to 65D. The through hole conductors 66a to 66d, 67a to 67d have respective one end portions electrically connected to the lead conductors 64A to 64D, 65A to 65D positioned between the dielectric layers 61, 62, and the respective other end portions electrically connected to the lead conductors 64A to 64D, 65A to 65D positioned between the dielectric layers 62, 63. The through hole conductors 68a to 68d, 69a to 69d have respective one end portions electrically connected to the lead conductors 64A to 64D, 65A to 65D positioned between the dielectric layers 62, 63, and the respective other end portions electrically connected to the second terminal conductor portions 303A to 303D, 503A to 503D of the terminal electrodes 3A to 3D, 5A to 5D.

Therefore, when the dielectric layers 61 to 63 and lead conductors 64A to 64D are laminated, each of pairs of the through hole conductors 66a, 68a; 66b, 68b; 66c, 68c; and 66d, 68d are placed substantially linearly in the laminating direction, so as to be electrically connected to each other. Thus, each of sets of the through hole conductors 66a, 68a and lead conductors 64A, the through hole conductors 66b, 68b and lead conductors 64B, the through hole conductors 66c, 68c and lead conductors 64C, and the through hole conductors 66d, 68d and lead conductors 64D form a conduction path within the outer layer portion 60.

The conduction paths are electrically connected to the first terminal conductor portions 301A to 301D of the first terminal electrodes 3A to 3D at respective one end portions of the lead conductors 64A to 64D, and to the second terminal conductor portions 303A to 303D of the first terminal electrodes 3A to 3D at respective one end portions of the through hole conductors 68a to 68d. Thus, each of the conduction paths formed for the first terminal electrodes 3A to 3D electrically connects three different positions in its corresponding first terminal electrode 3A to 3D.

When the dielectric layers 61 to 63 and lead conductors 65A to 65D are laminated, each of pairs of the through hole conductors 67a, 69a; 67b, 69b; 67c, 69c; and 67d, 69d are placed substantially linearly in the laminating direction, so as to be electrically connected to each other. Thus, each of sets of the through hole conductors 67a, 69a and lead conductors 65A, the through hole conductors 67b, 69b and lead conductors 65B, the through hole conductors 67c, 69c and lead conductors 65C, and the through hole conductors 67d, 69d and lead conductors 65D form a conduction path within the outer layer portion 60.

The conduction paths are electrically connected to the first terminal conductor portions 501A to 501D of the second terminal electrodes 5A to 5D at respective one end portions of the lead conductors 65A to 65D, and to the second terminal conductor portions 503A to 503D of the second terminal electrodes 5A to 5D at respective one end portions of the through hole conductors 69a to 69d. Thus, each of the conduction paths formed for the second terminal electrodes 5A to 5D electrically connects three different positions in its corresponding second terminal electrode 5A to 5D.

As is also shown in FIG. 6, the inner layer portion 30 is constructed by alternately laminating a plurality of (7 in this embodiment) dielectric layers 31 to 37 with a plurality of (4 each in this embodiment) first and second inner electrodes 41 to 44, 51 to 54. In the actual multilayer capacitor in accordance with the second embodiment, the dielectric layers 31 to 37 are integrated to such an extent that their boundaries are indiscernible.

Each of the first inner electrodes 41 to 44 has a substantially rectangular form. The first inner electrodes 41 to 44 are formed at respective positions separated by predetermined distances from side faces parallel to the laminating direction in the multilayer body 1.

Each of the first inner electrodes 41 to 44 is electrically connected to a plurality of first terminal electrodes 3A to 3D through lead conductors 46A to 46D. Each of the lead conductors 46A, 46B is integrally formed with the first inner electrodes 41 to 44, and extends therefrom so as to reach the side face 1a of the multilayer body 1. Each of the lead conductors 46C, 46D is integrally formed with the first inner electrodes 41 to 44, and extends therefrom so as to reach the side face 1b of the multilayer body 1.

Each of the second inner electrodes 51 to 54 has a substantially rectangular form. The second inner electrodes 51 to 54 are formed at respective positions separated by predetermined distances from side faces parallel to the laminating direction in the multilayer body 1.

Each of the second inner electrodes 51 to 54 is electrically connected to a plurality of second terminal electrodes 5A to 5D through lead conductors 56A to 56D. Each of the lead conductors 56A, 56B is integrally formed with the second inner electrodes 51 to 54, and extends therefrom so as to reach the side face 1a of the multilayer body 1. Each of the lead conductors 56C, 56D is integrally formed with the second inner electrodes 51 to 54, and extends therefrom so as to reach the side face 1b of the multilayer body 1.

Figure 7:
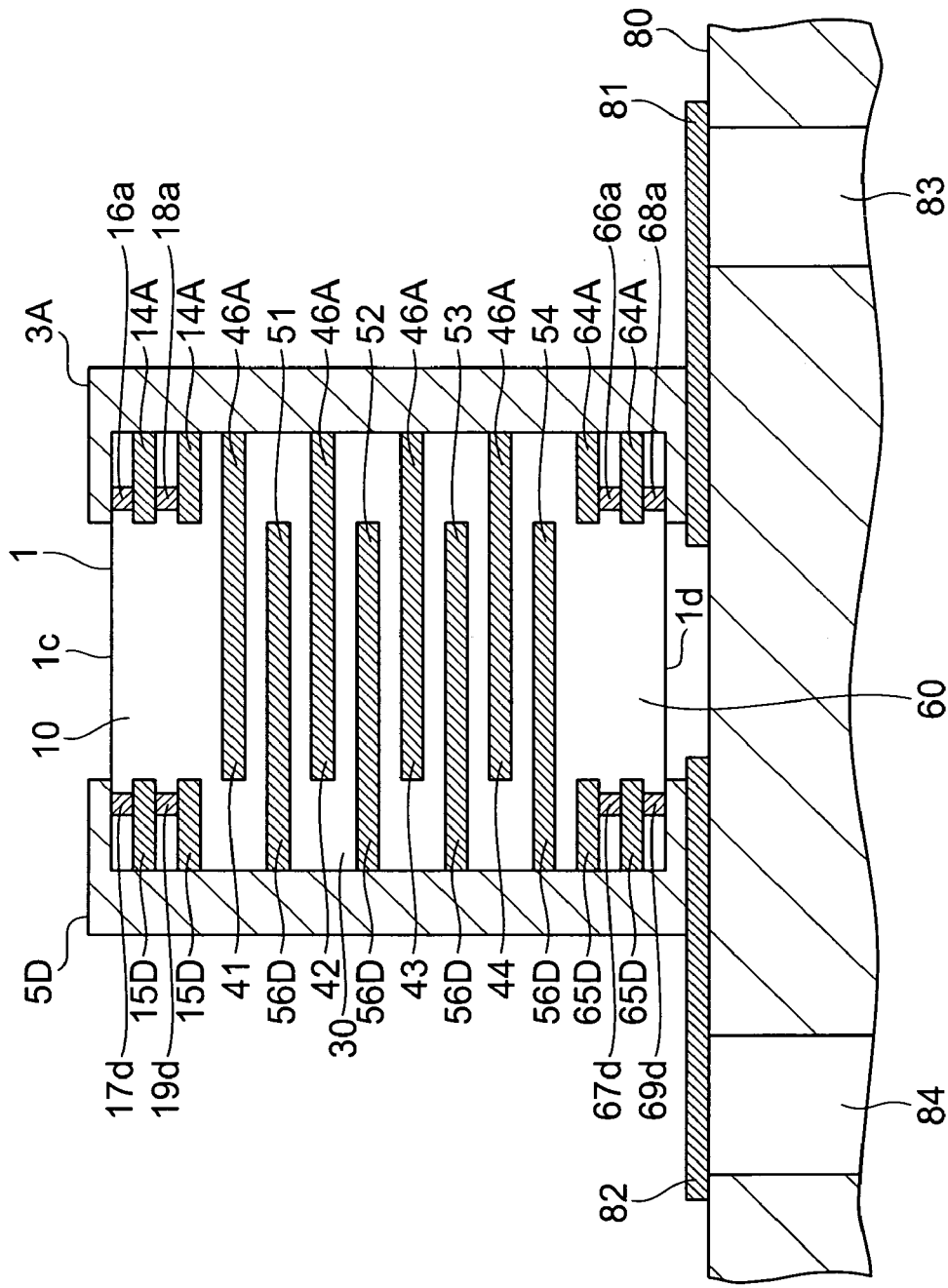
FIG. 7 is a sectional view showing the multilayer capacitor in accordance with the second embodiment mounted on a substrate.

FIG. 7 is a sectional view showing the multilayer capacitor in accordance with the second embodiment mounted on a substrate 80. The sectional view shown in FIG. 7 is obtained when the multilayer capacitor in accordance with the second embodiment is cut along a line corresponding to the line I-I shown in FIG. 1. In FIG. 7, areas corresponding to the dielectric layers 11 to 13, 31 to 37, 61 to 63 and leads 83, 84 are not hatched for easier viewing of the drawing.

As shown in FIG. 7, a plurality of lead conductors 14A to 14D, 15A to 15D and through hole conductors 16a to 16d, 18a to 18d, 17a to 17d, 19a to 19d in the outer layer portion 10 and a plurality of lead conductors 64A to 64D, 65A to 65D and through hole conductors 66a to 66d, 68a to 68d, 67a to 67d, 69a to 69d in the outer layer portion 60 form conduction paths into which shunt currents that are a part of the currents flowing through the terminal electrodes 3A to 3D, 5A to 3D flow, and from which the shunt currents flow into the same terminal electrodes again without flowing into the other terminal electrodes.

In the multilayer capacitor in accordance with the second embodiment, as shown in FIG. 7, the outer layer portion 60 formed with the conduction paths is positioned closer to the side of the side face 1d opposing the mounting surface of the substrate 80 than is the inner layer portion 30.

In the multilayer capacitor in accordance with the second embodiment, each of the terminal electrodes 3A to 3D, 5A to 5D is formed with a conduction path electrically connecting a plurality of positions in each terminal electrode. When the multilayer capacitor in accordance with the second embodiment is mounted on a substrate or the like, a current flowing through the terminal electrode electrically connected to each conduction path is shunted into the conduction path. Therefore, the multilayer capacitor in accordance with the second embodiment can lower the equivalent series inductance.

In the multilayer capacitor in accordance with the second embodiment, conduction paths for partly shunting currents flowing through the terminal electrodes 3A to 3D, 5A to 5D are formed only within the outer layer portions 10, 60 in the multilayer body 1. Therefore, it will be sufficient if only the dielectric layers 11, 12, 62, 63 within the outer layer portions 10, 60 are formed with openings for through hole conductors. As a result, the multilayer capacitor in accordance with the second embodiment can be manufactured easily.

The conduction paths formed within the outer layer portions 10, 60 in the multilayer capacitor in accordance with the second embodiment are connected to the positions of first and second terminal conductor portions of their corresponding terminal electrodes. This can shorten the lengths of conduction paths formed within the outer layer portions as compared with the case where each of a plurality of positions of terminal electrodes electrically connected to conduction paths is a first terminal conductor portion, for example. Therefore, the multilayer capacitor in accordance with the second embodiment can further lower the equivalent series inductance.

In the multilayer capacitor in accordance with the second embodiment, a plurality of (2) each of the lead conductors 14A to 14D, 15A to 15D, 64A to 64D, 65A to 65D within the outer layer portions 10, 60 are connected to the terminal electrodes 3A to 3D, 5A to 5D in the laminating direction. In this case, there are substantially a plurality of conduction paths into which the current flowing through the terminal electrode is shunted. This further lowers the equivalent series inductance of the multilayer capacitor in accordance with the second embodiment.

In the multilayer capacitor in accordance with the second embodiment, conduction paths are formed within the outer layer portion 60 positioned on the mounting surface side of the substrate 80 in the mounting state shown in FIG. 7. This can effectively shunt currents flowing into and out of the substrate 80, whereby the equivalent series inductance can further be lowered. When conduction paths are located on the mounting surface side of the substrate 80, current paths become shorter, whereby the equivalent series inductance can further be lowered.

In the multilayer capacitor in accordance with the second embodiment, the terminal electrodes 3A to 3D, 5A to 5D are arranged alternately. Therefore, when the first terminal electrodes 3A to 3D and second terminal electrodes 5A to 5D are connected with reversed polarities, magnetic fields generated by the lead conductors 46A to 46D, 56A to 56D cancel each other out, whereby the multilayer capacitor in accordance with the second embodiment can further lower the equivalent series inductance.

Third Embodiment

Figure 8:
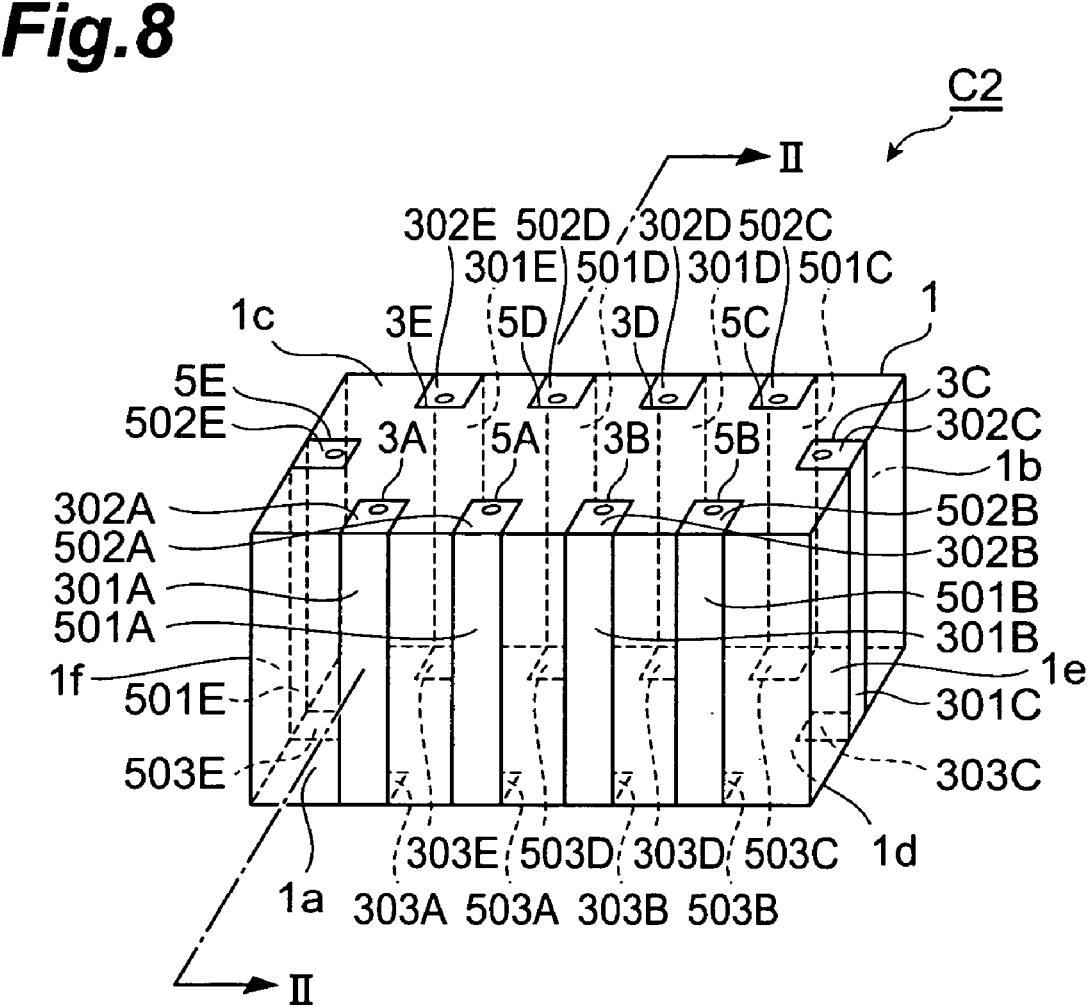
FIG. 8 is a perspective view of the multilayer capacitor in accordance with a third embodiment.
Figure 9:
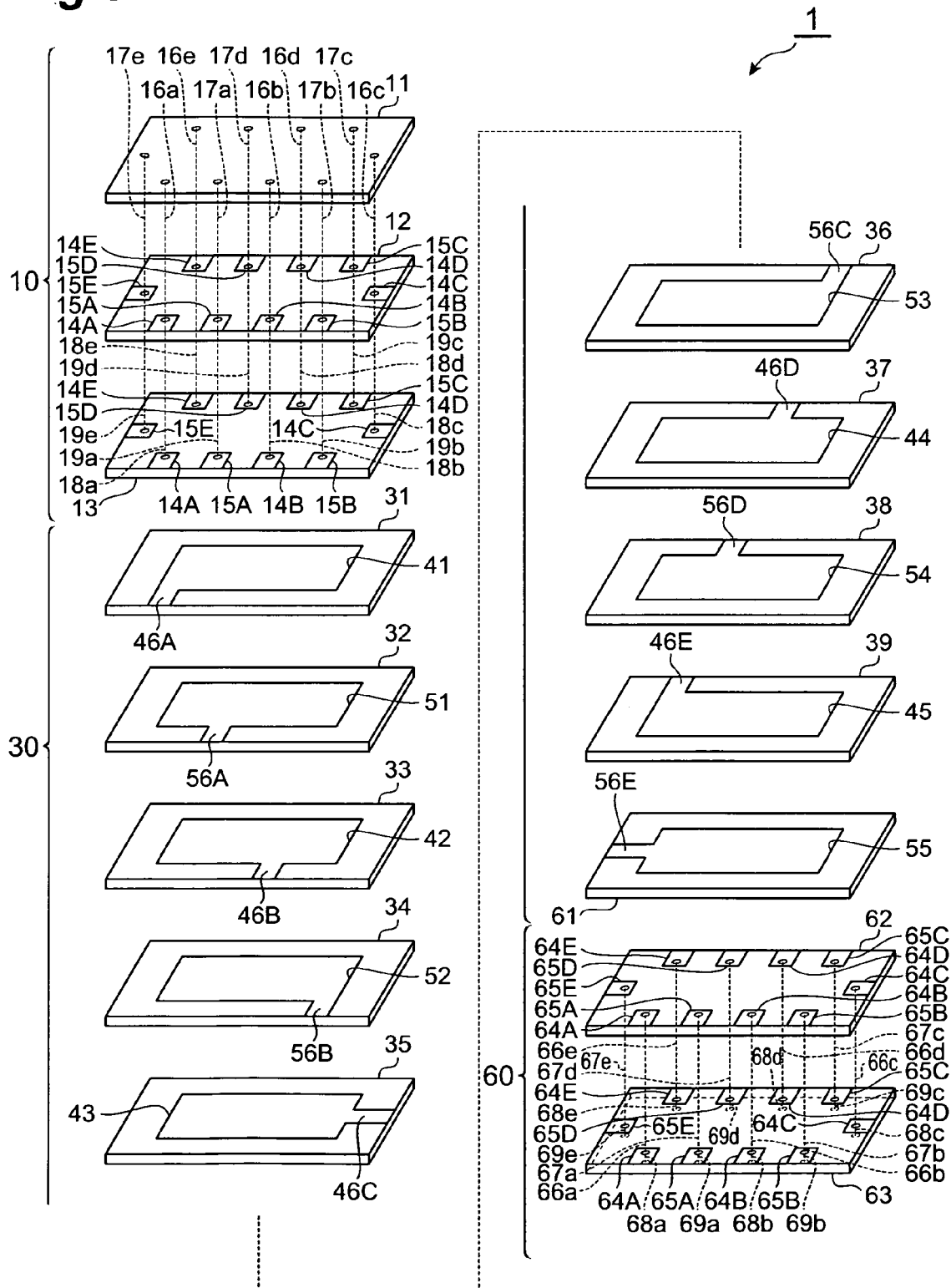
FIG. 9 is an exploded perspective view of the multilayer body included in the multilayer capacitor in accordance with the third embodiment.

With reference to FIGS. 8 and 9, the structure of the multilayer capacitor C2 in accordance with a third embodiment will be explained. The multilayer capacitor C2 in accordance with the third embodiment differs from the multilayer capacitor C1 in accordance with the first embodiment in terms of the number of first and second terminal electrodes. FIG. 8 is a perspective view of the multilayer capacitor in accordance with the third embodiment. FIG. 9 is an exploded perspective view of the multilayer body included in the multilayer capacitor in accordance with the third embodiment.

As shown in FIG. 8, the multilayer capacitor C2 comprises a multilayer body 1 including an inner layer portion 30 and outer layer portions 10, 60, a plurality of (5 in this embodiment) first terminal electrodes 3A to 3E formed on the multilayer body 1, and a plurality of (5 in this embodiment) second terminal electrodes 5A to 5E formed on the multilayer body 1.

The first terminal electrodes 3A, 3B and second terminal electrodes 5A, 5B are positioned on a side face 1a of the multilayer body 1. The first terminal electrodes 3D, 3E and second terminal electrodes 5C, 5D are positioned on a side face 1b of the multilayer body 1. The first terminal electrode 3C is positioned on a side face 1e of the multilayer body 1. The second terminal electrode 5E is positioned on a side face 1f of the multilayer body 1. The first terminal electrodes 3A to 3E and the second terminal electrodes 5A to 5E are electrically insulated from each other.

The first terminal electrodes 3A, 3B include first terminal conductor portions 301A, 301B covering the side face 1a of the multilayer body 1 in the laminating direction, and second terminal conductor portions 302A, 303A, 302B, 303B continuous with the first terminal conductor portions 301A, 301B. The second terminal conductor portions 302A, 302B cover respective portions of a side face 1c. The second terminal conductor portions 303A, 303B cover respective portions of a side face 1d.

The first terminal electrode 3C includes a first terminal conductor portion 301C covering the side face 1e of the multilayer body 1 in the laminating direction, and second terminal conductor portions 302C, 303C continuous with the first terminal conductor portion 301C. The second terminal conductor portion 302C covers a portion of the side face 1c. The second terminal conductor portion 303C covers a portion of the side face 1d.

The first terminal electrodes 3D, 3E include first terminal conductor portions 301D, 301E covering the side face 1b of the multilayer body 1 in the laminating direction, and second terminal conductor portions 302D, 303D, 302E, 303E continuous with the first terminal conductor portions 301D, 301E. The second terminal conductor portions 302D, 302E cover respective portions of the side face 1c. The second terminal conductor portions 303D, 303E cover respective portions of the side face 1d.

The second terminal electrodes 5A, 5B include first terminal conductor portions 501A, 501B covering the side face 1a of the multilayer body 1 in the laminating direction, and second terminal conductor portions 502A, 503A, 502B, 503B continuous with the first terminal conductor portions 501A, 501B. The second terminal conductor portions 502A, 502B cover respective portions of the side face 1c. The second terminal conductor portions 503A, 503B cover respective portions of the side face 1d.

The second terminal electrodes 5C, 5D include first terminal conductor portions 501C, 501D covering the side face 1b of the multilayer body 1 in the laminating direction, and second terminal conductor portions 502C, 503C, 502D, 503D continuous with the first terminal conductor portions 501A, 501B. The second terminal conductor portions 502C, 502D cover respective portions of the side face 1c. The second terminal conductor portions 503C, 503D cover respective portions of the side face 1d.

The second terminal electrode 5E includes a first terminal conductor portion 501E covering the side face 1f of the multilayer body 1 in the laminating direction, and second terminal conductor portions 502E, 503E continuous with the first terminal conductor portion 501E. The second terminal conductor portion 502E covers a portion of the side face 1c. The second terminal conductor portion 503E covers a portion of the side face 1d.

As shown in FIG. 9, the multilayer body 1 includes the inner layer portion 30 and a pair of outer layer portions 10, 60 holding the inner layer portion 30 therebetween.

The outer layer portion 10 is constructed by alternately laminating a plurality of (3 in this embodiment) dielectric layers 11 to 13 with lead conductors 14A to 14E, 15A to 15E. In the actual multilayer capacitor C2, the dielectric layers 11 to 13 are integrated to such an extent that their boundaries are indiscernible.

Lead conductors 14A to 14E, 15A to 15E are laminated between the dielectric layers 11, 12 and between the dielectric layers 12, 13. Namely, the lead conductors 14A to 14E, 15A to 15E are laminated between a plurality of dielectric layers 11 to 13 by way of one dielectric layer within the outer layer portion 10.

The lead conductors 14A, 14B, 15A, 15B extend so as to be led to the side face 1a of the multilayer body 1 formed with the terminal electrodes 3A, 3B, 5A, 5B, and have respective one end portions electrically connected to their corresponding terminal electrodes 3A, 3B, 5A, 5B. The lead conductor 14C extends so as to be led to the side face 1e of the multilayer body 1 formed with the terminal electrode 3C, and has one end portion electrically connected to the terminal electrode 3C. The lead conductors 15C, 14D, 15D, 14E extend so as to be led to the side face 1b of the multilayer body 1 formed with the terminal electrodes 5C, 3D, 5D, 3E, and have respective one end portions electrically connected to their corresponding terminal electrodes 5C, 3D, 5D, 3E. The lead conductor 15E extends so as to be led to the side face 1f of the multilayer body 1 formed with the terminal electrode 5E, and has one end portion electrically connected to the terminal electrode 5E.

In each of the dielectric layers 11, 12, through hole conductors 16a to 16e, 17a to 17e, 18a to 18e, 19a to 19e penetrating through the dielectric layer 11 in the thickness direction are formed at respective positions corresponding to the lead conductors 14A to 14E, 15A to 15E in the dielectric layer 11. The through hole conductors 16a to 16e, 17a to 17e have respective one end portions electrically connected to the second terminal conductor portions 302A to 302E, 502A to 502E of the terminal electrodes 3A to 3E, 5A to 5E, and the respective other end portions electrically connected to the lead conductors 14A to 14E, 15A to 15E positioned between the dielectric layers 11, 12. The through hole conductors 18a to 18e, 19a to 19e have respective one end portions electrically connected to the lead conductors 14A to 14E, 15A to 15E positioned between the dielectric layers 11, 12, and the respective other end portions electrically connected to the lead conductors 14A to 14E, 15A to 15E positioned between the dielectric layers 12, 13.

Therefore, when the dielectric layers 11 to 13 and lead conductors 14A to 14E are laminated, each of pairs of the through hole conductors 16a, 18a; 16b, 18b; 16c, 18c; 16d, 18d; and 16e, 18e are placed substantially linearly in the laminating direction, so as to be electrically connected to each other. Thus, each of sets of the through hole conductors 16a, 18a and lead conductors 14A, the through hole conductors 16b, 18b and lead conductors 14B, the through hole conductors 16c, 18c and lead conductors 14C, the through hole conductors 16d, 18d and lead conductors 14D, and the through hole conductors 16e, 18e and lead conductors 14E form a conduction path within the outer layer portion 10.

The conduction paths are electrically connected to the first terminal conductor portions 301A to 301E of the first terminal electrodes 3A to 3E at respective one end portions of the lead conductors 14A to 14E, and to the second terminal conductor portions 302A to 302E of the first terminal electrodes 3A to 3E at respective one end portions of the through hole conductors 16a to 16e. Thus, each of the conduction paths formed for the first terminal electrodes 3A to 3E electrically connects three different positions in its corresponding first terminal electrode 3A to 3E.

When the dielectric layers 11 to 13 and lead conductors 15A to 15E are laminated, each of pairs of the through hole conductors 17a, 19a; 17b, 19b; 17c, 19c; 17d, 19d; and 17e, 19e are placed substantially linearly in the laminating direction, so as to be electrically connected to each other. Thus, each of sets of the through hole conductors 17a, 19a and lead conductors 15A, the through hole conductors 17b, 19b and lead conductors 15B, the through hole conductors 17c, 19c and lead conductors 15C, the through hole conductors 17d, 19d and lead conductors 15D, and the through hole conductors 17e, 19e and lead conductors 15E form a conduction path within the outer layer portion 10.

The conduction paths are electrically connected to the first terminal conductor portions 501A to 501E of the second terminal electrodes 5A to 5E at respective one end portions of the lead conductors 15A to 15E, and to the second terminal conductor portions 502A to 502E of the second terminal electrodes 5A to 5E at respective one end portions of the through hole conductors 17a to 17e. Thus, each of the conduction paths formed for the second terminal electrodes 5A to 5E electrically connects three different positions in its corresponding second terminal electrode 5A to 5E.

The outer layer portion 60 is constructed by alternately laminating a plurality of (3 in this embodiment) dielectric layers 61 to 63 with lead conductors 64A to 64E, 65A to 65E. In the actual multilayer capacitor C2, the dielectric layers 61 to 63 are integrated to such an extent that their boundaries are indiscernible.

Lead conductors 64A to 64E, 65A to 65E are laminated between the dielectric layers 61, 62 and between the dielectric layers 62, 63. Namely, the lead conductors 64A to 64E, 65A to 65E are laminated between a plurality of dielectric layers 61 to 63 by way of one dielectric layer within the outer layer portion 60.

The lead conductors 64A, 64B, 65A, 65B extend so as to be led to the side face 1a of the multilayer body 1 formed with the terminal electrodes 3A, 3B, 5A, 5B, and have respective one end portions electrically connected to their corresponding terminal electrodes 3A, 3B, 5A, 5B. The lead conductor 64C extends so as to be led to the side face 1e of the multilayer body 1 formed with the terminal electrode 3C, and has one end portion electrically connected to the terminal electrode 3C. The lead conductors 65C, 64D, 65D, 64E extend so as to be led to the side face 1b of the multilayer body 1 formed with the terminal electrodes 5C, 3D, 5D, 3E, and have respective one end portions electrically connected to their corresponding terminal electrodes 5C, 3D, 5D, 3E. The lead conductor 65E extends so as to be led to the side face 1f of the multilayer body 1 formed with the terminal electrode 5E, and has one end portion electrically connected to the terminal electrode 5E.

In each of dielectric layers 62, 63, through hole conductors 66a to 66e, 67a to 67e, 68a to 68e, 69a to 69e penetrating through the dielectric layer 62 are formed at respective positions corresponding to the lead conductors 64A to 64E, 65A to 65E. The through hole conductors 66a to 66e, 67a to 67e have respective one end portions electrically connected to the lead conductors 64A to 64E, 65A to 65E positioned between the dielectric layers 61, 62, and the respective other end portions electrically connected to the lead conductors 64A to 64E, 65A to 65E positioned between the dielectric layers 62, 63. The through hole conductors 68a to 68e, 69a to 69e have respective one end portions electrically connected to the lead conductors 64A to 64E, 65A to 65E positioned between the dielectric layers 62, 63, and the respective other end portions electrically connected to the second terminal conductor portions 303A to 303E, 503A to 503E of the terminal electrodes 3A to 3E, 5A to 5E.

Therefore, when the dielectric layers 61 to 63 and lead conductors 64A to 64E are laminated, each of pairs of the through hole conductors 66a, 68a; 66b, 68b; 66c, 68c; 66d, 68d; and 66e, 68e are placed substantially linearly in the laminating direction, so as to be electrically connected to each other. Thus, each of sets of the through hole conductors 66a, 68a and lead conductors 64A, the through hole conductors 66b, 68b and lead conductors 64B, the through hole conductors 66c, 68c and lead conductors 64C, the through hole conductors 66d, 68d and lead conductors 64D, and the through hole conductors 66e, 68e and lead conductors 64E form a conduction path within the outer layer portion 60.

The conduction paths are electrically connected to the first terminal conductor portions 301A to 301E of the first terminal electrodes 3A to 3E at respective one end portions of the lead conductors 64A to 64E, and to the second terminal conductor portions 302A to 302E of the first terminal electrodes 3A to 3E at respective one end portions of the through hole conductors 66a to 66e. Thus, each of the conduction paths formed for the first terminal electrodes 3A to 3E electrically connects three different positions in its corresponding first terminal electrode 3A to 3E.

When the dielectric layers 61 to 63 and lead conductors 65A to 65E are laminated, each of pairs of the through hole conductors 67a, 69a; 67b, 69b; 67c, 69c; 67d, 69d; and 67e, 69e are placed substantially linearly in the laminating direction, so as to be electrically connected to each other. Thus, each of sets of the through hole conductors 67a, 69a and lead conductors 65A, the through hole conductors 67b, 69b and lead conductors 65B, the through hole conductors 67c, 69c and lead conductors 65C, the through hole conductors 67d, 69d and lead conductors 65D, and the through hole conductors 67e, 69e and lead conductors 65E form a conduction path within the outer layer portion 60.

The conduction paths are electrically connected to the first terminal conductor portions 501A to 501E of the second terminal electrodes 5A to 5E at respective one end portions of the lead conductors 65A to 65E, and to the second terminal conductor portions 503A to 503E of the second terminal electrodes 5A to 5E at respective one end portions of the through hole conductors 67a to 67e. Thus, each of the conduction paths formed for the second terminal electrodes 5A to 5E electrically connects three different positions in its corresponding second terminal electrode 5A to 5E.

As is also shown in FIG. 9, the inner layer portion 30 is constructed by alternately laminating a plurality of (9 in this embodiment) dielectric layers 31 to 39 with a plurality of (5 each in this embodiment) first and second inner electrodes 41 to 45, 51 to 55. In the actual multilayer capacitor C2, the dielectric layers 31 to 39 are integrated to such an extent that their boundaries are indiscernible.

Each of the first inner electrodes 41 to 45 has a substantially rectangular form. The first inner electrodes 41 to 45 are formed at respective positions separated by predetermined distances from side faces parallel to the laminating direction in the multilayer body 1.

The first inner electrode 41 is electrically connected to the first terminal electrode 3A through a lead conductor 46A. The first inner electrode 42 is electrically connected to the first terminal electrode 3B through a lead conductor 46B. The first inner electrode 43 is electrically connected to the first terminal electrode 3C through a lead conductor 46C. The first inner electrode 44 is electrically connected to the first terminal electrode 3D through a lead conductor 46D. The first inner electrode 45 is electrically connected to the first terminal electrode 3E through a lead conductor 46E. Consequently, the plurality of first terminal electrodes 3A to 3E are each electrically connected to at least one of the plurality of first inner electrodes 41 to 45 through the lead conductors 46A to 46E.

The lead conductors 46A, 46B are integrally formed with their corresponding first inner electrodes 41, 42, and extend therefrom so as to reach the side face 1a of the multilayer body 1. The lead conductor 46C is integrally formed with the first inner electrode 43, and extends therefrom so as to reach the side face 1e of the multilayer body 1. The lead conductors 46D, 46E are integrally formed with their corresponding first inner electrodes 44, 45, and extend therefrom so as to reach the side face 1b of the multilayer body 1.

Each of the second inner electrodes 51 to 55 has a substantially rectangular form. The second inner electrodes 51 to 55 are formed at respective positions separated by predetermined distances from side faces parallel to the laminating direction in the multilayer body 1.

The second inner electrode 51 is electrically connected to the second terminal electrode 5A through a lead conductor 56A. The second inner electrode 52 is electrically connected to the second terminal electrode 5B through a lead conductor 56B. The second inner electrode 53 is electrically connected to the second terminal electrode 5C through a lead conductor 56C. The second inner electrode 54 is electrically connected to the second terminal electrode 5D through a lead conductor 56D. The second inner electrode 55 is electrically connected to the second terminal electrode 5E through a lead conductor 56E. Consequently, the plurality of second terminal electrodes 5A to 5E are each electrically connected to at least one of the plurality of second inner electrodes 51 to 55 through the lead conductors 56A to 56E.

The lead conductors 56A, 56B are integrally formed with their corresponding second inner electrodes 51, 52, and extend therefrom so as to reach the side face 1a of the multilayer body 1. The lead conductors 56C, 56D are integrally formed with their corresponding second inner electrodes 53, 54, and extend therefrom so as to reach the side face 1b of the multilayer body 1. The lead conductor 56E is integrally formed with the second inner electrode 55, and extends therefrom so as to reach the side face 1f of the multilayer body 1.

Figure 10:
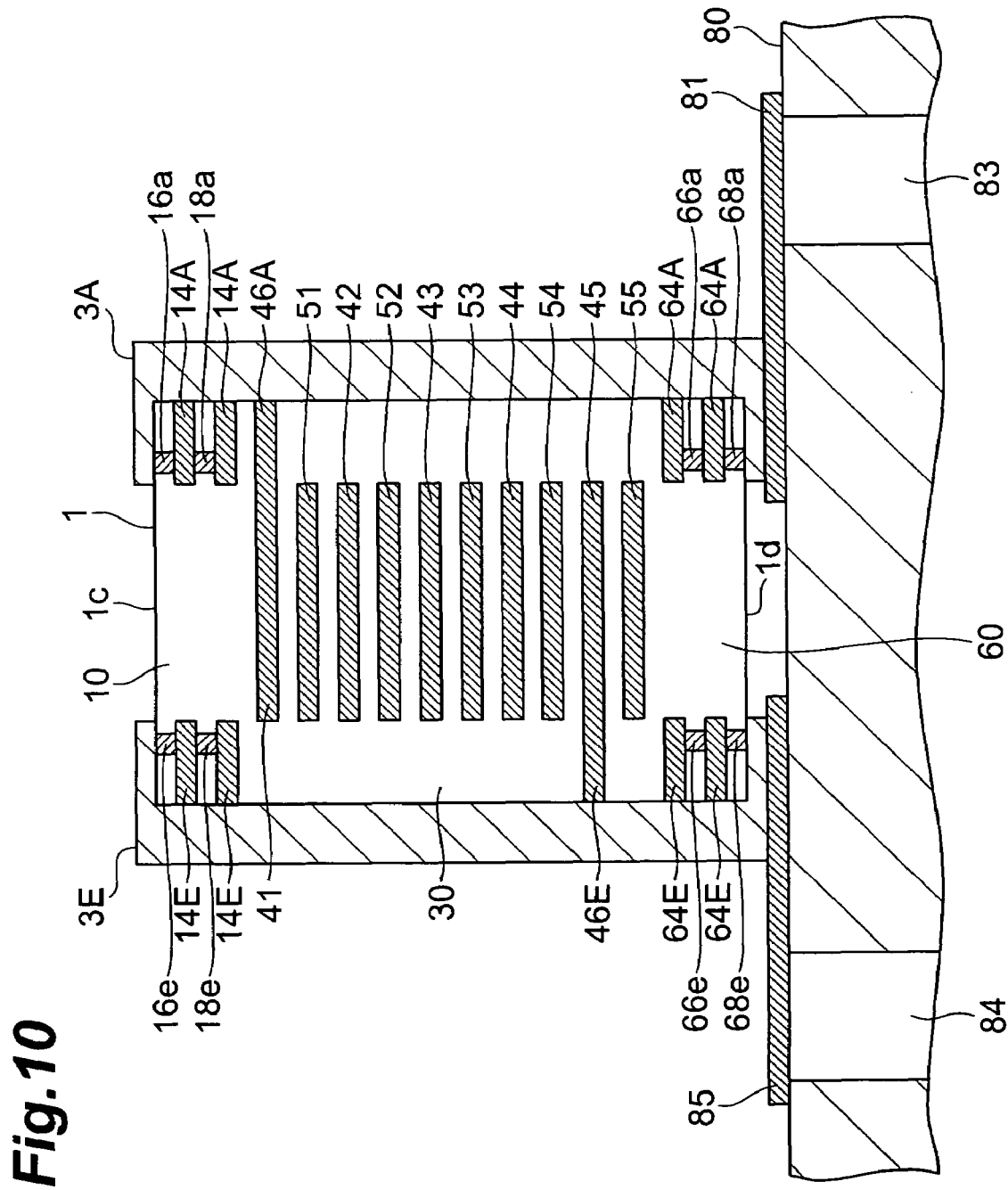
FIG. 10 is a sectional view showing the multilayer capacitor in accordance with the third embodiment mounted on a substrate.

FIG. 10 is a sectional view showing the multilayer capacitor C2 mounted on a substrate 80. The sectional view shown in FIG. 10 is obtained when the multilayer capacitor C2 is cut along a line corresponding to the line II-II shown in FIG. 8. In FIG. 10, the multilayer capacitor C2 is mounted such that the first terminal electrodes 3A, 3E of the multilayer capacitor C2 are connected to anode lands 81, 85 which are formed on the substrate 80, respectively. Leads 83, 84 provided in the substrate are connected to the anode lands 81, 85, respectively. In FIG. 10, areas corresponding to the dielectric layers 11 to 13, 31 to 37, 61 to 63 and leads 83, 84 are not hatched for easier viewing of the drawing.

As shown in FIG. 10, a plurality of lead conductors 14A to 14E, 15A to 15E and through hole conductors 16a to 16e, 18a to 18e, 17a to 17e, 19a to 19e in the outer layer portion 10 and a plurality of lead conductors 64A to 64E, 65A to 65E and through hole conductors 66a to 66e, 68a to 68e, 67a to 67e, 69a to 69e in the outer layer portion 60 form conduction paths into which shunt currents that are a part of the currents flowing through the terminal electrodes 3A to 3E, 5A to 3E flow, and from which the shunt currents flow into the same terminal electrodes again without flowing into the other terminal electrodes.

In the multilayer capacitor C2, as shown in FIG. 10, the outer layer portion 60 formed with the conduction paths is positioned closer to the side of the side face 1d opposing the mounting surface of the substrate 80 than is the inner layer portion 30.

In the multilayer capacitor C2, each of the terminal electrodes 3A to 3E, 5A to 5E is formed with a conduction path electrically connecting a plurality of positions in each terminal electrode. When the multilayer capacitor C2 is mounted on a substrate or the like, a current flowing through the terminal electrode electrically connected to each conduction path is shunted into the conduction path. Therefore, the multilayer capacitor C2 can lower the equivalent series inductance.

In the multilayer capacitor C2, conduction paths for partly shunting currents flowing through the terminal electrodes 3A to 3E, 5A to 5E are formed only within the outer layer portions 10, 60 in the multilayer body 1. Therefore, it will be sufficient if only the dielectric layers 11, 12, 62, 63 within the outer layer portions 10, 60 are formed with openings for through hole conductors. As a result, the multilayer capacitor C2 can be manufactured easily.

The conduction paths formed within the outer layer portions 10, 60 in the multilayer capacitor C2 are connected to the positions of first and second terminal conductor portions of their corresponding terminal electrodes. This can shorten the lengths of conduction paths formed within the outer layer portions as compared with the case where each of a plurality of positions of terminal electrodes electrically connected to conduction paths is a first terminal conductor portion, for example. Therefore, the multilayer capacitor C2 can further lower the equivalent series inductance.

In the multilayer capacitor C2, a plurality of (2) each of the lead conductors 14A to 14E, 15A to 15E, 64A to 64E, 65A to 65E within the outer layer portions 10, 60 are connected to the terminal electrodes 3A to 3E, 5A to 5E in the laminating direction. In this case, there are substantially a plurality of conduction paths into which the current flowing through the terminal electrode is shunted. This further lowers the equivalent series inductance of the multilayer capacitor C2.

In the multilayer capacitor C2, conduction paths are formed within the outer layer portion 60 positioned on the mounting surface side of the substrate 80 in the mounting state shown in FIG. 10. This can effectively shunt currents flowing into and out of the substrate 80, whereby the equivalent series inductance can further be lowered. When conduction paths are located on the mounting surface side of the substrate 80, current paths become shorter, whereby the equivalent series inductance can further be lowered.

In the multilayer capacitor C2, the terminal electrodes 3A to 3E, 5A to 5E are arranged alternately. Therefore, when the first terminal electrodes 3A to 3E and second terminal electrodes 5A to 5E are connected with reversed polarities, magnetic fields generated by the lead conductors 46A to 46E, 56A to 56E cancel each other out, whereby the multilayer capacitor C2 can further lower the equivalent series inductance.

Fourth Embodiment

Figure 11:
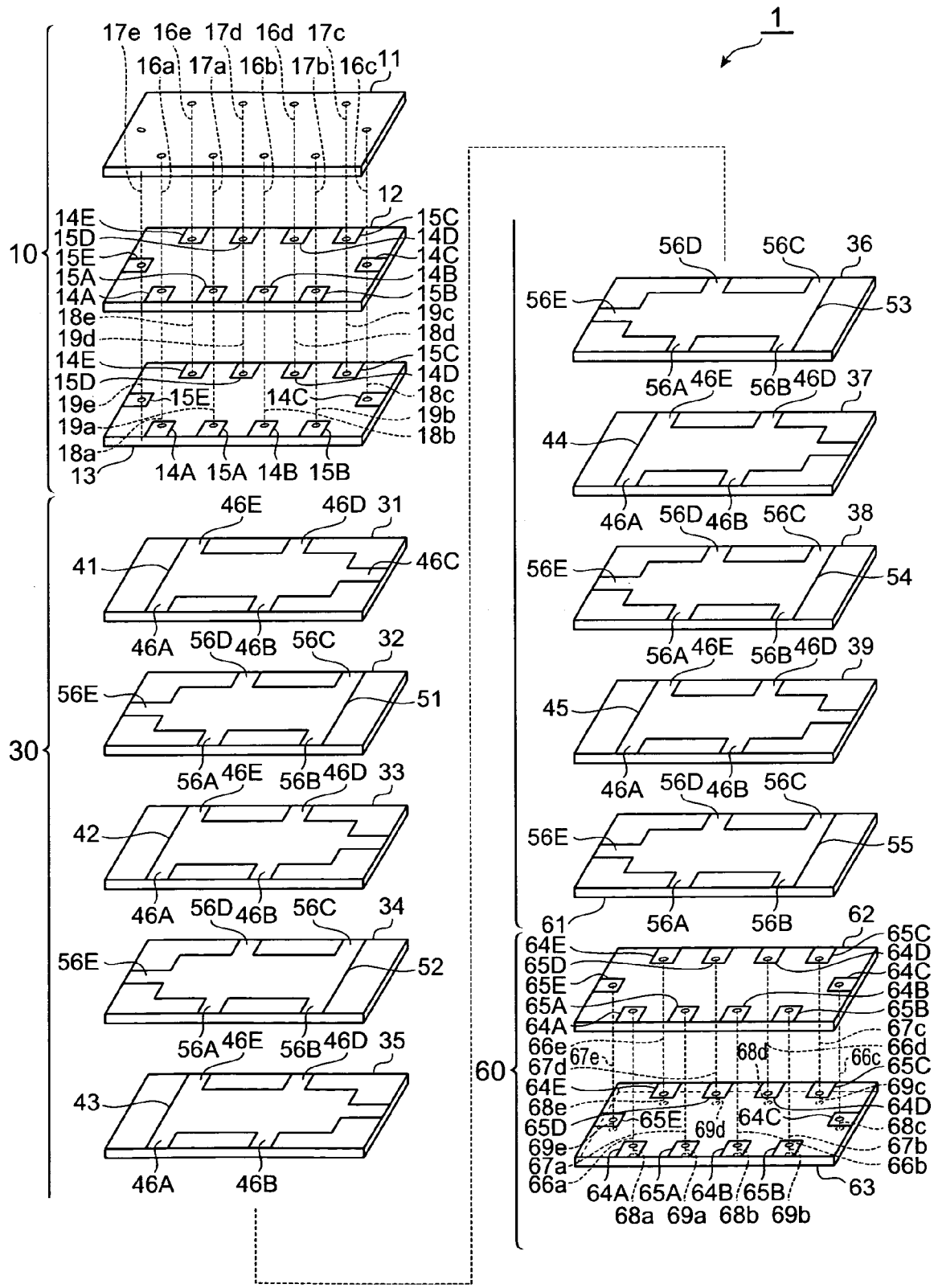
FIG. 11 is an exploded perspective view of the multilayer body included in the multilayer capacitor in accordance with a fourth embodiment.

With reference to FIG. 11, the structure of the multilayer capacitor in accordance with a fourth embodiment will be explained. The multilayer capacitor in accordance with the fourth embodiment differs from the multilayer capacitor C2 in accordance with the third embodiment in that inner electrodes are connected to each of a plurality of terminal electrodes through lead conductors. FIG. 11 is an exploded perspective view of the multilayer body included in the multilayer capacitor in accordance with the fourth embodiment.

As with the multilayer capacitor C2 in accordance with the third embodiment, the multilayer capacitor in accordance with the fourth embodiment comprises a multilayer body 1, first terminal electrodes 3A to 3E formed on the multilayer body 1, and second terminal electrodes 5A to 5E similarly formed on the multilayer body 1, which are not depicted. The terminal electrodes 3A to 3E, 5A to 5E include first terminal conductor portions 301A to 301E, 501A to 501E, and second terminal conductor portions 302A to 302E, 303A to 303E, 502A to 502E, 503A to 503E.

As shown in FIG. 11, the multilayer body 1 includes an inner layer portion 30 and a pair of outer layer portions 10, 60 holding the inner layer portion 30 therebetween.

The outer layer portion 10 is constructed by alternately laminating a plurality of (3 in this embodiment) dielectric layers 11 to 13 with lead conductors 14A to 14E, 15A to 15E. In the actual multilayer capacitor in accordance with the fourth embodiment, the dielectric layers 11 to 13 are integrated to such an extent that their boundaries are indiscernible.

Lead conductors 14A to 14E, 15A to 15E are laminated between the dielectric layers 11, 12 and between the dielectric layers 12, 13. Namely, the lead conductors 14A to 14E, 15A to 15E are laminated between a plurality of dielectric layers 11 to 13 by way of one dielectric layer within the outer layer portion 10.

The lead conductors 14A, 14B, 15A, 15B extend so as to be led to a side face 1a of the multilayer body 1 formed with the terminal electrodes 3A, 3B, 5A, 5B, and have respective one end portions electrically connected to their corresponding terminal electrodes 3A, 3B, 5A, 5B. The lead conductor 14C extends so as to be led to a side face 1e of the multilayer body 1 formed with the terminal electrode 3C, and has one end portion electrically connected to the terminal electrode 3C. The lead conductors 15C, 14D, 15D, 14E extend so as to be led to a side face 1b of the multilayer body 1 formed with the terminal electrodes 5C, 3D, 5D, 3E, and have respective one end portions electrically connected to their corresponding terminal electrodes 5C, 3D, 5D, 3E. The lead conductor 15E extends so as to be led to a side face 1f of the multilayer body 1 formed with the terminal electrode 5E, and has one end portion electrically connected to the terminal electrode 5E.

In each of dielectric layers 11, 12, through hole conductors 16a to 16e, 17a to 17e, 18a to 18e, 19a to 19e penetrating through the dielectric layer 11 are formed at respective positions corresponding to the lead conductors 14A to 14E, 15A to 15E. The through hole conductors 16a to 16e, 17a to 17e have respective one end portions electrically connected to the second terminal conductor portions 302A to 302E, 502A to 502E of the terminal electrodes 3A to 3E, 5A to 5E, and the respective other end portions electrically connected to the lead conductors 14A to 14E, 15A to 15E positioned between the dielectric layers 11, 12. The through hole conductors 18a to 18e, 19a to 19e have respective one end portions electrically connected to the lead conductors 14A to 14E, 15A to 15E positioned between the dielectric layers 11, 12, and the respective other end portions electrically connected to the lead conductors 14A to 14E, 15A to 15E positioned between the dielectric layers 12, 13.

Therefore, when the dielectric layers 11 to 13 and lead conductors 14A to 14E are laminated, each of pairs of the through hole conductors 16a, 18a; 16b, 18b; 16c, 18c; 16d, 18d; and 16e, 18e are placed substantially linearly in the laminating direction, so as to be electrically connected to each other. Thus, each of sets of the through hole conductors 16a, 18a and lead conductors 14A, the through hole conductors 16b, 18b and lead conductors 14B, the through hole conductors 16c, 18c and lead conductors 14C, the through hole conductors 16d, 18d and lead conductors 14D, and the through hole conductors 16e, 18e and lead conductors 14E form a conduction path within the outer layer portion 10.

The conduction paths are electrically connected to the first terminal conductor portions 301A to 301E of the first terminal electrodes 3A to 3E at respective one end portions of the lead conductors 14A to 14E, and to the second terminal conductor portions 302A to 302E of the first terminal electrodes 3A to 3E at respective one end portions of the through hole conductors 16a to 16e. Thus, each of the conduction paths formed for the first terminal electrodes 3A to 3E electrically connects three different positions in its corresponding first terminal electrode 3A to 3E.

When the dielectric layers 11 to 13 and lead conductors 15A to 15E are laminated, each of pairs of the through hole conductors 17a, 19a; 17b, 19b; 17c, 19c; 17d, 19d; and 17e, 19e are placed substantially linearly in the laminating direction, so as to be electrically connected to each other. Thus, each of sets of the through hole conductors 17a, 19a and lead conductors 15A, the through hole conductors 17b, 19b and lead conductors 15B, the through hole conductors 17c, 19c and lead conductors 15C, the through hole conductors 17d, 19d and lead conductors 15D, and the through hole conductors 17e, 19e and lead conductors 15E form a conduction path within the outer layer portion 10.

The conduction paths are electrically connected to the first terminal conductor portions 501A to 501E of the second terminal electrodes 5A to 5E at respective one end portions of the lead conductors 15A to 15E, and to the second terminal conductor portions 502A to 502E of the second terminal electrodes 5A to 5E at respective one end portions of the through hole conductors 17a to 17e. Thus, each of the conduction paths formed for the second terminal electrodes 5A to 5E electrically connects three different positions in its corresponding second terminal electrode 5A to 5E.

The outer layer portion 60 is constructed by alternately laminating a plurality of (3 in this embodiment) dielectric layers 61 to 63 with lead conductors 64A to 64E, 65A to 65E. In the actual multilayer capacitor in accordance with the fourth embodiment, the dielectric layers 61 to 63 are integrated to such an extent that their boundaries are indiscernible.

Lead conductors 64A to 64E, 65A to 65E are laminated between the dielectric layers 61, 62 and between the dielectric layers 62, 63. Namely, the lead conductors 64A to 64E, 65A to 65E are laminated between a plurality of dielectric layers 61 to 63 by way of one dielectric layer within the outer layer portion 60.

The lead conductors 64A, 64B, 65A, 65B extend so as to be led to the side face 1a of the multilayer body 1 formed with the terminal electrodes 3A, 3B, 5A, 5B, and have respective one end portions electrically connected to their corresponding terminal electrodes 3A, 3B, 5A, 5B. The lead conductor 64C extends so as to be led to the side face 1e of the multilayer body 1 formed with the terminal electrode 3C, and has one end portion electrically connected to the terminal electrode 3C. The lead conductors 65C, 64D, 65D, 64E extend so as to be led to the side face 1b of the multilayer body 1 formed with the terminal electrodes 5C, 3D, 5D, 3E, and have respective one end portions electrically connected to their corresponding terminal electrodes 5C, 3D, 5D, 5E. The lead conductor 65E extends so as to be led to the side face 1f of the multilayer body 1 formed with the terminal electrode 5E, and has one end portion electrically connected to the terminal electrode 5E.

In each of dielectric layers 62, 63, through hole conductors 66a to 66e, 67a to 67e, 68a to 68e, 69a to 69e penetrating through the dielectric layer 62 are formed at respective positions corresponding to the lead conductors 64A to 64E, 65A to 65E. The through hole conductors 66a to 66e, 67a to 67e have respective one end portions electrically connected to the lead conductors 64A to 64E, 65A to 65E positioned between the dielectric layers 61, 62, and the respective other end portions electrically connected to the lead conductors 64A to 64E, 65A to 65E positioned between the dielectric layers 62, 63. The through hole conductors 68a to 68e, 69a to 69e have respective one end portions electrically connected to the lead conductors 64A to 64E, 65A to 65E positioned between the dielectric layers 62, 63, and the respective other end portions electrically connected to the second terminal conductor portions 303A to 303E, 503A to 503E of the terminal electrodes 3A to 3E, 5A to 5E.

Therefore, when the dielectric layers 61 to 63 and lead conductors 64A to 64E are laminated, each of pairs of the through hole conductors 66a, 68a; 66b, 68b; 66c, 68c; 66d, 68d; and 66e, 68e are placed substantially linearly in the laminating direction, so as to be electrically connected to each other. Thus, each of sets of the through hole conductors 66a, 68a and lead conductors 64A, the through hole conductors 66b, 68b and lead conductors 64B, the through hole conductors 66c, 68c and lead conductors 64C, the through hole conductors 66d, 68d and lead conductors 64D, and the through hole conductors 66e, 68e and lead conductors 64E form a conduction path within the outer layer portion 60.

The conduction paths are electrically connected to the first terminal conductor portions 301A to 301E of the first terminal electrodes 3A to 3E at respective one end portions of the lead conductors 64A to 64E, and to the second terminal conductor portions 302A to 302E of the first terminal electrodes 3A to 3E at respective one end portions of the through hole conductors 66a to 66e. Thus, each of the conduction paths formed for the first terminal electrodes 3A to 3E electrically connects three different positions in its corresponding first terminal electrode 3A to 3E.

When the dielectric layers 61 to 63 and lead conductors 65A to 65E are laminated, each of pairs of the through hole conductors 67a, 69a; 67b, 69b; 67c, 69c; 67d, 69d; and 67e, 69e are placed substantially linearly in the laminating direction, so as to be electrically connected to each other. Thus, each of sets of the through hole conductors 67a, 69a and lead conductors 65A, the through hole conductors 67b, 69b and lead conductors 65B, the through hole conductors 67c, 69c and lead conductors 65C, the through hole conductors 67d, 69d and lead conductors 65D; and the through hole conductors 67e, 69e and lead conductors 65E form a conduction path within the outer layer portion 60.

The conduction paths are electrically connected to the first terminal conductor portions 501A to 501E of the second terminal electrodes 5A to 5E at respective one end portions of the lead conductors 65A to 65E, and to the second terminal conductor portions 503A to 503E of the second terminal electrodes 5A to 5E at respective one end portions of the through hole conductors 67a to 67e. Thus, each of the conduction paths formed for the second terminal electrodes 5A to 5E electrically connects three different positions in its corresponding second terminal electrode 5A to 5E.

As is also shown in FIG. 11, the inner layer portion 30 is constructed by alternately laminating a plurality of (9 in this embodiment) dielectric layers 31 to 39 with a plurality of (5 each in this embodiment) first and second inner electrodes 41 to 45, 51 to 55. In the actual multilayer capacitor in accordance with the fourth embodiment, the dielectric layers 31 to 39 are integrated to such an extent that their boundaries are indiscernible.

Each of the first inner electrodes 41 to 45 has a substantially rectangular form. The first inner electrodes 41 to 45 are formed at respective positions separated by predetermined distances from side faces parallel to the laminating direction in the multilayer body 1.

Each of the first inner electrodes 41 to 45 is electrically connected to a plurality of first terminal electrodes 3A to 3E through lead conductors 46A to 46E. Each of the lead conductors 46A, 46B is integrally formed with the first inner electrodes 41 to 45, and extends therefrom so as to reach the side face 1a of the multilayer body 1. The lead conductor 46C is integrally formed with the first inner electrodes 41 to 45, and extends therefrom so as to reach the side face 1e of the multilayer body 1. Each of the lead conductors 46D, 46E is integrally formed with the first inner electrodes 41 to 45, and extends therefrom so as to reach the side face 1b of the multilayer body 1.

Each of the second inner electrodes 51 to 55 has a substantially rectangular form. The second inner electrodes 51 to 55 are formed at respective positions separated by predetermined distances from side faces parallel to the laminating direction in the multilayer body 1.

Each of the second inner electrodes 51 to 55 is electrically connected to a plurality of second terminal electrodes 5A to 5E through lead conductors 56A to 56E. Each of the lead conductors 56A, 56B is integrally formed with the second inner electrodes 51 to 55, and extends therefrom so as to reach the side face 1a of the multilayer body 1. Each of the lead conductors 56C, 56D is integrally formed with the second inner electrodes 51 to 55, and extends therefrom so as to reach the side face 1b of the multilayer body 1. The lead conductor 56E is integrally formed with the second inner electrodes 51 to 55, and extends therefrom so as to reach the side face 1f of the multilayer body 1.

Figure 12:
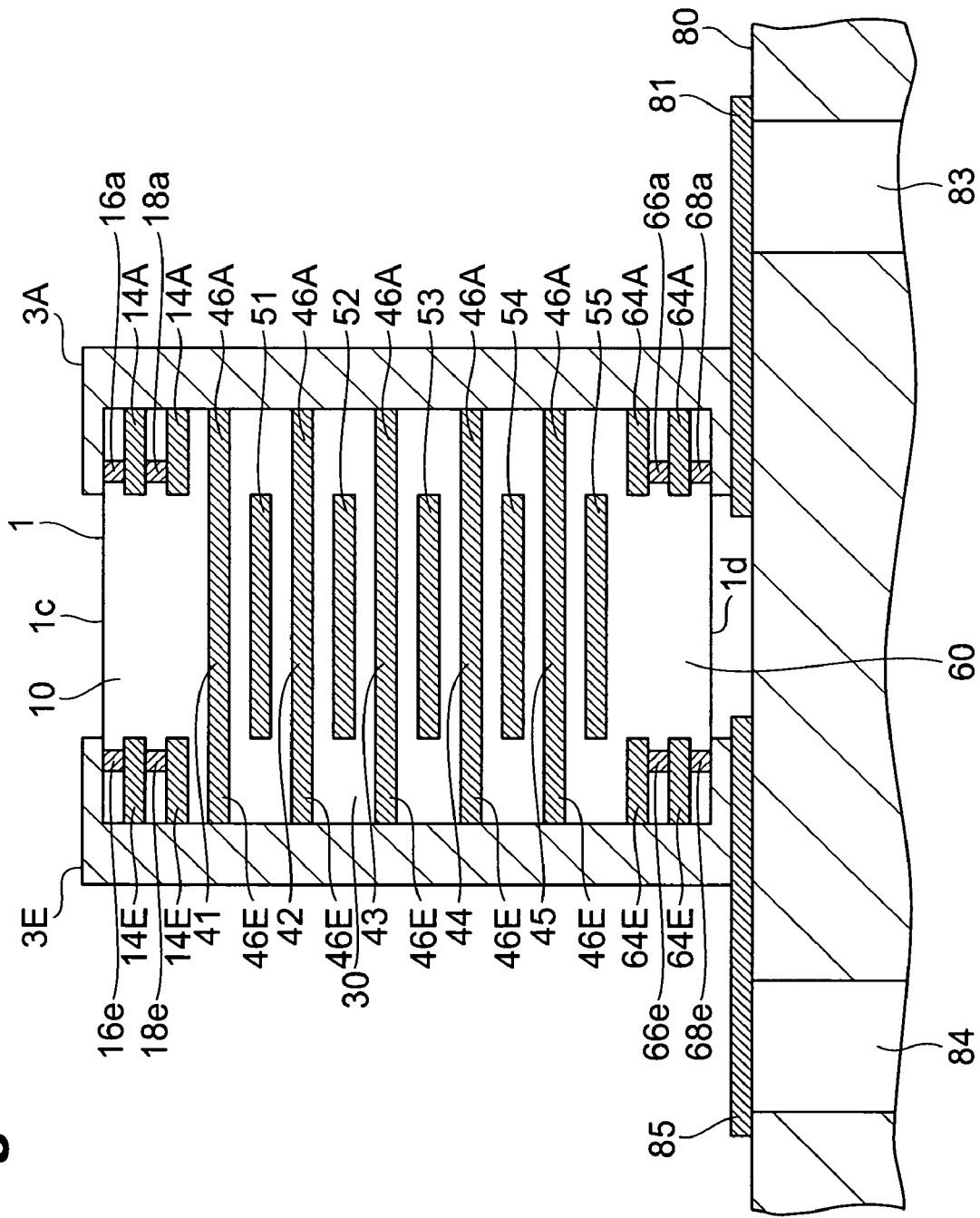
FIG. 12 is a sectional view showing the multilayer capacitor in accordance with the fourth embodiment.

FIG. 12 is a sectional view showing the multilayer capacitor in accordance with the fourth embodiment mounted on a substrate 80. The sectional view shown in FIG. 12 is obtained when the multilayer capacitor in accordance with the fourth embodiment is cut along a line corresponding to the line II-II shown in FIG. 8. In FIG. 12, areas corresponding to the dielectric layers 11 to 13, 31 to 37, 61 to 63 and leads 83, 84 are not hatched for easier viewing of the drawing.

As shown in FIG. 12, a plurality of lead conductors 14A to 14E, 15A to 15E and through hole conductors 16a to 16e, 18a to 18e, 17a to 17e, 19a to 19e in the outer layer portion 10 and a plurality of lead conductors 64A to 64E, 65A to 65E and through hole conductors 66a to 66e, 68a to 68e, 67a to 67e, 69a to 69e in the outer layer portion 60 form conduction paths into which shunt currents that are a part of the currents flowing through the terminal electrodes 3A to 3E, 5A to 3E flow, and from which the shunt currents flow into the same terminal electrodes again without flowing into the other terminal electrodes.

In the multilayer capacitor in accordance with the fourth embodiment, as shown in FIG. 12, the outer layer portion 60 formed with the conduction paths is positioned closer to the side face 1d opposing the mounting surface of the substrate 80 than is the inner layer portion 30.

In the multilayer capacitor in accordance with the fourth embodiment, each of the terminal electrodes 3A to 3E, 5A to 5E is formed with a conduction path electrically connecting a plurality of positions in each terminal electrode. When the multilayer capacitor in accordance with the fourth embodiment is mounted on a substrate or the like, a current flowing through the terminal electrode electrically connected to each conduction path is shunted into the conduction path. Therefore, the multilayer capacitor in accordance with the fourth embodiment can lower the equivalent series inductance.

In the multilayer capacitor in accordance with the fourth embodiment, conduction paths for partly shunting currents flowing through the terminal electrodes 3A to 3E, 5A to 5E are formed only within the outer layer portions 10, 60 in the multilayer body 1. Therefore, it will be sufficient if only the dielectric layers 11, 12, 62, 63 within the outer layer portions 10, 60 are formed with openings for through hole conductors. As a result, the multilayer capacitor in accordance with the fourth embodiment can be manufactured easily.

The conduction paths formed within the outer layer portions 10, 60 in the multilayer capacitor in accordance with the fourth embodiment are connected to the positions of first and second terminal conductor portions of their corresponding terminal electrodes. This can shorten the lengths of conduction paths formed within the outer layer portions as compared with the case where each of a plurality of positions of terminal electrodes electrically connected to conduction paths is a first terminal conductor portion, for example. Therefore, the multilayer capacitor in accordance with the fourth embodiment can further lower the equivalent series inductance.

In the multilayer capacitor in accordance with the fourth embodiment, a plurality of (2) each of the lead conductors 14A to 14E, 15A to 15E, 64A to 64E, 65A to 65E within the outer layer portions 10, 60 are connected to the terminal electrodes 3A to 3E, 5A to 5E in the laminating direction. In this case, there are substantially a plurality of conduction paths into which the current flowing through the terminal electrode is shunted. This further lowers the equivalent series inductance of the multilayer capacitor in accordance with the fourth embodiment.

In the multilayer capacitor in accordance with the fourth embodiment, conduction paths are formed within the outer layer portion 60 positioned on the mounting surface side of the substrate 80 in the mounting state shown in FIG. 12. This can effectively shunt currents flowing into and out of the substrate 80, whereby the equivalent series inductance can further be lowered. When conduction paths are located on the mounting surface side of the substrate 80, current paths become shorter, whereby the equivalent series inductance can further be lowered.

In the multilayer capacitor in accordance with the fourth embodiment, the terminal electrodes 3A to 3E, 5A to 5E are arranged alternately. Therefore, when the first terminal electrodes 3A to 3E and second terminal electrodes 5A to 5E are connected with reversed polarities, magnetic fields generated by the lead conductors 46A to 46E, 56A to 56E cancel each other out, whereby the multilayer capacitor in accordance with the fourth embodiment can further lower the equivalent series inductance.

Though the first to fourth embodiments are explained in detail as preferred embodiments of the present invention in the foregoing, the present invention is not limited to the above-mentioned first to fourth embodiments and modified example. For example, second terminal conductor portions of terminal electrodes are not required to be electrically connected to lead conductors. In this case, a conduction path within the outer layer portion is formed by a plurality of lead conductors laminated by way of at least one dielectric layer and a through hole conductor electrically connecting the plurality of lead conductors, for example.

Here, a plurality of lead conductors laminated within the outer layer portion extend so as to be led to a side face of the multilayer body formed with a terminal electrode electrically connected to the conduction path, and are electrically connected to each of a plurality of different positions in the terminal electrode.

It will be preferred in particular if at least three lead conductors are formed in the outer layer portion and are electrically connected to each other by a through hole conductor. In this case, substantially a plurality of conduction paths are formed, whereby the equivalent series inductance can further be lowered.

Forms of the lead conductors 14A to 14E, 15A to 15E, 64A to 64E, 65A to 65E are not limited to those of lead conductors provided in the multilayer capacitors in accordance with the above-mentioned embodiments and modified example. FIGS. 13 and 14 show modified examples of forms of lead conductors 14A to 14E, 15A to 15E, 64A to 64E, 65A to 65E laminated in the outer layer portions 10, 60. In FIG. 13, (a) to (c) illustrate forms of lead conductors laminated in an outer layer portion in the case where they are electrically connected to each other by one through hole conductor. In FIG. 14, (a) to (c) illustrate forms of lead conductors laminated in the outer layer portion in the case where they are electrically connected to each other by a plurality of through hole conductors.

The lead conductors laminated in the outer layer portion may have a circular form with a tab as shown in (a) in FIG. 13 and (a) in FIG. 14, a quadrangular form with a tab as shown in (b) in FIG. 13 and (b) in FIG. 14, or a trapezoidal form as shown in (c) in FIG. 13 and (c) in FIG. 14. In the lead conductors shown in (a) and (b) in FIG. 13 and (a) and (b) in FIG. 14, the tab is led to a side face of the multilayer body, so as to be electrically connected to a terminal electrode, for example. In the lead conductors shown in (c) in FIG. 13 and (c) in FIG. 14, one side of the trapezoid is led to a side face of the multilayer body, so as to be electrically connected to a terminal electrode, for example.

Though two layers each of the lead conductors 14A to 14D, 15A to 15D are laminated in the outer layer portions 10, 60 in each of the multilayer capacitors in accordance with the above-mentioned embodiments and modified example, this is not restrictive, whereby one layer each or three or more layers each of them may be laminated.

The number of through hole conductors 16a to 16e, 17a to 17e, 18a to 18e, 19a to 19e, 66a to 66e, 67a to 67e, 68a to 68e, 69a to 69e penetrating through dielectric layers (11, 12, 62, 63) in one laminating direction in order to electrically connect lead conductors 14A to 14E, 15A to 15E, 64A to 64E, 65A to 65E included in the outer layer portions 10, 60 may be either 1 or 2 or more with respect to each of the lead conductors 14A to 14E, 15A to 15E, 64A to 64E, 65A to 65E.

The number of laminated dielectric layers 11 to 13, 31 to 39, 61 to 63 and the number of laminated first and second inner electrodes 41 to 45, 51 to 55 are not limited to those described in the above-mentioned embodiments and modified example. The multilayer body 1 may comprise the outer layer portion 60 alone, for example, instead of two outer layer portions 10, 60. The terminal electrodes 3A to 3E, 5A to 5E are not limited to the forms described in the above-mentioned embodiments and modified example, and are not required to cover a portion of a side face intersecting the laminating direction of the multilayer body 1, for example.

Conduction paths may be formed only in the outer layer portion (e.g., outer layer portion 60) on the side of the side face opposing the mounting surface of a substrate or the like, for example, instead of both of the outer layer portions 10, 60. Conduction paths are not needed to be formed in all the terminal electrodes provided in the multilayer capacitor. For example, conduction paths may be formed for a first or second terminal electrode alone. In this case, conduction paths may be formed for all or a portion of first or second terminal electrodes. For efficiently lowering the equivalent series inductance, conduction paths are formed preferably for the same number of first and second terminal electrodes, more preferably for all the first and second terminal electrodes.

Fifth Embodiment

Figure 15:
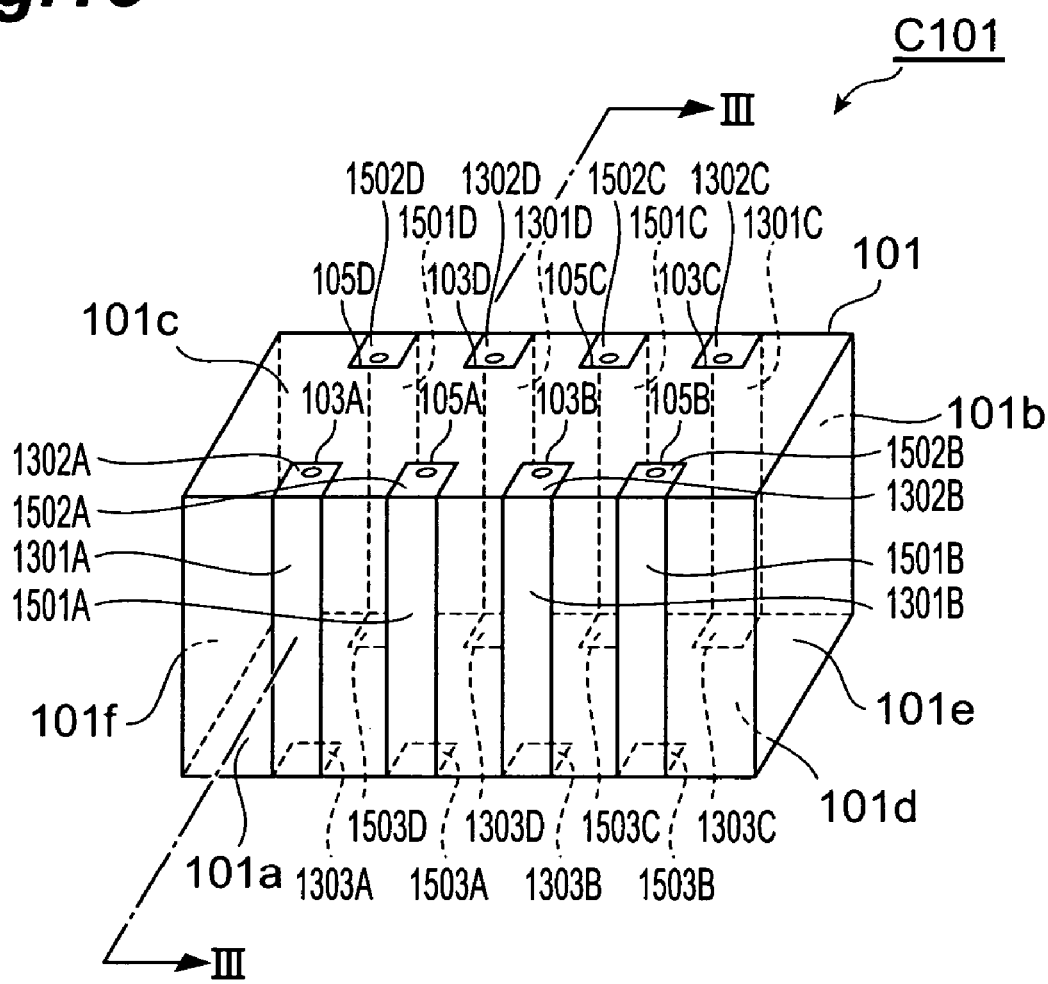
FIG. 15 is a perspective view of the multilayer capacitor in accordance with a fifth embodiment.
Figure 16:
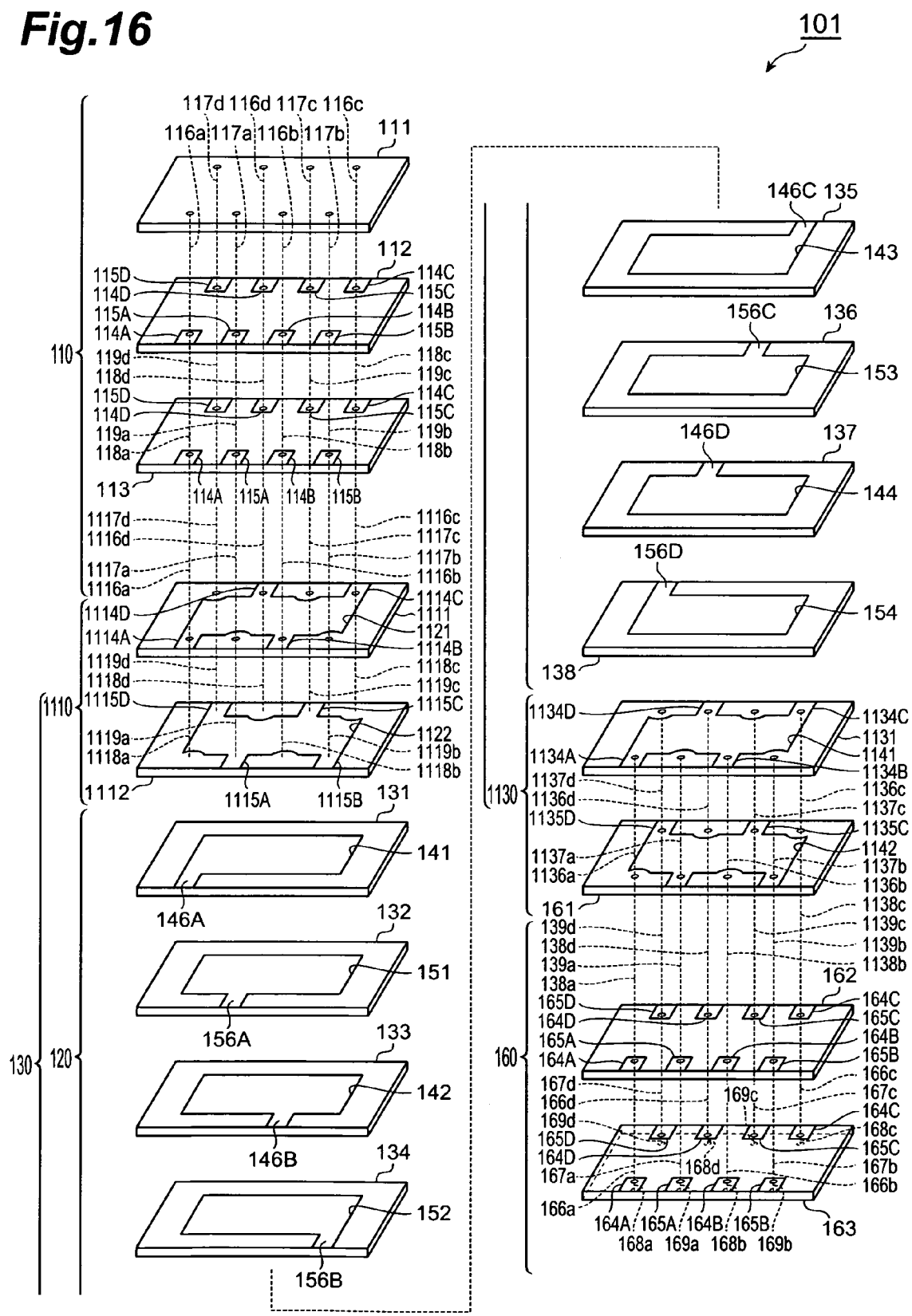
FIG. 16 is an exploded perspective view of the multilayer body included in the multilayer capacitor in accordance with the fifth embodiment.

With reference to FIGS. 15 and 16, the structure of the multilayer capacitor C101 in accordance with a fifth embodiment will be explained. FIG. 15 is a perspective view of the multilayer capacitor in accordance with the fifth embodiment. FIG. 16 is an exploded perspective view of the multilayer body included in the multilayer capacitor in accordance with the fifth embodiment.

As shown in FIG. 15, the multilayer capacitor C101 comprises a multilayer body 101, a plurality of (4 in this embodiment) first terminal electrodes 103A to 103D formed on the multilayer body 101, and a plurality of (4 in this embodiment) second terminal electrodes 105A to 105D formed on the multilayer body 101.

As will be explained later, the multilayer body 101 has a rectangular parallelepiped form in which a plurality of dielectric layers and first and second inner electrodes are laminated. The multilayer body 101 has a pair of side faces 101a, 101b, parallel to a direction in which the dielectric layers and first and second inner electrodes are laminated (hereinafter simply referred to as "laminating direction"), opposing each other; and a pair of end faces 101e, 101f, perpendicular to the side face 101a and laminating direction, opposing each other.

The first terminal electrodes 103A, 103B and second terminal electrodes 105A, 105B are positioned on the side face 101a of the multilayer body 101. The first terminal electrodes 103C, 103D and second terminal electrodes 105C, 105D are positioned on the side face 101b of the multilayer body 101. The first terminal electrodes 103A to 103D and the second terminal electrodes 105A to 105D are electrically insulated from each other.

The first terminal electrodes 103A, 103B have first terminal conductor portions 1301A, 1301B covering respective portions of the side face 101a of the multilayer body 101 in the laminating direction; second terminal conductor portions 1302A, 1302B bent to the side face 101c; and second terminal conductor portions 1303A, 1303B bent to the side face 101d. The second terminal conductor portion 1302A of the first terminal electrode 103A is formed on the side face 101c. The second terminal conductor portion 1303A of the first terminal electrode 103A is formed on the side face 101d. The second terminal conductor portion 1302B of the first terminal electrode 103B is formed on the side face 101c. The second terminal conductor portion 1303B of the first terminal electrode 103B is formed on the side face 101d. The first terminal conductor portions 1301A, 1301B of the first terminal electrodes 103A, 103B are formed on the side face 101a.

The first terminal electrodes 103C, 103D have first terminal conductor portions 1301C, 1301D covering respective portions of the side face 101b of the multilayer body 101 in the laminating direction; second terminal conductor portions 1302C, 1302D bent to the side face 101c; and second terminal conductor portions 1303C, 1303D bent to the side face 101d. The second terminal conductor portion 1302C of the first terminal electrode 103C is formed on the side face 101c. The second terminal conductor portion 1303D of the first terminal electrode 103C is formed on the side face 101d. The second terminal conductor portion 1302D of the first terminal electrode 103D is formed on the side face 101c. The second terminal conductor portion 1303D of the first terminal electrode 103D is formed on the side face 101d. The first terminal conductor portions 1301C, 1301D of the first terminal electrodes 103C, 103D are formed on the side face 101b.

The second terminal electrodes 105A, 105B have first terminal conductor portions 1501A, 1501B covering respective portions of the side face 101a of the multilayer body 101 in the laminating direction; second terminal conductor portions 1502A, 1502B bent to the side face 101c; and second terminal conductor portions 1503A, 1503B bent to the side face 101d. The second terminal conductor portion 1502A of the second terminal electrode 105A is formed on the side face 101c. The second terminal conductor portion 1503A of the second terminal electrode 105A is formed on the side face 101d. The second terminal conductor portion 1502B of the second terminal electrode 105B is formed on the side face 101c. The second terminal conductor portion 1503B of the second terminal electrode 105B is formed on the side face old. The first terminal conductor portions 1501A, 1501B of the second terminal electrodes 105A, 105B are formed on the side face 101a.

The second terminal electrodes 105C, 105D have first terminal conductor portions 1501C, 1501D covering respective portions of the side face 101b of the multilayer body 101 in the laminating direction; second terminal conductor portions 1502C, 1502D bent to the side face 101c; and second terminal conductor portions 1503C, 1503D bent to the side face 101d. The second terminal conductor portion 1502C of the second terminal electrode 105C is formed on the side face 101c. The second terminal conductor portion 1503C of the second terminal electrode 105C is formed on the side face 101d. The second terminal conductor portion 1502D of the second terminal electrode 105D is formed on the side face 101c. The second terminal conductor portion 1503D of the second terminal electrode 105D is formed on the side face 101d. The first terminal conductor portions 1501C, 1501D of the second terminal electrodes 105C, 105D are formed on the side face As shown in FIG. 16, the multilayer body 101 has an inner layer portion 130 and a pair of outer layer portions 110, 160 holding the inner layer portion 130 therebetween. The inner layer portion 130 and outer layer portions 110, 160 will now be explained.

The outer layer portion 110 is constructed by laminating a plurality of (3 in this embodiment) dielectric layers 111 to 113. In the actual multilayer capacitor C101, the dielectric layers 111 to 113 are integrated to such an extent that their boundaries are indiscernible.

Lead conductors 114A to 114D, 115A to 115D (third lead conductors), which are insulated from each other, are laminated between the dielectric layers 111, 112. Lead conductors 114A to 114D, 115A to 115D (third lead conductors), which are insulated from each other, are laminated between the dielectric layers 112, 113.

Each lead conductor 114A extends so as to be led to the side face 101a of the multilayer body 101 formed with the first terminal electrode 103A, and has one end electrically connected to the first terminal electrode 103A. Each lead conductor 114B extends so as to be led to the side face 101a of the multilayer body 101 formed with the first terminal electrode 103B, and has one end electrically connected to the first terminal electrode 103B. Each lead conductor 114C extends so as to be led to the side face 101b of the multilayer body 101 formed with the first terminal electrode 103C, and has one end electrically connected to the first terminal electrode 103C. Each lead conductor 114D extends so as to be led to the side face 101*b* of the multilayer body 101 formed with the first terminal electrode 103D, and has one end electrically connected to the first terminal electrode 103D.

Each lead conductor 115A extends so as to be led to the side face 101*a* of the multilayer body 101 formed with the second terminal electrode 105A, and has one end electrically connected to the second terminal electrode 105A. Each lead conductor 115B extends so as to be led to the side face 101*a* of the multilayer body 101 formed with the second terminal electrode 105B, and has one end electrically connected to the second terminal electrode 105B. Each lead conductor 115C extends so as to be led to the side face 101*b* of the multilayer body 101 formed with the second terminal electrode 105C, and has one end electrically connected to the second terminal electrode 105C. Each lead conductor 115D extends so as to be led to the side face 101*b* of the multilayer body 101 formed with the second terminal electrode 105D, and has one end electrically connected to the second terminal electrode 105D.

The lead conductor 114A laminated between the dielectric layers 111 and 112 and the lead conductor 114A laminated between the dielectric layers 112 and 113 are positioned such as to be overlaid on each other by way of the dielectric layer 112 as seen in the laminating direction. The lead conductors 114B to 114D, 115A to 115D laminated between the dielectric layers 111 and 112 and the lead conductors 114B to 114D, 115A to 115D laminated between the dielectric layers 112 and 113 are positioned such that the corresponding lead conductors 114B to 114D, 115A to 115D are overlaid on each other by way of the dielectric layer 112 as seen in the laminating direction.

Through hole conductors 116*a* to 116*d*, 117*a* to 117*d* penetrating through the dielectric layer 111 in the thickness direction are formed at respective positions corresponding to the lead conductors 114A to 114D, 115A to 115D in the dielectric layer 111.

The through hole conductor 116*a* has one end electrically connected to the second terminal conductor portion 1302A of the first terminal electrode 103A, and the other end electrically connected to the lead conductor 114A positioned between the dielectric layers 111, 112. The through hole conductor 116*b* has one end electrically connected to the second terminal conductor portion 1302B of the first terminal electrode 103B, and the other end electrically connected to the lead conductor 114B positioned between the dielectric layers 111, 112. The through hole conductor 116*c* has one end electrically connected to the second terminal conductor portion 1302C of the first terminal electrode 103C, and the other end electrically connected to the lead conductor 114C positioned between the dielectric layers 111, 112. The through hole conductor 116*d* has one end electrically connected to the second terminal conductor portion 1302D of the first terminal electrode 103D, and the other end electrically connected to the lead conductor 114D positioned between the dielectric layers 111, 112.

The through hole conductor 117*a* has one end electrically connected to the second terminal conductor portion 1502A of the second terminal electrode 105A, and the other end electrically connected to the lead conductor 115A positioned between the dielectric layers 111, 112. The through hole conductor 117*b* has one end electrically connected to the second terminal conductor portion 1502B of the second terminal electrode 105B, and the other end electrically connected to the lead conductor 115B positioned between the dielectric layers 111, 112. The through hole conductor 117*c* has one end electrically connected to the second terminal conductor portion 1502C of the second terminal electrode 105C, and the other end electrically connected to the lead conductor 115C positioned between the dielectric layers 111, 112. The through hole conductor 117*d* has one end electrically connected to the second terminal conductor portion 1502D of the second terminal electrode 105D, and the other end electrically connected to the lead conductor 115D positioned between the dielectric layers 111, 112.

Through hole conductors 118*a* to 118*d*, 119*a* to 119*d* penetrating through the dielectric layer 112 in the thickness direction are formed at respective positions corresponding to the lead conductors 114A to 114D, 115A to 115D in the dielectric layer 112.

The through hole conductor 118*a* has one end electrically connected to the lead conductor 114A positioned between the dielectric layers 111, 112, and the other end electrically connected to the lead conductor 114A positioned between the dielectric layers 112, 113. The through hole conductor 118*b* has one end electrically connected to the lead conductor 114B positioned between the dielectric layers 111, 112, and the other end electrically connected to the lead conductor 114B positioned between the dielectric layers 112, 113. The through hole conductor 118*c* has one end electrically connected to the lead conductor 114C positioned between the dielectric layers 111, 112, and the other end electrically connected to the lead conductor 114C positioned between the dielectric layers 112, 113. The through hole conductor 118*d* has one end electrically connected to the lead conductor 114D positioned between the dielectric layers 111, 112, and the other end electrically connected to the lead conductor 114D positioned between the dielectric layers 112, 113.

The through hole conductor 119*a* has one end electrically connected to the lead conductor 115A positioned between the dielectric layers 111, 112, and the other end electrically connected to the lead conductor 115A positioned between the dielectric layers 112, 113. The through hole conductor 119*b* has one end electrically connected to the lead conductor 115B positioned between the dielectric layers 111, 112, and the other end electrically connected to the lead conductor 115B positioned between the dielectric layers 112, 113. The through hole conductor 119*c* has one end electrically connected to the lead conductor 115C positioned between the dielectric layers 111, 112, and the other end electrically connected to the lead conductor 115C positioned between the dielectric layers 112, 113. The through hole conductor 119*d* has one end electrically connected to the lead conductor 115D positioned between the dielectric layers 111, 112, and the other end electrically connected to the lead conductor 115D positioned between the dielectric layers 112, 113.

Through hole conductors 1116*a* to 1116*d*, 1117*a* to 1117*d* penetrating through the dielectric layer 113 in the thickness direction are formed at respective positions corresponding to the lead conductors 114A to 114D, 115A to 115D in the dielectric layer 113.

The through hole conductor 1116*a* has one end electrically connected to the lead conductor 114A positioned between the dielectric layers 112, 113. The through hole conductor 1116*b* has one end electrically connected to the lead conductor 114B positioned between the dielectric layers 112, 113. The through hole conductor 1116*c* has one end electrically connected to the lead conductor 114C positioned between the dielectric layers 112, 113. The through hole conductor 1116*d* has one end electrically connected to the lead conductor 114D positioned between the dielectric layers 112, 113.

The through hole conductor 1117*a* has one end electrically connected to the lead conductor 115A positioned between the dielectric layers 112, 113. The through hole conductor 1117*b* has one end electrically connected to the lead conductor 115B positioned between the dielectric layers 112, 113. The through hole conductor 1117*c* has one end electrically connected to the lead conductor 115C positioned between the dielectric layers 112, 113. The through hole conductor 1117*d* has one end electrically connected to the lead conductor 115D positioned between the dielectric layers 112, 113.

In the inner layer portion 130, a plurality of (6 in this embodiment) first inner electrodes 1121, 141 to 144, 1141 and a plurality of (6 in this embodiment) second inner electrodes 1122, 151 to 154, 1142 are alternately laminated with dielectric layers 1111, 1112, 131 to 138, 1131. In the actual multilayer capacitor C101, the dielectric layers 1111, 1112, 131 to 138, 1131 are integrated to such an extent that their boundaries are indiscernible. In the following, the inner layer portion 130 will be explained as being separated into a first inner layer portion 120 and second inner layer portions 1110, 1130 laminated so as to hold the first inner layer portion 120 therebetween.

The second inner layer portion 1110 includes the above-mentioned first inner electrode 1121, second inner electrode 1122, and dielectric layers 1111, 1112. The first inner electrode 1121 is positioned closest to the outermost layer portion 110 among the first inner electrodes 1121, 141 to 144, 1141 included in the inner layer portion 130. The second inner electrode 1122 is positioned closest to the outermost layer portion 110 among the second inner electrodes 1122, 151 to 154, 1142 included in the inner layer portion 130.

The second inner layer portion 1130 includes the above-mentioned first inner electrode 1141, second inner electrode 1142, and dielectric layer 1131. The first inner electrode 1141 is positioned closest to the outermost layer portion 160 among the first inner electrodes 1121, 141 to 144, 1141 included in the inner layer portion 130. The second inner electrode 1142 is positioned closest to the outermost layer portion 160 among the second inner electrodes 1122, 151 to 154, 1142 included in the inner layer portion 130.

The first inner layer portion 120 includes first inner electrodes 141 to 144, second inner electrodes 151 to 154, and dielectric layers 131 to 138. The first and second inner layer portions 120, 1110, 1130 will now be explained in detail in the order of their lamination.

In the second inner layer portion 1110, as shown in FIG. 16, the first inner electrode 1121, dielectric layer 1111, second inner electrode 1122, and dielectric layer 1112 are successively laminated. Each of the first inner electrode 1121 and second inner electrode 1122 has a rectangular form. The first inner electrode 1121 and second inner electrode 1122 are formed at respective positions separated by predetermined distances from side faces parallel to the laminating direction in the multilayer body 101.

The first inner electrode 1121 has lead conductors 1114A to 1114D (first lead conductors) integrally formed therewith. The lead conductors 1114A to 1114D are formed at respective positions corresponding to the through hole conductors 1116*a* to 1116*d*, and are electrically connected to their corresponding one ends of the through hole conductors 1116*a* to 1116*d*. Lead conductors 1115A to 1115D are formed at respective positions corresponding to the through hole conductors 1117*a* to 1117*d*, and are electrically connected to their corresponding one ends of the through hole conductors 1117*a* to 1117*d*.

The lead conductor 1114A extends so as to be led to the side face 101*a* of the multilayer body 101 formed with the first terminal electrode 103A, and has one end electrically connected to the first terminal conductor portion 1301A of the first terminal electrode 103A. The lead conductor 1114B extends so as to be led to the side face 101*a* of the multilayer body 101 formed with the first terminal electrode 103B, and has one end electrically connected to the first terminal conductor portion 1301B of the first terminal electrode 103B. The lead conductor 1114C extends so as to be led to the side face 101*b* of the multilayer body 101 formed with the first terminal electrode 103C, and has one end electrically connected to the first terminal conductor portion 1301C of the first terminal electrode 103C. The lead conductor 1114D extends so as to be led to the side face 101*b* of the multilayer body 101 formed with the first terminal electrode 103D, and has one end electrically connected to the first terminal conductor portion 1301D of the first terminal electrode 103D. The first inner electrode 1121 is electrically connected to the first terminal electrodes 103A to 103D through the lead conductors 1114A to 1114D.

The second inner electrode 1122 has lead conductors 1115A to 1115D (second lead conductors) integrally formed therewith. The lead conductors 1115A to 1115D are formed at respective positions corresponding to the through hole conductors 115A to 115D.

The lead conductor 1115A extends so as to be led to the side face 101*a* of the multilayer body 101 formed with the second terminal electrode 105A, and has one end electrically connected to the first terminal conductor portion 1501A of the second terminal electrode 105A. The lead conductor 1115B extends so as to be led to the side face 101*a* of the multilayer body 101 formed with the second terminal electrode 105B, and has one end electrically connected to the first terminal conductor portion 1501B of the second terminal electrode 105B. The lead conductor 1115C extends so as to be led to the side face 101*b* of the multilayer body 101 formed with the second terminal electrode 105C, and has one end electrically connected to the first terminal conductor portion 1501C of the second terminal electrode 105C. The lead conductor 1115D extends so as to be led to the side face 101*b* of the multilayer body 101 formed with the second terminal electrode 105D, and has one end electrically connected to the first terminal conductor portion 1501D of the second terminal electrode 105D. The second inner electrode 1122 is electrically connected to the second terminal electrodes 105A to 105D through the lead conductors 1115A to 1115D.

Through hole conductors 1118*a* to 1118*d*, 1119*a* to 1119*d* penetrating through the dielectric layer 1111 in the thickness direction are formed at respective positions corresponding to the lead conductors 1114A to 1114D, 1115A to 1115D in the dielectric layer 1111.

The through hole conductor 1118*a* has one end electrically connected to the lead conductor 1114A positioned between the dielectric layers 113, 1111. The through hole conductor 1118*b* has one end electrically connected to the lead conductor 1114B positioned between the dielectric layers 113, 1111. The through hole conductor 1118*c* has one end electrically connected to the lead conductor 1114C positioned between the dielectric layers 113, 1111. The through hole conductor 1118*d* has one end electrically connected to the lead conductor 1114D positioned between the dielectric layers 113, 1111.

The through hole conductor 119*a* has one end electrically connected to the lead conductor 1115A positioned between the dielectric layers 1111, 1112. The through hole conductor 1119*b* has one end electrically connected to the lead conductor 1115B positioned between the dielectric layers 1111, 1112. The through hole conductor 119*c* has one end electrically connected to the lead conductor 1115C positioned between the dielectric layers 1111, 1112. The through hole conductor 119*d* has one end electrically connected to the lead conductor 1115D positioned between the dielectric layers 1111, 1112.

In the first inner electrode 1121, areas corresponding to the through hole conductors 1117*a* to 1117*d* are formed so as to expose the dielectric layer 1111. Namely, the first inner electrode 1121 is electrically insulated from the through hole conductors 1117*a* to 1117*d*, 1119*a* to 1119*d*. In the second electrode 1122, areas corresponding to the through hole conductors 1118*a* to 1118*d* are formed so as to expose the dielectric layer 1112. Namely, the second inner electrode 1122 is electrically insulated from the through hole conductors 1118*a* to 1118*d*.

When the outer layer portion 110 and second inner layer portion 1110 are laminated, the through hole conductors 116*a*, 118*a*, 1116*a*, 1118*a* are electrically connected to each other, so as to construct a series of substantially linear through hole conductors 116*a*, 118*a*, 1116*a*, 1118*a* arranged parallel to the laminating direction. When the outer layer portion 110 and second inner layer portion 1110 are laminated, a series of through hole conductors 116*b*, 118*b*, 1116*b*, 1118*b*, a series of through hole conductors 116*c*, 118*c*, 1116*c*, 1118*c*, a series of through hole conductors 116*d*, 118*d*, 1116*d*, 1118*d*, a series of through hole conductors 117*a*, 119*a*, 1117*a*, 1119*a*, a series of through hole conductors 117*b*, 119*b*, 1117*b*, 1119*b*, a series of through hole conductors 117*c*, 119*c*, 1117*c*, 1119*c*, and a series of through hole conductors 117*d*, 119*d*, 1117*d*, 1119*d*, which are substantially linear and parallel to the laminating direction, are constructed.

The series of through hole conductors 116*a*, 118*a*, 1116*a*, 1118*a* penetrate through the outer layer portion 110 and dielectric layer 1111, while each having one end physically and electrically connected to the first inner electrode 1121 and the other end physically and electrically connected to the second terminal conductor portion 1302A of the first terminal electrode 103A. The first inner electrode 1121 is positioned closest to the outer layer portion 10 among the first inner electrodes 1121, 141 to 144, 1141. The series of through hole conductors 116*a*, 118*a*, 1116*a*, 1118*a* are physically and electrically connected to the two lead conductors 114A electrically connected to the first terminal electrode 103A.

Namely, a conduction path is constructed by the series of through hole conductors 116*a*, 118*a*, 1116*a*, 1118*a* and two lead conductors 114A. This conduction path electrically connects three different positions in the first terminal electrode 103A to the first inner electrode 1121 positioned closest to the outer layer portion 110 among the first inner electrodes 1121, 141 to 144, 1141.

The series of through hole conductors 116*b*, 118*b*, 1116*b*, 1118*b* penetrate through the outer layer portion 110 and dielectric layer 1111, while each having one end physically and electrically connected to the first inner electrode 1121 and the other end physically and electrically connected to the second terminal conductor portion 1302B of the first terminal electrode 103B. The series of through hole conductors 116*b*, 118*b*, 1116*b*, 1118*b* are physically and electrically connected to the two lead conductors 114B electrically connected to the first terminal electrode 103B.

Namely, a conduction path is constructed by the series of through hole conductors 116*b*, 118*b*, 1116*b*, 1118*b* and two lead conductors 114B. This conduction path electrically connects three different positions in the first terminal electrode 103B to the first inner electrode 1121 positioned closest to the outer layer portion 110 among the first inner electrodes 1121, 141 to 144, 1141.

The series of through hole conductors 116*c*, 118*c*, 1116*c*, 1118*c* penetrate through the outer layer portion 110 and dielectric layer 1111, while each having one end physically and electrically connected to the first inner electrode 1121 and the other end physically and electrically connected to the second terminal conductor portion 1302C of the first terminal electrode 103C. The series of through hole conductors 116*c*, 118*c*, 1116*c*, 1118*c* are physically and electrically connected to the two lead conductors 114C electrically connected to the first terminal electrode 103C.

Namely, a conduction path is constructed by the series of through hole conductors 116*c*, 118*c*, 1116*c*, 1118*c* and two lead conductors 114C. This conduction path electrically connects three different positions in the first terminal electrode 103C to the first inner electrode 1121 positioned closest to the outer layer portion 110 among the first inner electrodes 1121, 141 to 144, 1141.

The series of through hole conductors 116*d*, 118*d*, 1116*d*, 1118*d* penetrate through the outer layer portion 110 and dielectric layer 1111, while each having one end physically and electrically connected to the first inner electrode 1121 and the other end physically and electrically connected to the second terminal conductor portion 1302D of the first terminal electrode 103D. The series of through hole conductors 116*d*, 118*d*, 1116*d*, 1118*d* are physically and electrically connected to the two lead conductors 114D electrically connected to the first terminal electrode 103D.

Namely, a conduction path is constructed by the series of through hole conductors 116*d*, 118*d*, 1116*d*, 1118*d* and two lead conductors 114D. This conduction path electrically connects three different positions in the first terminal electrode 103D to the first inner electrode 1121 positioned closest to the outer layer portion 110 among the first inner electrodes 1121, 141 to 144, 1141.

The series of through hole conductors 117*a*, 119*a*, 1117*a*, 1119*a* penetrate through the outer layer portion 110 and dielectric layer 1111, while each having one end physically and electrically connected to the second inner electrode 1122 and the other end physically and electrically connected to the second terminal conductor portion 1502A of the second terminal electrode 105A. The second inner electrode 1122 is positioned closest to the outer layer portion 110 among the second inner electrodes 1122, 151 to 154, 1142. The series of through hole conductors 117*a*, 119*a*, 1117*a*, 1119*a* are physically and electrically connected to the two lead conductors 115A electrically connected to the second terminal electrode 105A.

Namely, a conduction path is constructed by the series of through hole conductors 117*a*, 119*a*, 1117*a*, 1119*a* and two lead conductors 115A. This conduction path electrically connects three different positions in the second terminal electrode 105A to the second inner electrode 1122 positioned closest to the outer layer portion 110 among the second inner electrodes 1122, 151 to 154, 1142.

The series of through hole conductors 117*b*, 119*b*, 1117*b*, 1119*b* penetrate through the outer layer portion 110 and dielectric layer 1111, while each having one end physically and electrically connected to the second inner electrode 1122 and the other end physically and electrically connected to the second terminal conductor portion 1502B of the second terminal electrode 105B. The series of through hole conductors 117*b*, 119*b*, 1117*b*, 1119*b* are physically and electrically connected to the two lead conductors 115B electrically connected to the second terminal electrode 105B.

Namely, a conduction path is constructed by the series of through hole conductors 117*b*, 119*b*, 1117*b*, 1119*b* and two lead conductors 115B. This conduction path electrically connects three different positions in the second terminal electrode 105B to the second inner electrode 1122 positioned closest to the outer layer portion 110 among the second inner electrodes 1122, 151 to 154, 1142.

The series of through hole conductors 117c, 119c, 1117c, 1119c penetrate through the outer layer portion 110 and dielectric layer 1111, while each having one end physically and electrically connected to the second inner electrode 1122 and the other end physically and electrically connected to the second terminal conductor portion 1502C of the second terminal electrode 105C. The series of through hole conductors 117c, 119c, 1117c, 1119c are physically and electrically connected to the two lead conductors 115C electrically connected to the second terminal electrode 105C.

Namely, a conduction path is constructed by the series of through hole conductors 117c, 119c, 1117c, 1119c and two lead conductors 115C. This conduction path electrically connects three different positions in the second terminal electrode 105C to the second inner electrode 1122 positioned closest to the outer layer portion 110 among the second inner electrodes 1122, 151 to 154, 1142.

The series of through hole conductors 117d, 119d, 1117d, 1119d penetrate through the outer layer portion 110 and dielectric layer 1111, while each having one end portion physically and electrically connected to the second inner electrode 1122 and the other end physically and electrically connected to the second terminal conductor portion 1502D of the second terminal electrode 105D. The series of through hole conductors 117d, 119d, 1117d, 1119d are physically and electrically connected to the two lead conductors 115D electrically connected to the second terminal electrode 105D.

Namely, a conduction path is constructed by the series of through hole conductors 117d, 119d, 1117d, 1119d and two lead conductors 115D. This conduction path electrically connects three different positions in the second terminal electrode 105D to the second inner electrode 1122 positioned closest to the outer layer portion 110 among the second inner electrodes 1122, 151 to 154, 1142.

As shown in FIG. 16, the first inner layer portion 120 is constructed by alternately laminating a plurality of (4 each in this embodiment) first inner electrodes 141 to 144 and a plurality of (4 each in this embodiment) second inner electrodes 151 to 154 with a plurality of (8 in this embodiment) dielectric layers 131 to 138.

Each of the first inner electrodes 141 to 144 has a rectangular form. The first inner electrodes 141 to 144 are formed at respective positions separated by predetermined distances from side faces parallel to the laminating direction in the multilayer body 101.

The first inner electrode 141 has one lead conductor 146A (first lead conductor) physically and electrically connected to the first terminal conductor portion 1301A of the first terminal electrode 103A. The first inner electrode 142 has one lead conductor 146B (first lead conductor) physically and electrically connected to the first terminal conductor portion 1301B of the first terminal electrode 103B. The first inner electrode 143 has one lead conductor 146C (first lead conductor) physically and electrically connected to the first terminal conductor portion 1301C of the first terminal electrode 103C. The first inner electrode 144 has one lead conductor 146D (first lead conductor) physically and electrically connected to the first terminal conductor portion 1301D of the first terminal electrode 103D. Consequently, the plurality of first terminal electrodes 103A to 103D are each electrically connected to at least one of the plurality of first inner electrodes 141 to 144 through the lead conductors 146A to 146D.

The lead conductor 146A is integrally formed with the first inner electrode 141, and extends therefrom so as to reach the side face 101a of the multilayer body 101. The lead conductor 146B is integrally formed with the first inner electrode 142, and extends therefrom so as to reach the side face 101a of the multilayer body 101. The lead conductor 146C is integrally formed with the first inner electrode 143, and extends therefrom so as to reach the side face 101b of the multilayer body 101. The lead conductor 146D is integrally formed with the first inner electrode 144, and extends therefrom so as to reach the side face 101b of the multilayer body 101.

Each of the second inner electrodes 151 to 154 has a rectangular form. The second inner electrodes 151 to 154 are formed at respective positions separated by predetermined distances from side faces parallel to the laminating direction in the multilayer body 101.

The second inner electrode 151 has one lead conductor 156A (second lead conductor) physically and electrically connected to the first terminal conductor portion 1501A of the second terminal electrode 105A. The second inner electrode 152 has one lead conductor 156B (second lead conductor) physically and electrically connected to the first terminal conductor portion 1501B of the second terminal electrode 105B. The second inner electrode 153 has one lead conductor 156C (second lead conductor) physically and electrically connected to the first terminal conductor portion 1501C of the second terminal electrode 105C. The second inner electrode 154 has one lead conductor 156D (second lead conductor) physically and electrically connected to the first terminal conductor portion 1501D of the second terminal electrode 105D. Consequently, the plurality of second terminal electrodes 105A to 105D are each electrically connected to at least one of the plurality of second inner electrodes 151 to 154 through the lead conductors 156A to 156D.

The lead conductor 156A is integrally formed with the second inner electrode 151, and extends therefrom so as to reach the side face 101a of the multilayer body 101. The lead conductor 156B is integrally formed with the second inner electrode 152, and extends therefrom so as to reach the side face 101a of the multilayer body 101. The lead conductor 156C is integrally formed with the second inner electrode 153, and extends therefrom so as to reach the side face 101b of the multilayer body 101. The lead conductor 156D is integrally formed with the second inner electrode 154, and extends therefrom so as to reach the side face 101b of the multilayer body 101.

In the second inner layer portion 1130, as shown in FIG. 16, the first inner electrode 1141, dielectric layer 1131, and second inner electrode 1142 are successively laminated. Each of the first inner electrode 1141 and second inner electrode 1142 has a rectangular form. The first inner electrode 1141 and second inner electrode 1142 are formed at respective positions separated by predetermined distances from side faces parallel to the laminating direction in the multilayer body 101.

The first inner electrode 1141 has lead conductors 1134A to 1134D (first lead conductors) integrally formed therewith.

The lead conductor 1134A extends so as to be led to the side face 101a of the multilayer body 101 formed with the first terminal electrode 103A, and has one end electrically connected to the first terminal conductor portion 1301A of the first terminal electrode 103A. The lead conductor 1134B extends so as to be led to the side face 101a of the multilayer body 101 formed with the first terminal electrode 103B, and has one end electrically connected to the first terminal conductor portion 1301B of the first terminal electrode 103B. The lead conductor 1134C extends so as to be led to the side face 101b of the multilayer body 101 formed with the first terminal electrode 103C, and has one end electrically connected to the first terminal conductor portion 1301C of the first terminal electrode 103C. The lead conductor 1134D extends so as to be led to the side face 101*b* of the multilayer body 101 formed with the first terminal electrode 103D, and has one end electrically connected to the first terminal conductor portion 130D of the first terminal electrode 103D. The first inner electrode 1141 is electrically connected to the first terminal electrodes 103A to 103D through the lead conductors 1134A to 1134D.

The second inner electrode 1142 has lead conductors 1135A to 1135D (second lead conductors) integrally formed therewith. The lead conductors 1135A to 1135D are formed at respective positions corresponding to the lead conductors 115A to 115D.

The lead conductor 1135A extends so as to be led to the side face 101*a* of the multilayer body 101 formed with the second terminal electrode 105A, and has one end electrically connected to the first terminal conductor portion 1501A of the second terminal electrode 105A. The lead conductor 1135B extends so as to be led to the side face 101*a* of the multilayer body 101 formed with the second terminal electrode 105B, and has one end electrically connected to the first terminal conductor portion 1501B of the second terminal electrode 105B. The lead conductor 1135C extends so as to be led to the side face 101*b* of the multilayer body 101 formed with the second terminal electrode 105C, and has one end electrically connected to the first terminal conductor portion 1501C of the second terminal electrode 105C. The lead conductor 1135D extends so as to be led to the side face 101*b* of the multilayer body 101 formed with the second terminal electrode 105D, and has one end electrically connected to the first terminal conductor portion 1501D of the second terminal electrode 105D. The second inner electrode 1142 is electrically connected to the second terminal electrodes 105A to 105D through the lead conductors 1135A to 1135D.

Through hole conductors 1136*a* to 1136*d*, 1137*a* to 1137*d* penetrating through the dielectric layer 1131 in the thickness direction are formed at respective positions corresponding to the lead conductors 1134A to 1134D, 1135A to 1135D in the dielectric layer 1131.

The through hole conductor 1136*a* has one end electrically connected to the lead conductor 1134A positioned between the dielectric layers 138, 1131. The through hole conductor 1136*b* has one end electrically connected to the lead conductor 1134B positioned between the dielectric layers 138, 1131. The through hole conductor 1136*c* has one end electrically connected to the lead conductor 1134C positioned between the dielectric layers 138, 1131. The through hole conductor 1136*d* has one end electrically connected to the lead conductor 1134D positioned between the dielectric layers 138, 1131.

The through hole conductor 1137*a* has one end electrically connected to the lead conductor 1135A. The through hole conductor 1137*b* has one end electrically connected to the lead conductor 1135B. The through hole conductor 1137*c* has one end electrically connected to the lead conductor 1135C. The through hole conductor 1137*d* has one end electrically connected to the lead conductor 1135D.

In the first inner electrode 1141, areas corresponding to the through hole conductors 1137*a* to 1137*d* are formed so as to expose the dielectric layer 1131. Namely, the first inner electrode 1141 is electrically insulated from the through hole conductors 1137*a* to 1137*d*. In the second electrode 1142, areas corresponding to the through hole conductors 1136*a* to 1136*d* are formed so as to expose the dielectric layer 161, adjacent to the second inner electrode 1142, included in the outer layer portion 160. Namely, the second inner electrode 1142 is electrically insulated from the through hole conductors 1136*a* to 1136*d*.

The outer layer portion 160 is constructed by laminating a plurality of (3 in this embodiment) dielectric layers 161 to 163. Laminated between the dielectric layers 161, 162 are lead conductors 164A to 164D, 165A to 165D (third lead conductors) insulated from each other. Laminated between the dielectric layers 162, 163 are lead conductors 164A to 164D, 165A to 165D (third lead conductors) insulated from each other. The lead conductors 164A to 164D, 165A to 165D are laminated at respective positions corresponding to the lead conductors 1134A to 1134D, 1135A to 1135D.

Each lead conductor 164A extends so as to be led to the side face 101*a* of the multilayer body 101 formed with the first terminal electrode 103A, and has one end electrically connected to the first terminal electrode 103A. Each lead conductor 164B extends so as to be led to the side face 101*a* of the multilayer body 101 formed with the first terminal electrode 103B, and has one end electrically connected to the first terminal electrode 103B. Each lead conductor 164C extends so as to be led to the side face 101*b* of the multilayer body 101 formed with the first terminal electrode 103C, and has one end electrically connected to the first terminal electrode 103C. Each lead conductor 164D extends so as to be led to the side face 101*b* of the multilayer body 101 formed with the first terminal electrode 103D, and has one end electrically connected to the first terminal electrode 103D.

Each lead conductor 165A extends so as to be led to the side face 101*a* of the multilayer body 101 formed with the second terminal electrode 105A, and has one end electrically connected to the second terminal electrode 105A. Each lead conductor 165B extends so as to be led to the side face 101*a* of the multilayer body 101 formed with the second terminal electrode 105B, and has one end electrically connected to the second terminal electrode 105B. Each lead conductor 165C extends so as to be led to the side face 101*b* of the multilayer body 101 formed with the second terminal electrode 105C, and has one end electrically connected to the second terminal electrode 105C. Each lead conductor 165D extends so as to be led to the side face 101*b* of the multilayer body 101 formed with the second terminal electrode 105D, and has one end electrically connected to the second terminal electrode 105D.

Through hole conductors 1138*a* to 1138*d*, 1139*a* to 1139*d* penetrating through the dielectric layer 161 in the thickness direction are formed at respective positions corresponding to the lead conductors 164A to 164D, 165A to 165D in the dielectric layer 161.

The through hole conductor 1138*a* has one end electrically connected to the lead conductor 164A positioned between the dielectric layers 161, 162. The through hole conductor 1138*b* has one end electrically connected to the lead conductor 164B positioned between the dielectric layers 161, 162. The through hole conductor 1138*c* has one end electrically connected to the lead conductor 164C positioned between the dielectric layers 161, 162. The through hole conductor 1138*d* has one end electrically connected to the lead conductor 164D positioned between the dielectric layers 161, 162.

The through hole conductor 1139*a* has one end electrically connected to the lead conductor 165A positioned between the dielectric layers 161, 162, and the other end electrically connected to the lead conductor 1135A positioned between the dielectric layers 1131, 161. The through hole conductor 1139*b* has one end electrically connected to the lead conductor 165B positioned between the dielectric layers 161, 162, and the other end electrically connected to the lead conductor 1135B positioned between the dielectric layers 1131, 161. The through hole conductor 1139*c* has one end electrically connected to the lead conductor 165C positioned between the dielectric layers 161, 162, and the other end electrically connected to the lead conductor 1135C positioned between the dielectric layers 1131, 161. The through hole conductor 1139d has one end electrically connected to the lead conductor 165D positioned between the dielectric layers 161, 162, and the other end electrically connected to the lead conductor 1135D positioned between the dielectric layers 1131, 161.

Through hole conductors 166a to 166d, 167a to 167d penetrating through the dielectric layer 162 in the thickness direction are formed at respective positions corresponding to the lead conductors 164A to 164D, 165A to 165D in the dielectric layer 162.

The through hole conductor 166a has one end electrically connected to the lead conductor 164A positioned between the dielectric layers 161, 162, and the other end electrically connected to the lead conductor 164A positioned between the dielectric layers 162, 163. The through hole conductor 166b has one end electrically connected to the lead conductor 164B positioned between the dielectric layers 161, 162, and the other end electrically connected to the lead conductor 164B positioned between the dielectric layers 162, 163. The through hole conductor 166c has one end electrically connected to the lead conductor 164C positioned between the dielectric layers 161, 162, and the other end electrically connected to the lead conductor 164C positioned between the dielectric layers 162, 163. The through hole conductor 166d has one end electrically connected to the lead conductor 164D positioned between the dielectric layers 161, 162, and the other end electrically connected to the lead conductor 164D positioned between the dielectric layers 162, 163.

The through hole conductor 167a has one end electrically connected to the lead conductor 165A positioned between the dielectric layers 161, 162, and the other end electrically connected to the lead conductor 165A positioned between the dielectric layers 162, 163. The through hole conductor 167b has one end electrically connected to the lead conductor 165B positioned between the dielectric layers 161, 162, and the other end electrically connected to the lead conductor 165B positioned between the dielectric layers 162, 163. The through hole conductor 167c has one end electrically connected to the lead conductor 165C positioned between the dielectric layers 161, 162, and the other end electrically connected to the lead conductor 165C positioned between the dielectric layers 162, 163. The through hole conductor 167d has one end electrically connected to the lead conductor 165D positioned between the dielectric layers 161, 162, and the other end electrically connected to the lead conductor 165D positioned between the dielectric layers 162, 163.

Through hole conductors 168a to 168d, 169a to 169d penetrating through the dielectric layer 163 in the thickness direction are formed at respective positions corresponding to the lead conductors 164A to 164D, 165A to 165D in the dielectric layer 163.

The through hole conductor 168a has one end electrically connected to the second terminal conductor portion 1303A of the first terminal electrode 103A, and the other end electrically connected to the lead conductor 164A positioned between the dielectric layers 162, 163. The through hole conductor 168b has one end electrically connected to the second terminal conductor portion 1303B of the first terminal electrode 103B, and the other end electrically connected to the lead conductor 164A positioned between the dielectric layers 162, 163. The through hole conductor 168c has one end electrically connected to the second terminal conductor portion 1303B of the first terminal electrode 103C, and the other end electrically connected to the lead conductor 164C positioned between the dielectric layers 162, 163. The through hole conductor 168d has one end electrically connected to the second terminal conductor portion 1303D of the first terminal electrode 103D, and the other end electrically connected to the lead conductor 164D positioned between the dielectric layers 162, 163.

The through hole conductor 169a has one end electrically connected to the second terminal conductor portion 1503A of the second terminal electrode 105A, and the other end electrically connected to the lead conductor 165A positioned between the dielectric layers 162, 163. The through hole conductor 169b has one end electrically connected to the second terminal conductor portion 1503B of the second terminal electrode 105B, and the other end electrically connected to the lead conductor 165B positioned between the dielectric layers 162, 163. The through hole conductor 169c has one end electrically connected to the second terminal conductor portion 1503A of the second terminal electrode 105C, and the other end electrically connected to the lead conductor 165C positioned between the dielectric layers 162, 163. The through hole conductor 169d has one end electrically connected to the second terminal conductor portion 1503D of the second terminal electrode 105D, and the other end electrically connected to the lead conductor 165D positioned between the dielectric layers 162, 163.

When the second inner layer portion 1130 and outer layer portion 160 are laminated, the through hole conductors 1136a, 1138a, 166a, 168a are electrically connected to each other, so as to construct a series of substantially linear through hole conductors 1136a, 1138a, 166a, 168a arranged parallel to the laminating direction. When the outer layer portion 160 and second inner layer portion 1130 are laminated, a series of through hole conductors 1136b, 1138b, 166b, 168b, a series of through hole conductors 1136c, 1138c, 166c, 168c, a series of through hole conductors 1136d, 1138d, 166d, 168d, a series of through hole conductors 1137a, 1139a, 167a, 169a, a series of through hole conductors 1137b, 1139b, 167b, 169b, a series of through hole conductors 1137c, 1139c, 167c, 169c, and a series of through hole conductors 1137d, 1139d, 167d, 169d, which are substantially linear and parallel to the laminating direction, are constructed.

The series of through hole conductors 1136a, 1138a, 166a, 168a penetrate through the outer layer portion 160 and dielectric layer 1131, while having one end physically and electrically connected to the first inner electrode 1141, and the other end physically and electrically connected to the second terminal conductor portion 1303A of the first terminal electrode 103A. The first inner electrode 1141 is positioned closest to the outer layer portion 160 among the first inner electrodes 1121, 141 to 144, 1141. The series of through hole conductors 1136a, 1138a, 166a, 168a are physically and electrically connected to the two lead conductors 164A electrically connected to the first terminal electrode 103A.

Namely, the series of through hole conductors 1136a, 1138a, 166a, 168a and two lead conductors 164 form a conduction path. This conduction path electrically connects three different positions in the first terminal electrode 103A to the first inner electrode 1141 positioned closest to the outer layer portion 160 among the first inner electrodes 1121, 141 to 144, 1141.

The series of through hole conductors 1136b, 1138b, 166b, 168b penetrate through the outer layer portion 160 and dielectric layer 1131, while having one end physically and electrically connected to the first inner electrode 1141, and the other end physically and electrically connected to the second terminal conductor portion 1303B of the first terminal electrode 103B. The series of through hole conductors 1136b, 1138b, 166b, 168b are physically and electrically connected to the two lead conductors 164B electrically connected to the first terminal electrode 103B.

Namely, a conduction path is constructed by the series of through hole conductors 1136b, 1138b, 166b, 168b and two lead conductors 164B. This conduction path electrically connects three different positions in the first terminal electrode 103B to the first inner electrode 1141 positioned closest to the outer layer portion 160 among the first inner electrodes 1121, 141 to 144, 1141.

The series of through hole conductors 1136c, 1138c, 166c, 168c penetrate through the outer layer portion 160 and dielectric layer 1131, while each having one end physically and electrically connected to the first inner electrode 1141, and the other end physically and electrically connected to the second terminal conductor portion 1303C of the first terminal electrode 103C. The series of through hole conductors 1136c, 1138c, 166c, 168c are physically and electrically connected to the two lead conductors 164C electrically connected to the first terminal electrode 103C.

Namely, a conduction path is constructed by the series of through hole conductors 1136c, 1138c, 166c, 168c and two lead conductors 164C. This conduction path electrically connects three different positions in the first terminal electrode 103C to the first inner electrode 1141 positioned closest to the outer layer portion 160 among the first inner electrodes 1121, 141 to 144, 1141.

The series of through hole conductors 1136d, 1138d, 166d, 168d penetrate through the outer layer portion 160 and dielectric layer 1131, while having one end physically and electrically connected to the first inner electrode 1141, and the other end physically and electrically connected to the second terminal conductor portion 1303D of the first terminal electrode 103D. The series of through hole conductors 1136d, 1138d, 166d, 168d are physically and electrically connected to the two lead conductors 164D electrically connected to the first terminal electrode 103D.

Namely, a conduction path is constructed by the series of through hole conductors 1136d, 1138d, 166d, 168d and two lead conductors 164D. This conduction path electrically connects three different positions in the first terminal electrode 103D to the first inner electrode 1141 positioned closest to the outer layer portion 160 among the first inner electrodes 1121, 141 to 144, 1141.

The series of through hole conductors 1137a, 1139a, 167a, 169a penetrate through the outer layer portion 160 and dielectric layer 1131, while having one end physically and electrically connected to the second inner electrode 1142, and the other end physically and electrically connected to the second terminal conductor portion 1503A of the second terminal electrode 105A. The second inner electrode 1142 is positioned closest to the outer layer portion 160 among the second inner electrodes 1122, 151 to 154, 1142. The series of through hole conductors 1137a, 1139a, 167a, 169a are physically and electrically connected to the two lead conductors 165A electrically connected to the second terminal electrode 105A.

Namely, a conduction path is constructed by the series of through hole conductors 1137a, 1139a, 167a, 169a and two lead conductors 165A. This conduction path electrically connects three different positions in the second terminal electrode 105A to the second inner electrode 1142 positioned closest to the outer layer portion 160 among the second inner electrodes 1122, 151 to 154, 1142.

The series of through hole conductors 1137b, 1139b, 167b, 169b penetrate through the outer layer portion 160 and dielectric layer 1131, while having one end physically and electrically connected to the second inner electrode 1142, and the other end physically and electrically connected to the second terminal conductor portion 1503B of the second terminal electrode 105B. The series of through hole conductors 1137b, 1139b, 167b, 169b are physically and electrically connected to the two lead conductors 165B electrically connected to the second terminal electrode 105B.

Namely, a conduction path is constructed by the series of through hole conductors 1137b, 1139b, 167b, 169b and two lead conductors 165B. This conduction path electrically connects three different positions in the second terminal electrode 105B to the second inner electrode 1142 positioned closest to the outer layer portion 160 among the second inner electrodes 1122, 151 to 154, 1142.

The series of through hole conductors 1137d, 1139d, 167d, 169d penetrate through the outer layer portion 160 and dielectric layer 1131, while having one end physically and electrically connected to the second inner electrode 1142, and the other end physically and electrically connected to the second terminal conductor portion 1503D of the second terminal electrode 105D. The series of through hole conductors 1137d, 1139d, 167d, 169d are physically and electrically connected to the two lead conductors 165D electrically connected to the second terminal electrode 105D.

Namely, a conduction path is constructed by the series of through hole conductors 1137d, 1139d, 167d, 169d and two lead conductors 165D. This conduction path electrically connects three different positions in the second terminal electrode 105D to the second inner electrode 1142 positioned closest to the outer layer portion 160 among the second inner electrodes 1122, 151 to 154, 1142.

Figure 17:
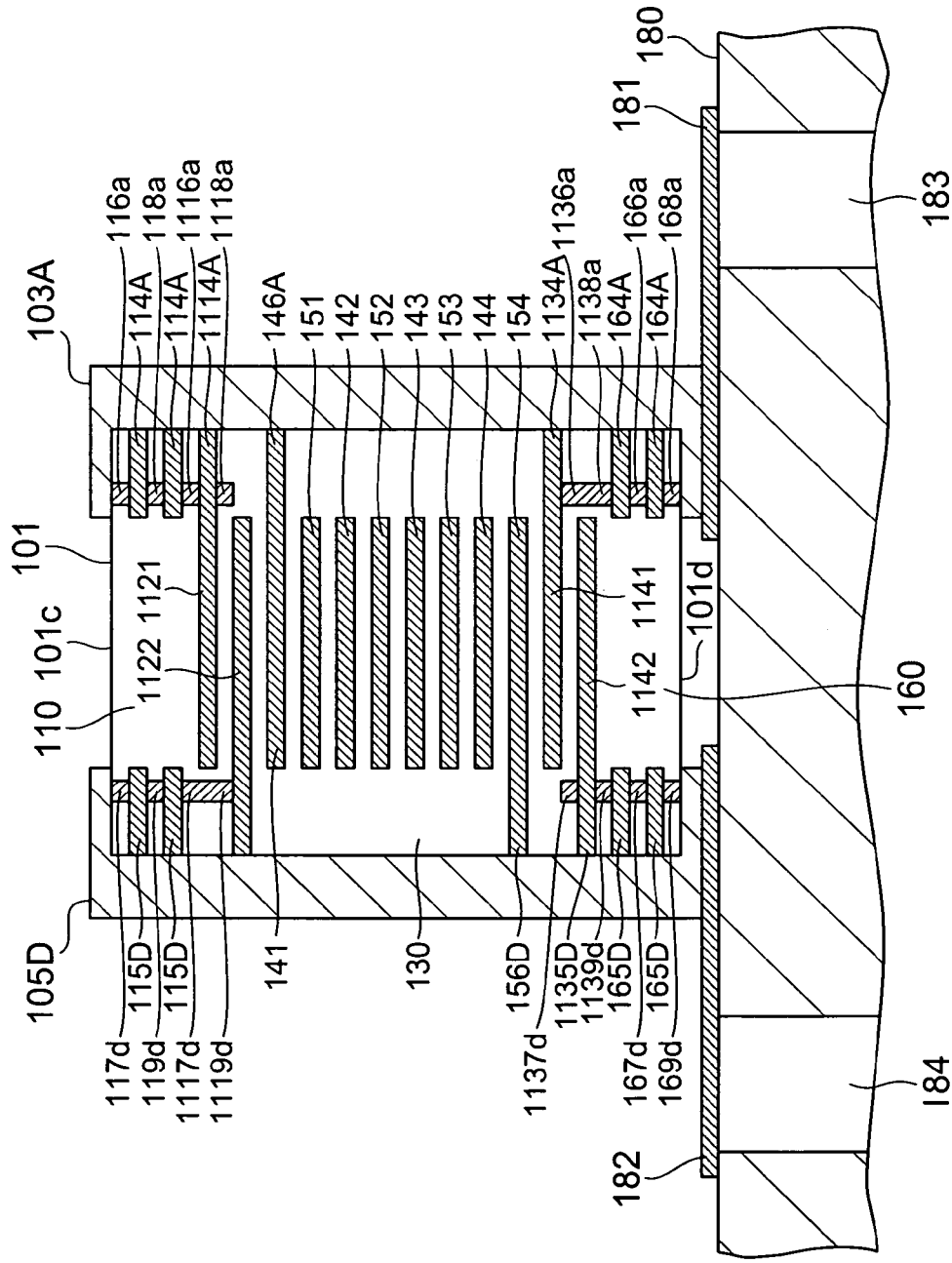
FIG. 17 is a sectional view showing the multilayer capacitor in accordance with the fifth embodiment mounted on a substrate.

With reference to FIG. 17, currents flowing through the multilayer capacitor C101 when the multilayer capacitor C101 is mounted on a substrate will be explained. FIG. 17 is a sectional view, taken along the line III-III of FIG. 15, showing the multilayer capacitor C101 mounted on a substrate 180. The multilayer capacitor C101 is arranged such that the side face 101d thereof opposes the mounting surface of the substrate 180. The outer layer portion 160 is positioned between the inner layer portion 130 of multilayer capacitor C101 and the mounting surface of the substrate 180.

As shown in FIG. 17, the multilayer capacitor C101 is mounted such that the first terminal electrode 103A and second terminal electrode 105D of the multilayer capacitor C101 are connected to an anode land 181 and a cathode land 182 which are formed on the substrate 180, respectively. Leads 183, 184 provided in the substrate are connected to the anode land 181 and cathode land 182, respectively. In FIG. 17, areas corresponding to the dielectric layers 111 to 113, 1111, 1112, 131 to 138, 1131, 161 to 163 and leads 183, 184 are not hatched for easier viewing of the drawing.

The current flowing from the first terminal electrode 103A to the first inner electrode 1121 is shunted into a conduction path including the series of through hole conductors 116a, 118a, 1116a, 1118a and two lead conductors 114A, and the lead conductor 1114A. The current flowing through the conduction path is further shunted into a current flowing through the through hole conductors 116a, 118a, 1116a; a current flowing through the lead conductor 114A and through hole conductors 118a, 1116a; and a current flowing through the lead conductor 114A and through hole conductor 1116a. Namely, currents flow from four positions in the first terminal electrode 103A to the first inner electrode 1121.

The current flowing from the first terminal electrode 103A to the first inner electrode 1141 is shunted into a conduction path including the series of through hole conductors 1136a, 1138a, 166a, 168a and two lead conductors 164A, and the lead conductor 1134A. The current flowing through this conduction path is further shunted into a current flowing through the through hole conductors 168a, 166a, 1138a, 1136a; a current flowing through the lead conductor 164A and through hole conductors 166a, 1138a, 1136a; and a current flowing through the lead conductor 164A and through hole conductors 1138a, 1136a. Namely, currents flow from four positions in the first terminal electrode 103A to the first inner electrode 1141. The path of the current flowing through the through hole conductors 168a, 166a, 1138a, 1136a is shorter than the path of the current flowing through the first terminal conductor portion 1301A of the first terminal electrode 103A and the lead conductor 1134A into the first inner electrode 1141.

The current flowing from the second inner electrode 1122 to the second terminal electrode 105D is shunted into a conduction path including the series of through hole conductors 117d, 119d, 1117d, 1119d and two lead conductors 115D, and the lead conductor 1115D. The current flowing through the conduction path is further shunted into a current flowing through the through hole conductors 1119d, 1117d, 119d, 117d; a current flowing through the through hole conductors 1119d, 1117d, 119d and lead conductor 115D; and a current flowing through the through hole conductors 1119d, 1117d and lead conductor 115D. Namely, currents flow from the second inner electrode 1122 to four positions in the second terminal electrode 105D.

The current flowing from the second inner electrode 1142 to the second terminal electrode 105D is shunted into a conduction path including the series of through hole conductors 1137d, 1139d, 167d, 169d and two lead conductors 165D, and the lead conductor 1135D. The current flowing through the conduction path is further shunted into a current flowing through the through hole conductors 1139d, 167d, 169d; a current flowing through the through hole conductor 1139d and lead conductor 165D; a current flowing through the through hole conductors 1139d, 167d and lead conductor 165D. Namely, currents flow from the second inner electrode 1142 to four positions in the second terminal electrode 105D. The path of the current flowing through the through hole conductors 1139d, 167d, 169d is shorter than the path of the current flowing from the second inner electrode 1142 into the second terminal electrode 105D through the lead conductor 1135D.

Currents flowing from the other first terminal electrodes 103B to 103D, whose cross sections are not depicted, into the first inner electrodes 1121, 1141 and currents flowing from the other second inner electrodes 1122, 1142 into the second terminal electrodes 105B to 105D, whose cross sections are not depicted, are shunted by conduction paths as in the foregoing.

The current flowing from the first terminal electrode 103B to the first inner electrode 1121 is shunted into a conduction path including the series of through hole conductors 116b, 118b, 1116b, 1118b and two lead conductors 114B, and the lead conductor 1114B. Namely, currents flow from four positions in the first terminal electrode 103B to the first inner electrode 1121. The current flowing from the first terminal electrode 103B to the first inner electrode 1141 is shunted into the lead conductor 1134B and a conduction path including the series of through hole conductors 1136b, 1138b, 166b, 168b and two lead conductors 164B. Namely, currents flow from four positions in the first terminal electrode 103B to the first inner electrode 1141.

The current flowing from the first terminal electrode 103C to the first inner electrode 1121 is shunted into a conduction path including the series of through hole conductors 116c, 118c, 1116c, 1118c and two lead conductors 114C, and the lead conductor 1114C. Namely, currents flow from four positions in the first terminal electrode 103C to the first inner electrode 1121. The current flowing from the first terminal electrode 103C to the first inner electrode 1141 is shunted into the lead conductor 1134C and a conduction path including the series of through hole conductors 1136c, 1138c, 166c, 168c and two lead conductors 164C. Namely, currents flow from four positions in the first terminal electrode 103C to the first inner electrode 1141.

The current flowing from the first terminal electrode 103D to the first inner electrode 1121 is shunted into a conduction path including the series of through hole conductors 116d, 118d, 1116d, 1118d and two lead conductors 114D, and the lead conductor 1114D. Namely, currents flow from four positions in the first terminal electrode 103D to the first inner electrode 1121. The current flowing from the first terminal electrode 103D to the first inner electrode 1141 is shunted into the lead conductor 1134D and a conduction path including the series of through hole conductors 1136d, 1138d, 166d, 168d and two lead conductors 164D. Namely, currents flow from four positions in the first terminal electrode 103D to the first inner electrode 1141.

The current flowing from the second inner electrode 1122 to the second terminal electrode 105A is shunted into a conduction path including the series of through hole conductors 117a, 119a, 1117a, 1119a and two lead conductors 115A, and the lead conductor 1115A. Namely, currents flow from the second inner electrode 1122 to four positions in the second terminal electrode 105A. The current flowing from the second inner electrode 1142 to the second terminal electrode 105A is shunted into a conduction path including the series of through hole conductors 1137a, 1139a, 167a, 169a and two lead conductors 165A, and the lead conductor 1135A. Namely, currents flow from the second inner electrode 1142 to four positions in the second terminal electrode 105A.

The current flowing from the second inner electrode 1122 to the second terminal electrode 105B is shunted into a conduction path including the series of through hole conductors 117b, 119b, 1117b, 1119b and two lead conductors 115B, and the lead conductor 1115B. Namely, currents flow from the second inner electrode 1122 to four positions in the second terminal electrode 105B. The current flowing from the second inner electrode 1142 to the second terminal electrode 105B is shunted into a conduction path including the series of through hole conductors 1137b, 1139b, 167b, 169b and two lead conductors 165B, and the lead conductor 1135B. Namely, currents flow from the second inner electrode 1142 to four positions in the second terminal electrode 105B.

The current flowing from the second inner electrode 1122 to the second terminal electrode 105C is shunted into a conduction path including the series of through hole conductors 117c, 119c, 1117c, 1119c and two lead conductors 115C, and the lead conductor 1115C. Namely, currents flow from the second inner electrode 1122 to four positions in the second terminal electrode 105C. The current flowing from the second inner electrode 1142 to the second terminal electrode 105C is shunted into a conduction path including the series of through hole conductors 1137c, 1139c, 167c, 169c and two lead conductors 165C, and the lead conductor 1135C. Namely, currents flow from the second inner electrode 1142 to four positions in the second terminal electrode 105C.

The current flowing from the second inner electrode 1122 to the second terminal electrode 105D is shunted into a conduction path including the series of through hole conductors 117d, 119d, 1117d, 1119d and two lead conductors 115D, and the lead conductor 1115D. Namely, currents flow from the second inner electrode 1122 to four positions in the second terminal electrode 105D. The current flowing from the second inner electrode 1142 to the second terminal electrode 105D is shunted into a conduction path including the series of through hole conductors 1137d, 1139d, 167d, 169d and two lead conductors 165D, and the lead conductor 1135D. Namely, currents flow from the second inner electrode 1142 to four positions in the second terminal electrode 105D.

In the multilayer capacitor C101, as explained in the foregoing, conduction paths electrically connecting the first inner electrode 1121 to the first terminal electrodes 103A to 103D through the lead conductors 114A to 114D are formed. Therefore, currents flowing between the first terminal electrodes 103A to 103D and the first inner electrode 1121 are shunted into fractions flowing through the lead conductors 146A to 146D and fractions flowing through the above-mentioned conduction paths. In the multilayer capacitor C101, conduction paths electrically connecting the first inner electrode 1141 to the first terminal electrodes 103A to 103D through the lead conductors 164A to 164D are formed. Therefore, currents flowing between the first terminal electrodes 103A to 103D and the first inner electrode 1141 are shunted into fractions flowing through the lead conductors 146A to 146D and fractions flowing through the above-mentioned conduction paths. Consequently, the equivalent series inductance can be lowered.

Also, in the multilayer capacitor C101, conduction paths electrically connecting the second inner electrode 1122 to the second terminal electrodes 105A to 105D through the lead conductors 115A to 115D are formed. Therefore, currents flowing between the second inner electrode 1122 and the second terminal electrodes 105A to 105D are shunted into fractions flowing through the lead conductors 156A to 156D and fractions flowing through the above-mentioned conduction paths. In the multilayer capacitor C101, conduction paths electrically connecting the second inner electrode 1142 to the second terminal electrodes 105A to 105D through the lead conductors 165A to 165D are formed. Therefore, currents flowing between the second inner electrode 1142 and the second terminal electrodes 105A to 105D are shunted into fractions flowing through the lead conductors 156A to 156D and fractions flowing through the above-mentioned conduction paths. Consequently, the equivalent series inductance can further be lowered.

Each conduction path formed in the outer layer portion 110 is electrically connected to the first inner electrode 1121 positioned closest to the outer layer portion 110 in the first inner electrodes or the second inner electrode 1122 positioned closest to the outer layer portion 110 in the second inner electrodes. Consequently, the line length of each conduction path formed in the outer layer portion 110 can be made relatively short. Each conduction path formed in the outer layer portion 160 is electrically connected to the first inner electrode 1141 positioned closest to the outer layer portion 160 in the first inner electrodes or the second inner electrode 1142 positioned closest to the outer layer portion 160 in the second inner electrodes. Consequently, the line length of each conduction path formed in the outer layer portion 160 can be made relatively short. As a result, the equivalent series inductance generated in each conduction path can be suppressed.

Meanwhile, through hole conductors constituting each conduction path is made by forming an opening penetrating through each dielectric layer and then filling it with conductor paste. This opening is formed for each dielectric layer. In the multilayer capacitor C101 in accordance with this embodiment, it will be sufficient if only the dielectric layers 111, 112, 113, 1111, 1131, 161, 162, 163 are formed with the openings.

Therefore, the multilayer capacitor C101 is simple to form conduction paths and can attain a structure which is relatively easy to manufacture.

The conduction paths physically and electrically connect their corresponding first terminal conductor portions 1302A to 1302D, 1303A to 1303D of the first terminal electrodes 103A to 103D to the first inner electrodes 1121, 1141, or their corresponding second terminal conductor portions 1502A to 1502D, 1503A to 1503D of the second terminal electrodes 105A to 105D to the second inner electrodes 1122, 1142. Consequently, each conduction path becomes shorter. Therefore, the equivalent series inductance generated in the conduction paths can further be lowered.

The dielectric layers 111, 112, 113, 1111, 1131, 161, 162, 163 are formed with the through hole conductors 116a to 116d, 117a to 117d, 118a to 118d, 119a to 119d, 1116a to 1116d, 1117a to 1117d, 1118a to 1118d, 1119a to 1119d, 1136a to 1136d, 1137a to 1137d, 1138a to 1138d, 1139a to 1139d, 166a to 166d, 167a to 167d, 168a to 168d, 169a to 169d. Consequently, the through hole conductors 115a to 116d, 117a to 117d, 118a to 118d, 119a to 119d, 1116a to 1116d, 1117a to 1117d, 1118a to 1118d, 1119a to 1119d, 1136a to 1136d, 1137a to 1137d, 1138a to 1138d, 1139a to 1139d, 166a to 166d, 167a to 167d, 168a to 168d, 169a to 169d are simple to form and can attain a structure which is relatively easy to manufacture.

The above-mentioned conduction paths include the lead conductors 114A to 114D, 115A to 115D, 164A to 164D, 165A to 165D. The lead conductors 114A to 114D, 115A to 115D, 164A to 164D, 165A to 165D electrically connect their corresponding first terminal electrodes 103A to 103D or second terminal electrodes 105A to 105D to their corresponding through hole conductors 116a to 116d, 117a to 117d, 118a to 118d, 119a to 119d, 1116a to 1116d, 1117a to 1117d, 1118a to 1118d, 1119a to 1119d, 1136a to 1136d, 1137a to 1137d, 1138a to 1138d, 1139a to 1139d, 166a to 166d, 167a to 167d, 168a to 168d, 169a to 169d. Consequently, currents are shunted into the lead conductors 114A to 114D, 115A to 115D, 164A to 164D, 165A to 165D, whereby the equivalent series inductance can further be lowered.

For each of the series of through hole conductors 116a, 118a, 1116a, 1118a, the series of through hole conductors 116b, 118b, 1116b, 1118b, the series of through hole conductors 116c, 118c, 1116c, 1118c, the series of through hole conductors 116d, 118d, 1116d, 1118d, the series of through hole conductors 117a, 119a, 1117a, 1119a, the series of through hole conductors 117b, 119b, 1117b, 1119b, the series of through hole conductors 117c, 119c, 1117c, 1119c, the series of through hole conductors 117d, 119d, 1117d, 1119d, the series of through hole conductors 166a, 168a, 1136a, 1136a, the series of through hole conductors 166b, 168b, 1136b, 1136b, the series of through hole conductors 166c, 168c, 1136c, 1136c, the series of through hole conductors 166d, 168d, 1136d, 1136d, the series of through hole conductors 167a, 169a, 1137a, 1139a, the series of through hole conductors 167b, 169b, 1137b, 1139b, the series of through hole conductors 167c, 169c, 1137c, 1139c, and the series of through hole conductors 167d, 169d, 1137d, 1139d, the above-mentioned conduction paths have a plurality of corresponding lead conductors 114A to 114D, 115A to 115D, 164A to 164D, 165A to 165D, so that a greater number of shunt paths are formed. As a result, the equivalent series inductance can further be lowered.

In the multilayer capacitor C101, the first terminal electrodes 103A to 103D are alternately arranged with the second terminal electrodes 105A to 105D. When the first terminal electrodes 103A to 103D and the second terminal electrodes 105A to 105D have polarities opposite to each other, respective currents flowing through the adjacent lead conductors 114A to 114D, 115A to 115D, 1114A to 1114D, 1115A to 1115D, 146A to 146D, 156A to 156D, 1134A to 1134D, 1135A to 1135D, 164A to 164D, 165A to 165D are directed opposite to each other. Consequently, magnetic fields generated by the lead conductors 114A to 114D, 115A to 115D, 1114A to 1114D, 1115A to 1115D, 146A to 146D, 156A to 156D, 1134A to 1134D, 1135A to 1135D, 164A to 164D, 165A to 165D cancel each other out. As a result, the multilayer capacitor C101 further lowers the equivalent series inductance.

Figure 18:
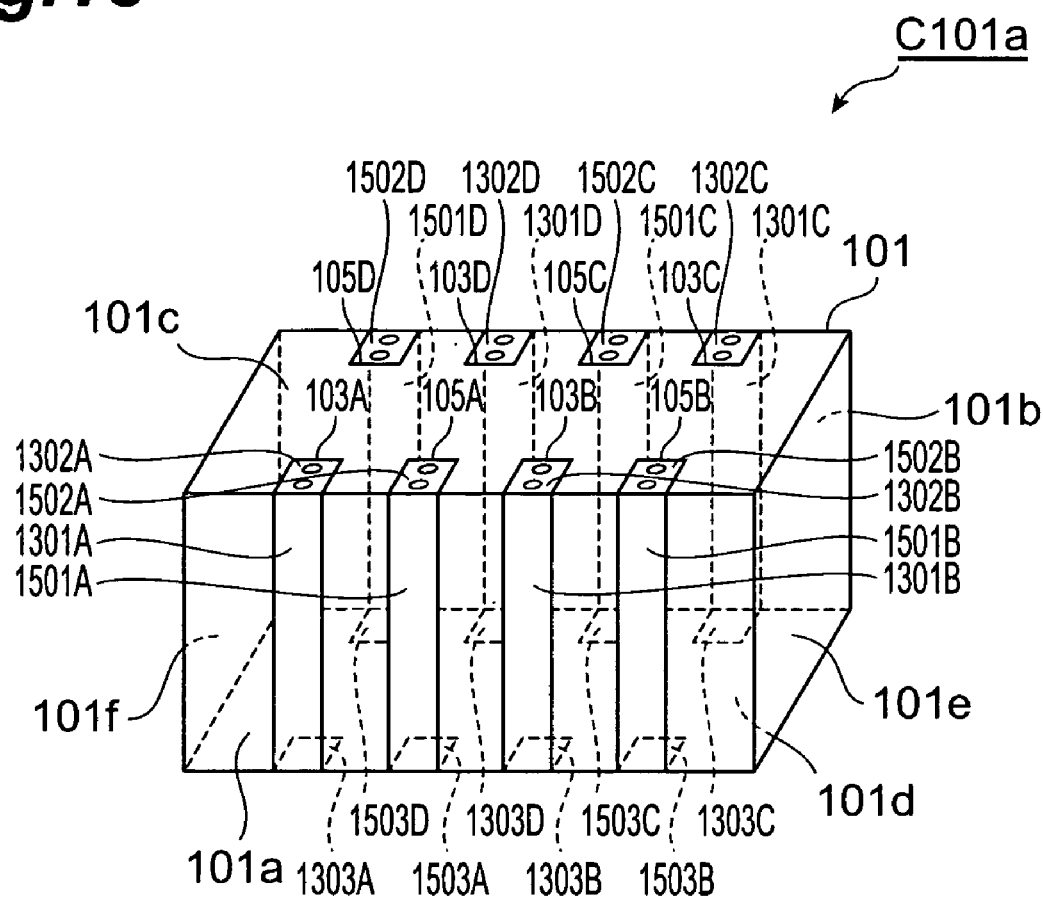
FIG. 18 is a perspective view showing a modified example of the multilayer capacitor in accordance with the fifth embodiment.
Figure 19:
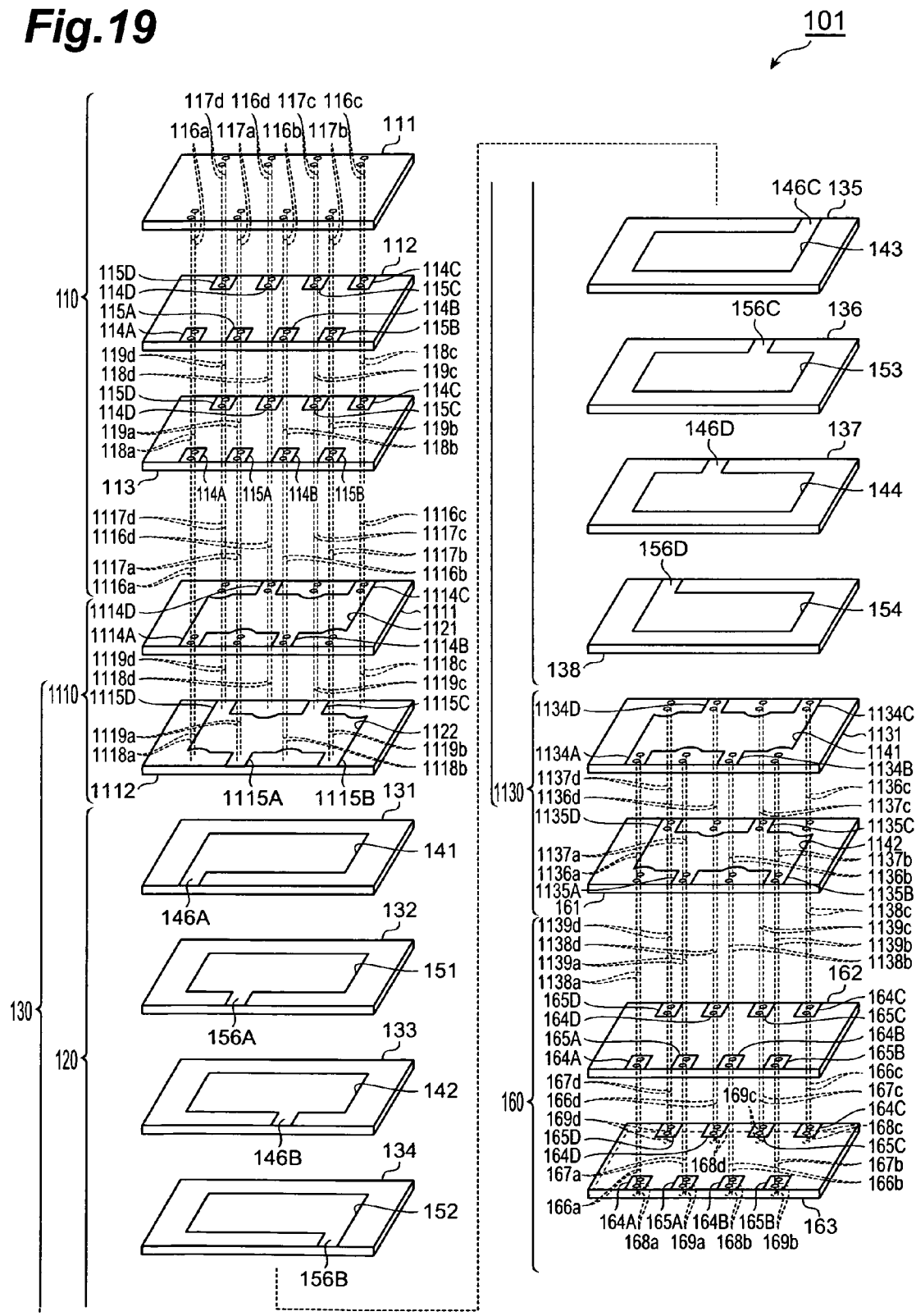
FIG. 19 is an exploded perspective view of the multilayer body included in the modified example of the multilayer capacitor in accordance with the fifth embodiment.

With reference to FIGS. 18 and 19, a modified example of the multilayer capacitor C101 in accordance with the fifth embodiment will be explained. FIG. 18 is a perspective view showing the modified example of the multilayer capacitor in accordance with the fifth embodiment. FIG. 19 is an exploded perspective view of the multilayer body included in the modified example of the multilayer capacitor in accordance with the fifth embodiment. Differences between the multilayer capacitor C101 and its modified example represented by a multilayer capacitor C101a will now be explained.

The multilayer capacitor C101a comprises a plurality of (2 in this modified example) through hole conductors 116a penetrating through the dielectric layer 111 so as to be physically and electrically connected to the lead conductor 114A. The two through hole conductors 116a are formed parallel to each other. Similarly, the multilayer capacitor C101a comprises two each of through hole conductors 116b to 116d, 117a to 117d, 118a to 118d, 119a to 119d, 1116a to 1116d, 1117a to 1117d, 1118a to 1118d, 1119a to 1119d, 166a to 166d, 167a to 167d, 168a to 168d, 169a to 169d, 1136b to 1136d, 1137a to 1137d, 1138a to 1138d, 1139a to 1139d penetrating through their corresponding dielectric layers 111, 112, 113, 1111, 1131, 161, 162, 163 so as to be electrically and physically connected to their corresponding lead conductors 114A to 114D, 115A to 115D, 164A to 164D, 165A to 165D.

Therefore, the conduction paths included in the multilayer capacitor C101a have respective two sets of a series of through hole conductors 116a, 118a, 1116a, 1118a, a series of through hole conductors 116b, 118b, 1116b, 1118b, a series of through hole conductors 116c, 118c, 1116c, 1118c, a series of through hole conductors 116d, 118d, 1116d, 1118d, a series of through hole conductors 117a, 119a, 1117a, 1119a, a series of through hole conductors 117b, 119b, 1117b, 1119b, a series of through hole conductors 117c, 119c, 1117c, 1119c, a series of through hole conductors 117d, 119d, 1117d, 1119d, a series of through hole conductors 166a, 168a, 1136a, 1138a, a series of through hole conductors 166b, 168b, 1136b, 1138b, a series of through hole conductors 166c, 168c, 1136c, 1138c, a series of through hole conductors 166d, 168d, 1136d, 1138d, a series of through hole conductors 167a, 169a, 1137a, 1139a, a series of through hole conductors 167b, 169b, 1137b, 1139b, a series of through hole conductors 167c, 169c, 1137c, 1139c, and a series of through hole conductors 167d, 169d, 1137d, 1139d which are physically and electrically connected to the lead conductors 114A to 114D, 115A to 115D, 164A to 164D, 165A to 165D. A pair of the series of through hole conductors in each conduction path are formed parallel to each other.

Since each conduction path has a plurality of sets of the series of through hole conductors 116a, 118a, 1116a, 1118a, the series of through hole conductors 116b, 118b, 1116b, 1118b, the series of through hole conductors 116c, 118c, 1116c, 1118c, the series of through hole conductors 116d, 118d, 1116d, 1118d, the series of through hole conductors 117a, 119a, 1117a, 1119a, the series of through hole conductors 117b, 119b, 1117b, 1119b, the series of through hole conductors 117c, 119c, 1117c, 1119c, the series of through hole conductors 117d, 119d, 1117d, 1119d, the series of through hole conductors 166a, 168a, 1136a, 1138a, the series of through hole conductors 166b, 168b, 1136b, 1138b, the series of through hole conductors 166c, 168c, 1136c, 1138c, the series of through hole conductors 166d, 168d, 1136d, 1138d, the series of through hole conductors 167a, 169a, 1137a, 1139a, the series of through hole conductors 167b, 169b, 1137b, 1139b, the series of through hole conductors 167c, 169c, 1137c, 1139c, and the series of through hole conductors 167d, 169d, 1137d, 1139d as such, a greater number of shunt paths are formed, whereby the equivalent series inductance can further be lowered. Each conduction path may be provided with two or more of the series of through hole conductors 116a, 118a, 1116a, 1118a, the series of through hole conductors 116b, 118b, 1116b, 1118b, the series of through hole conductors 116c, 118c, 1116c, 1118c, the series of through hole conductors 116d, 118d, 1116d, 1118d, the series of through hole conductors 117a, 119a, 1117a, 1119a, the series of through hole conductors 117b, 119b, 1117b, 1119b, the series of through hole conductors 117c, 119c, 1117c, 1119c, the series of through hole conductors 117d, 119d, 1117d, 1119d, the series of through hole conductors 166a, 168a, 1136a, 1138a, the series of through hole conductors 166b, 168b, 1136b, 1138b, the series of through hole conductors 166c, 168c, 1136c, 1138c, the series of through hole conductors 166d, 168d, 1136d, 1138d, the series of through hole conductors 167a, 169a, 1137a, 1139a, the series of through hole conductors 167b, 169b, 1137b, 1139b, the series of through hole conductors 167c, 169c, 1137c, 1139c, and the series of through hole conductors 167d, 169d, 1137d, 1139d physically and electrically connected to the lead conductors 114A to 114D, 115A to 115D, 164A to 164D, 165A to 165D formed in the outer layer portions.

Sixth Embodiment

Figure 20:
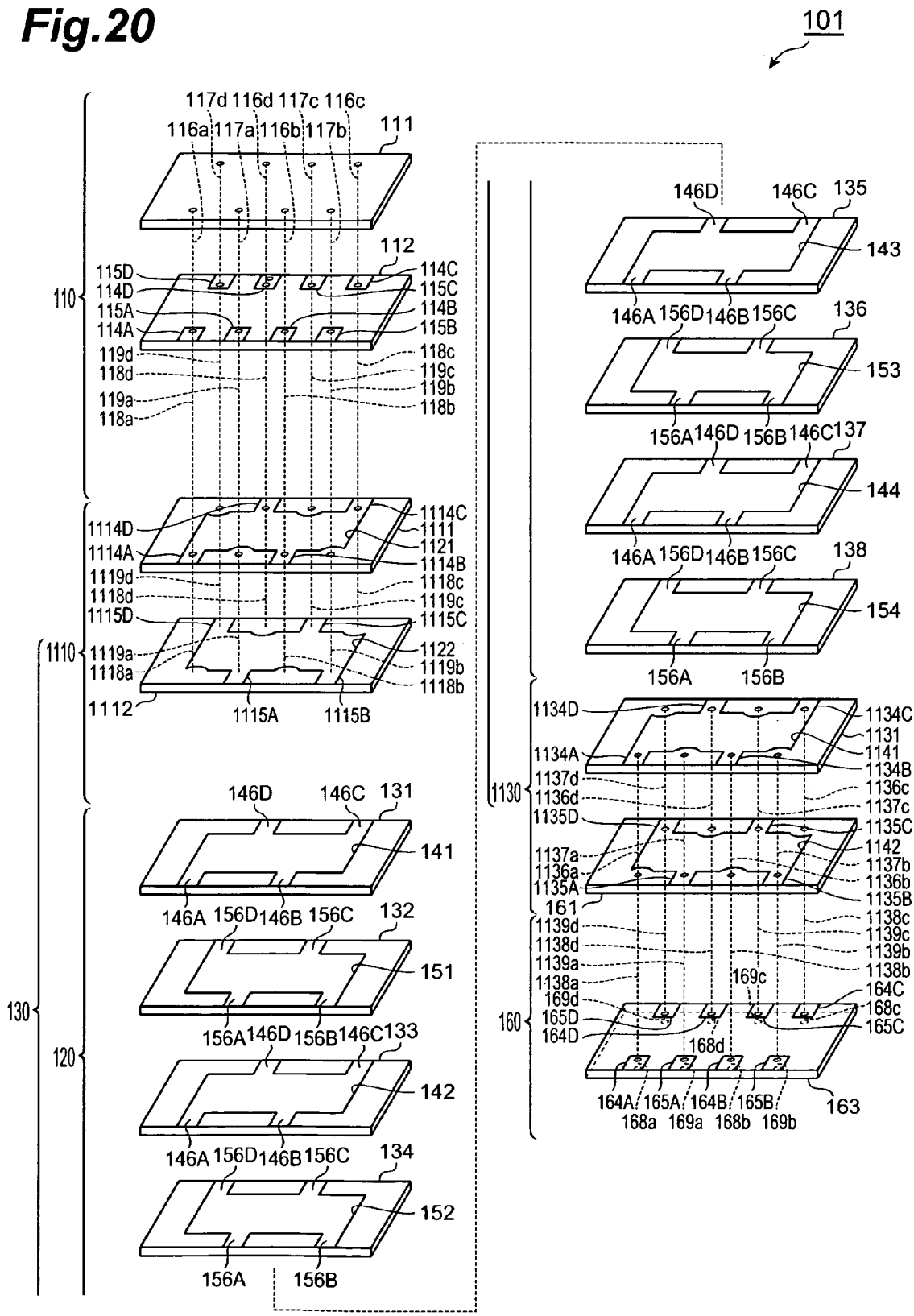
FIG. 20 is an exploded perspective view of the multilayer body included in the multilayer capacitor in accordance with a sixth embodiment.

With reference to FIG. 20, the structure of the multilayer capacitor in accordance with a sixth embodiment will be explained. The multilayer capacitor in accordance with the sixth embodiment differs from the multilayer capacitor C101 in accordance with the fifth embodiment in the following points. In the sixth embodiment, first inner electrodes 141 to 144 are each connected to a plurality of first terminal electrodes 103A to 103D through lead conductors, while second inner electrodes 151 to 154 are each connected to a plurality of second terminal electrodes 105A to 105D through lead conductors. The fifth and sixth embodiments differ from each other in terms of the number of lead conductors 114A to 114D, 115A to 115D, 164A to 164D, 165A to 165D and the number of laminated dielectric layers in the outer layer portions 110, 160. FIG. 20 is an exploded perspective view of the multilayer body included in the multilayer capacitor in accordance with the sixth embodiment.

As with the multilayer capacitor C101 in accordance with the fifth embodiment, the multilayer capacitor in accordance with the sixth embodiment comprises a multilayer body 101, the first terminal electrodes 103A to 103D formed on the multilayer body 101, and the second terminal electrodes 105A to 105D formed on the multilayer body 101, which are not depicted. The terminal electrodes 103A to 103D, 105A to 105D include first terminal conductor portions 1301A to 1301D, 1501A to 1501D, and second terminal conductor portions 1302A to 1302D, 1303A to 1303D, 1502A to 1502D, 1503A to 1503D.

As shown in FIG. 20, the multilayer body 101 includes an inner layer portion 130 and a pair of outer layer portions 110, 160 holding the inner layer portion 130 therebetween.

The outer layer portion 110 is constructed by laminating the lead conductors 114A to 114D, 115A to 115D between a plurality of (2 in this embodiment) dielectric layers 111, 112.

The lead conductors 114A, 114B extend so as to be led to a side face 101a of the multilayer body 101 formed with the first terminal electrodes 103A, 103B, while having respective one ends electrically connected to their corresponding first terminal electrodes 103A, 103B. The lead conductors 115A, 115B extend so as to be led to the side face 101a of the multilayer body 101 formed with the second terminal electrodes 105A, 105B, while having respective one ends electrically connected to their corresponding second terminal electrodes 105A, 105B. The lead conductors 114C, 114D extend so as to be led to a side face 101b of the multilayer body 101 formed with the first terminal electrodes 103C, 103D, while having respective one ends electrically connected to their corresponding first terminal electrodes 103C, 103D. The lead conductors 115C, 115D extend so as to be led to the side face 101b of the multilayer body 101 formed with the second terminal electrodes 105C, 105D, while having respective one ends electrically connected to their corresponding second terminal electrodes 105C, 105D.

Through hole conductors 116a to 116d, 117a to 117d penetrating through the dielectric layer 111 in the thickness direction are formed at respective positions corresponding to the lead conductors 114A to 114D, 115A to 115D in the dielectric layer 111. Through hole conductors 118a to 118d, 119a to 119d penetrating through the dielectric layer 111 in the thickness direction are formed at respective positions corresponding to the lead conductors 114A to 114D, 115A to 115D in the dielectric layer 112. The through hole conductors 116a to 116d have respective one ends electrically connected to their corresponding second terminal conductor portions 1302A to 1302D of the first terminal electrodes 103A to 103D, and the respective other ends electrically connected to the lead conductors 114A to 114D positioned between the dielectric layers 111, 112. The through hole conductors 117a to 117d have respective one ends electrically connected to their corresponding second terminal conductor portions 1502A to 1502D of the second terminal electrodes 105A to 105D, and the respective other ends electrically connected to the lead conductors 115A to 115D positioned between the dielectric layers 111, 112. The through hole conductors 118a to 118d, 119a to 119d have respective one end electrically connected to the lead conductors 114A to 114D, 115A to 115D positioned between the dielectric layers 111, 112.

The second inner layer portion 1110 of the multilayer body 101 included in the multilayer capacitor in accordance with the sixth embodiment has the same structure as that of the second inner layer portion 1110 included in the multilayer body 101 in accordance with the fifth embodiment except for the following point. Lead conductors 1114A to 1114D are electrically connected to respective one ends of the through hole conductors 118a to 118d.

Therefore, when the outer layer portion 110 and the dielectric layers 1111, 1112 are laminated, a series of through hole conductors 116a, 118a, 1118a, a series of through hole conductors 116b, 118b, 1118b, a series of through hole conductors 116c, 118c, 1118c, a series of through hole conductors 116d, 118d, 1118d, a series of through hole conductors 117a, 119a, 1119a, a series of through hole conductors 117b, 119b, 1119b, a series of through hole conductors 117c, 119c, 1119c, and a series of through hole conductors 117d, 119d, 1119d are formed. These series of through hole conductors cooperate with their corresponding lead conductors 114A to 114D, 115A to 115D, so as to form eight conduction paths in the outer layer portion 110.

Each conduction path electrically connects two different positions in its corresponding first or second terminal electrodes 103A to 103D, 105A to 105D to its corresponding first inner electrode 1121 or second inner electrode 1142.

As is also shown in FIG. 20, the inner layer portion 120 is constructed by alternately laminating a plurality of (8 in this embodiment) dielectric layers 131 to 138 with a plurality of (4 each in this embodiment) first and second inner electrodes 141 to 144, 151 to 154. In the actual multilayer capacitor in accordance with the sixth embodiment, the dielectric layers 131 to 138 are integrated to such an extent that their boundaries are indiscernible.

Each of the first inner electrodes 141 to 144 has a substantially rectangular form. The first inner electrodes 141 to 144 are formed at respective positions separated by predetermined distances from side faces parallel to the laminating direction in the multilayer body 101.

Each of the first inner electrodes 141 to 144 is electrically connected to respective first terminal conductor portions of a plurality of first terminal electrodes 103A to 103D through lead conductors 146A to 146D. The lead conductors 146A, 146B are integrally formed with the first inner electrodes 141 to 144, and extend therefrom so as to reach the side face 101a of the multilayer body 101. The lead conductors 146C, 146D are integrally formed with the first inner electrodes 141 to 144, and extend therefrom so as to reach the side face 101b of the multilayer body 101.

Each of the second inner electrodes 151 to 154 has a substantially rectangular form. The first inner electrodes 151 to 154 are formed at respective positions separated by predetermined distances from side faces parallel to the laminating direction in the multilayer body 101.

Each of the second inner electrodes 151 to 154 is electrically connected to respective first terminal conductor portions of a plurality of second terminal electrodes 105A to 105D through lead conductors 156A to 156D. The lead conductors 156A, 156B are integrally formed with the second inner electrodes 151 to 154, and extend therefrom so as to reach the side face 101a of the multilayer body 101. The lead conductors 156C, 156D are integrally formed with the second inner electrodes 151 to 154, and extend therefrom so as to reach the side face 101b of the multilayer body 101.

The second inner layer portion 1130 of the multilayer body 101 included in the multilayer capacitor in accordance with the sixth embodiment has the same structure as that of the second inner layer portion 1130 included in the multilayer body 101 in accordance with the fifth embodiment.

The outer layer portion 160 is constructed by laminating the lead conductors 164A to 164D, 165A to 165D between a plurality of (2 in this embodiment) dielectric layers 161, 163.

The lead conductors 164A, 164B extend so as to be led to the side face 101a of the multilayer body 101 formed with the first terminal electrodes 103A, 103B, while having respective one ends electrically connected to their corresponding first terminal electrodes 103A, 103B. The lead conductors 165A, 165B extend so as to be led to the side face 101a of the multilayer body 101 formed with the second terminal electrodes 105A, 105B, while having respective one ends electrically connected to their corresponding second terminal electrodes 105A, 105B. The lead conductors 164C, 164D extend so as to be led to the side face 101b of the multilayer body 101 formed with the first terminal electrodes 103C, 103D, while having respective one ends electrically connected to their corresponding first terminal electrodes 103C, 103D. The lead conductors 165C, 165D extend so as to be led to the side face 101b of the multilayer body 101 formed with the second terminal electrodes 105C, 105D, while having respective one ends electrically connected to their corresponding second terminal electrodes 105C, 105D.

Through hole conductors 1138a to 1138d, 1139a to 1139d penetrating through the dielectric layer 161 in the thickness direction are formed at respective positions corresponding to the lead conductors 164A to 164D, 165A to 165D in the dielectric layer 161. Through hole conductors 168a to 168d, 169a to 169d penetrating through the dielectric layer 163 in the thickness direction are formed at respective positions corresponding to the lead conductors 165A to 165D in the dielectric layer 163.

The through hole conductors 1138a to 1138d have respective one ends electrically connected to their corresponding lead conductors 164A to 164D positioned between the dielectric layers 161, 163. The through hole conductors 1139a to 1139d have respective one ends electrically connected to their corresponding lead conductors 1135A to 1135D, and the respective other ends electrically connected to the lead conductors 165A to 165D. The through hole conductors 168a to 168d, 169a to 169d have respective one ends electrically connected to their corresponding second terminal conductor portions 1303A to 1303D of the first terminal electrodes 103A to 103D and second terminal conductor portions 1503A to 1503D of the second terminal electrodes 105A to 105D, and the respective other ends electrically connected to their corresponding lead conductors 164A to 164D, 165A to 165D positioned between the dielectric layers 161, 163.

Therefore, when the dielectric layers 1131, 161, 163 are laminated, a series of through hole conductors 1136a, 1138a, 168a, a series of through hole conductors 1136b, 1138b, 168b, a series of through hole conductors 1136c, 1138c, 168c, a series of through hole conductors 1136d, 1138d, 168d, a series of through hole conductors 1137a, 1139a, 169a, a series of through hole conductors 1137b, 1139b, 169b, a series of through hole conductors 1137c, 1139c, 169c, and a series of through hole conductors 1137d, 1139d, 169d are formed. The series of through hole conductors 1136a, 1138a, 168a, the series of through hole conductors 1136b, 1138b, 168b, the series of through hole conductors 1136c, 1138c, 168c, the series of through hole conductors 1136d, 1138d, 168d, the series of through hole conductors 1137a, 1139a, 169a, the series of through hole conductors 1137b, 1139b, 169b, the series of through hole conductors 1137c, 1139c, 169c, and the series of through hole conductors 1137d, 1139d, 169d cooperate with their corresponding lead conductors 164A to 164D, 165A to 165D, so as to form eight conduction paths in the outer layer portion 160.

Each conduction path electrically connects two different positions in its corresponding first or second terminal electrodes 103A to 103D, 105A to 105D to its corresponding first inner electrode 1141 or second inner electrode 1142.

Figure 21:
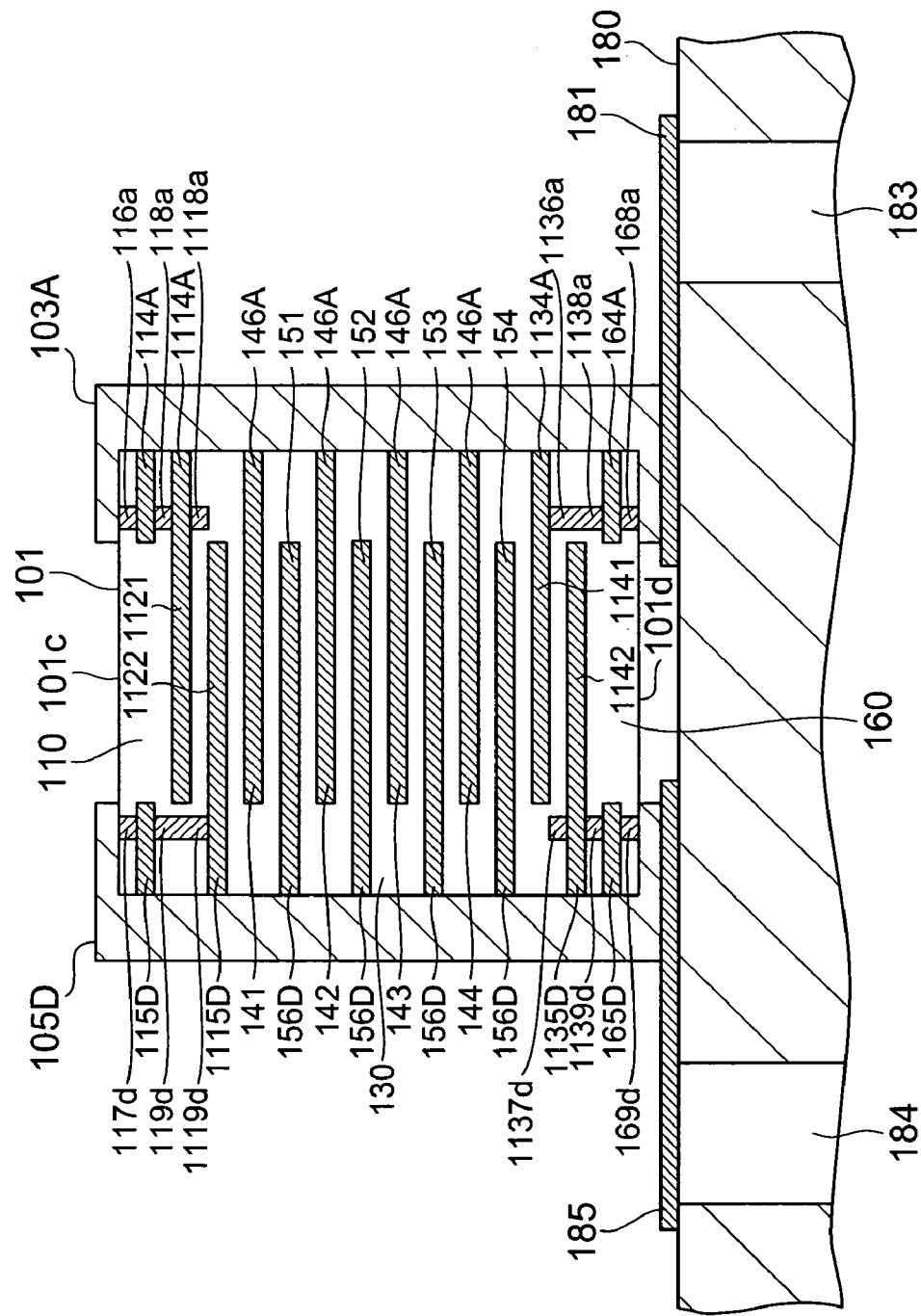
FIG. 21 is a sectional view showing the multilayer capacitor in accordance with the sixth embodiment mounted on a substrate.

FIG. 21 is a sectional view showing the multilayer capacitor in accordance with the sixth embodiment mounted on a substrate 180. The sectional view shown in FIG. 21 is one obtained when the multilayer capacitor in accordance with the sixth embodiment is cut along a line corresponding to the line III-III of FIG. 15. In FIG. 21, areas corresponding to the dielectric layers 111, 112, 1111, 1112, 131 to 137, 1131, 161, 163 and leads 183, 184 are not hatched for easier viewing of the drawing.

The current flowing from the first terminal electrode 103A to the first inner electrode 1121 is shunted into a conduction path including the series of through hole conductors 116a, 118a, 1118a and one lead conductor 114A, and the lead conductor 1114A. The current flowing through the conduction path is further shunted into a current flowing through the through hole conductors 116a, 118a and a current flowing through the lead conductor 114A and through hole conductor 118a. Namely, currents flow from three positions in the first terminal electrode 103A to the first inner electrode 1121.

The current flowing from the first terminal electrode 103A to the first inner electrode 1141 is shunted into a conduction path including the series of through hole conductors 1136a, 1138a, 168a and one lead conductor 164A, and the lead conductor 1134A. The current flowing through the conduction path is further shunted into a current flowing through the through hole conductors 168a, 1138a, 1136a and a current flowing through the lead conductor 164A and through hole conductors 138a, 1136a. Namely, currents flow from three positions in the first terminal electrode 103A to the first inner electrode 1141. The path of the current flowing through the through hole conductors 168a, 1138a, 1136a is shorter than the path of the current flowing through the lead conductor 1134A to the first inner electrode 1141.

The current flowing from the second inner electrode 1122 to the second terminal electrode 105D is shunted into a conduction path including the series of through hole conductors 117d, 119d, 1119d and one lead conductor 115D, and the lead conductor 1115D. The current flowing through the conduction path is further shunted into a current flowing through the through hole conductors 1119d, 119d, 117d and a current flowing through the through hole conductors 1119d, 119d and lead conductor 115D. Namely, currents flow from the second inner electrode 1122 to three positions in the second terminal electrode 105D.

The current flowing from the second inner electrode 1142 to the second terminal electrode 105D is shunted into a conduction path including the series of through hole conductors 1137d, 1139d, 169d and two lead conductors 165D, and the lead conductor 1135D. The current flowing through the conduction path is further shunted into a current flowing through the through hole conductors 1139d, 169d and a current flowing through the through hole conductor 1139d and lead conductor 165D. Namely, currents flow from the second inner electrode 1142 to three positions in the second terminal electrode 105D. The path of the current flowing through the through hole conductors 1139d, 169d is shorter than the path of the current flowing from the first inner electrode 1142 to the second terminal electrode 105D through the lead conductor 1135D.

Currents flowing from the first terminal electrodes 103B to 103D, whose cross sections are not depicted, into the first inner electrodes 1121, 1141 and currents flowing from the second inner electrodes 1122, 1142 into the second terminal electrodes 105B to 105D, whose cross sections are not depicted, are shunted by conduction paths as in the foregoing.

In the multilayer capacitor in accordance with the sixth embodiment, as explained in the foregoing, conduction paths electrically connecting the first inner electrode 1121 to the first terminal electrodes 103A to 103D through the lead conductors 114A to 114D are formed. Therefore, currents flowing between the first terminal electrodes 103A to 103D and the first inner electrode 1121 are shunted into fractions flowing through the lead conductors 146A to 146D and fractions flowing through the above-mentioned conduction paths. In the multilayer capacitor in accordance with the sixth embodiment, conduction paths electrically connecting the first inner electrode 1141 to the first terminal electrodes 103A to 103D through the lead conductors 164A to 164D are formed. Therefore, currents flowing between the first terminal electrodes 103A to 103D and the first inner electrode 1141 are shunted into fractions flowing through the lead conductors 146A to 146D and fractions flowing through the above-mentioned conduction paths. Consequently, the equivalent series inductance can be lowered.

Also, in the multilayer capacitor in accordance with the sixth embodiment, conduction paths electrically connecting the second inner electrode 1122 to the second terminal electrodes 105A to 105D through the lead conductors 115A to 115D are formed. Therefore, currents flowing between the second inner electrode 1122 and the second terminal electrodes 105A to 105D are shunted into fractions flowing through the lead conductors 156A to 156D and fractions flowing through the above-mentioned conduction paths. In the multilayer capacitor in accordance with the sixth embodiment, conduction paths electrically connecting the second inner electrode 1142 to the second terminal electrodes 105A to 105D through the lead conductors 165A to 165D are formed. Therefore, currents flowing between the second inner electrode 1142 and the second terminal electrodes 105A to 105D are shunted into fractions flowing through the lead conductors 156A to 156D and fractions flowing through the above-mentioned conduction paths. Consequently, the equivalent series inductance can further be lowered.

Each conduction path formed in the outer layer portion 110 is electrically connected to the first inner electrode 1121 positioned closest to the outer layer portion 110 among the plurality of first inner electrodes 1121, 141 to 144, 1141 or the second inner electrode 1122 positioned closest to the outer layer portion 110 among the plurality of second inner electrodes 1122, 151 to 154, 1142. Consequently, the line length of each conduction path formed in the outer layer portion 110 can be made relatively short. Each conduction path formed in the outer layer portion 160 is electrically connected to the first inner electrode 1141 positioned closest to the outer layer portion 160 among the plurality of first inner electrodes 1121, 141 to 144, 1141 or the second inner electrode 1142 positioned closest to the outer layer portion 160 among the plurality of second inner electrodes 1122, 151 to 154, 1142. Consequently, the line length of each conduction path can be made relatively short. As a result, the equivalent series inductance generated in each conduction path can be suppressed. Also, the multilayer capacitor in accordance with the sixth embodiment is simple to form the conduction paths and can attain a structure which is relatively easy to manufacture.

The conduction paths physically and electrically connect their corresponding first terminal conductor portions 1302A to 1302D, 1303A to 1303D of the first terminal electrodes 103A to 103D to the first inner electrodes 1121, 1141, or their corresponding second terminal conductor portions 1502A to 1502D, 1503A to 1503D of the second terminal electrodes 105A to 105D to the second inner electrodes 1122, 1142. Consequently, each conduction path becomes shorter. Therefore, the equivalent series inductance generated in the conduction paths can further be lowered. Also, the through hole conductors are simple to form and can attain a structure which is relatively easy to manufacture.

The above-mentioned conduction paths include the lead conductors 114A to 114D, 115A to 115D, 164A to 164D, 165A to 165D. The lead conductors 114A to 114D, 115A to 115D, 164A to 164D, 165A to 165D electrically connect their corresponding first terminal electrodes 103A to 103D or second terminal electrodes 105A to 105D to their corresponding through hole conductors 116a to 116d, 117a to 117d, 118a to 118d, 119a to 119d, 1116a to 1116d, 1117a to 1117d, 1118a to 1118d, 1119a to 1119d, 1136a to 1136d, 1137a to 1137d, 1138a to 1138d, 1139a to 1139d, 166a to 166d, 167a to 167d, 168a to 168d, 169a to 169d. Consequently, currents are shunted into the lead conductors 114A to 114D, 115A to 115D, 164A to 164D, 165A to 165D, whereby the equivalent series inductance can further be lowered.

Seventh Embodiment

Figure 22:
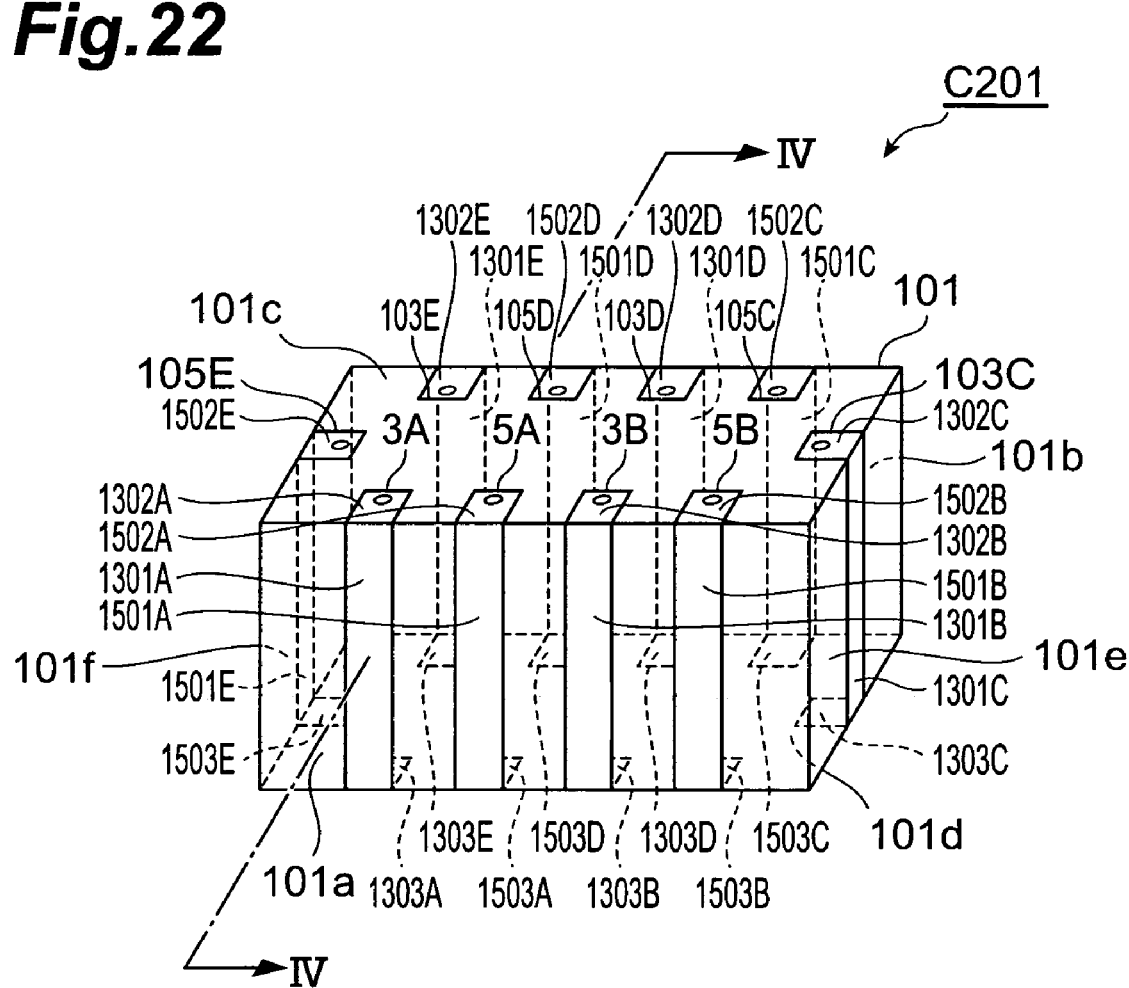
FIG. 22 is a perspective view showing the multilayer capacitor in accordance with a seventh embodiment.
Figure 23:
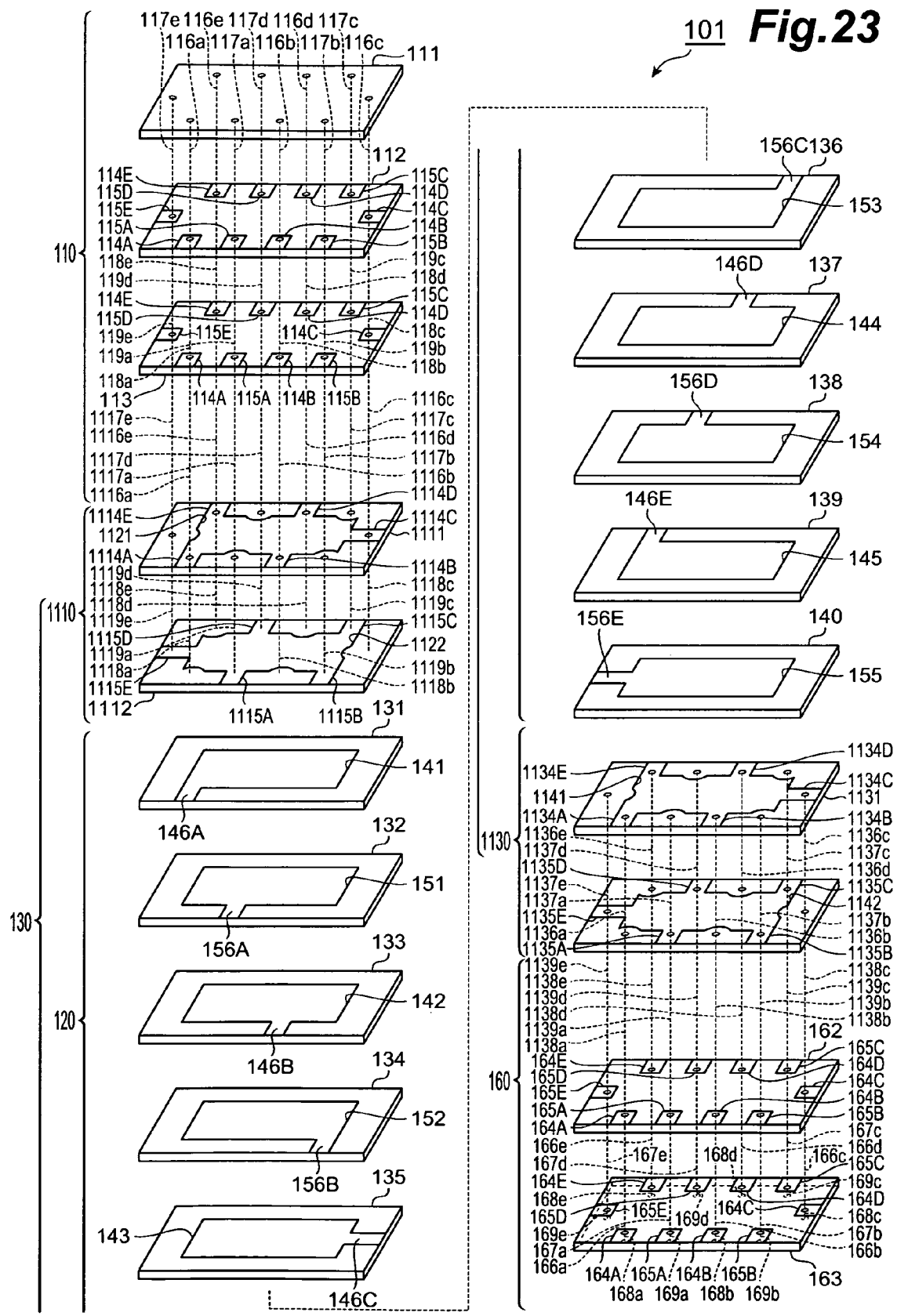
FIG. 23 is an exploded perspective view of the multilayer body included in the multilayer capacitor in accordance with the seventh embodiment.

With reference to FIGS. 22 and 23, the structure of the multilayer capacitor C102 in accordance with a seventh embodiment will be explained. The multilayer capacitor C102 in accordance with the seventh embodiment differs from the multilayer capacitor C101 in accordance with the fifth embodiment in terms of the number of first and second terminal electrodes. FIG. 22 is a perspective view of the multilayer capacitor in accordance with the seventh embodiment. FIG. 23 is an exploded perspective view of the multilayer body included in the multilayer capacitor in accordance with the seventh embodiment.

As shown in FIG. 22, the multilayer capacitor C102 comprises a multilayer body 101 including an inner layer portion 130 and outer layer portions 110, 160; a plurality of (5 in this embodiment) first terminal electrodes 103A to 103E formed on the multilayer body 101; and a plurality of (5 in this embodiment) second terminal electrodes 105A to 105E formed on the multilayer body 101.

The first terminal electrodes 103A, 103B and second terminal electrodes 105A, 105B are positioned on a side face 101a of the multilayer body 101. The first terminal electrodes 103D, 103E and second terminal electrodes 105C, 105D are positioned on a side face 101b of the multilayer body 101. The first terminal electrode 103C is positioned on an end face 101e of the multilayer body 101. The second terminal electrode 105E is positioned on an end face 101f of the multilayer body 101. The first terminal electrodes 103A to 103E and the second terminal electrodes 105A to 105E are electrically insulated from each other on outer surfaces of the multilayer body 101.

The first terminal electrodes 103A, 103B have first terminal conductor portions 1301A, 1301B covering respective portions of the side face 101a of the multilayer body 101 in the laminating direction; second terminal conductor portions 1302A, 1302B bent to the side face 101c; and second terminal conductor portions 1303A, 1303B bent to the side face 101d. The first terminal conductor portion 1301A of the first terminal electrode 103A is formed on the side face 101c. The second terminal conductor portion 1302A of the first terminal electrode 103A is formed on the side face 101c. The second terminal conductor portion 1303A of the first terminal electrode 103A is formed on the side face 101d. The first terminal conductor portion 1301B of the first terminal electrode 103B is formed on the side face 101a. The second terminal conductor portion 1302B of the first terminal electrode 103B is formed on the side face 101c. The second terminal conductor portion 1303B of the first terminal electrode 103B is formed on the side face 101d.

The first terminal electrode 103C has a first terminal conductor portion 1301C covering a portion of the end face 101e of the multilayer body 101 in the laminating direction, a second terminal conductor portion 1302C bent to the side face 101c, and a second terminal conductor portion 1303C bent to the side face 101d. The first terminal conductor portion 1301C of the first terminal electrode 103C is formed on the end face 101e. The second terminal conductor portion 1302C of the first terminal electrode 103C is formed on the side face 101c. The second terminal conductor portion 1303C of the first terminal electrode 103C is formed on the side face 101d.

The first terminal electrodes 103D, 103E have first terminal conductor portions 1301D, 1301E covering respective portions of the side face 101b of the multilayer body 101 in the laminating direction; second terminal conductor portions 1302D, 1302E bent to the side face 101c; and second terminal conductor portions 1303D, 1303E bent to the side face 101d. The first terminal conductor portion 1301D of the first terminal electrode 103D is formed on the side face 101b. The second terminal conductor portion 1302D of the first terminal electrode 103D is formed on the side face 101c. The second terminal conductor portion 1303D of the first terminal electrode 103D is formed on the side face 101d. The first terminal conductor portion 1301E of the first terminal electrode 103E is formed on the side face 101b. The second terminal conductor portion 1302E of the first terminal electrode 103E is formed on the side face 101c. The second terminal conductor portion 1303E of the first terminal electrode 103E is formed on the side face 101d.

The second terminal electrodes 105A, 105B have first terminal conductor portions 1501A, 1501B covering respective portions of the side face 101a of the multilayer body 101 in the laminating direction; second terminal conductor portions 1502A, 1502B bent to the side face 101c; and second terminal conductor portions 1503A, 1503B bent to the side face old. The first terminal conductor portion 1501A of the second terminal electrode 105A is formed on the side face 101a. The second terminal conductor portion 1502A of the second terminal electrode 105A is formed on the side face 101c. The second terminal conductor portion 1503A of the second terminal electrode 105A is formed on the side face 101d. The first terminal conductor portion 1501B of the second terminal electrode 105B is formed on the side face 101a. The second terminal conductor portion 1502B of the second terminal electrode 105B is formed on the side face 101c. The second terminal conductor portion 1503B of the second terminal electrode 105B is formed on the side face 101d.

The second terminal electrodes 105C, 105D have first terminal conductor portions 1501C, 1501D covering respective portions of the side face 101b of the multilayer body 101 in the laminating direction; second terminal conductor portions 1502C, 1502D bent to the side face 101c; and second terminal conductor portions 1503C, 1503D bent to the side face 101d. The first terminal conductor portion 1501C of the second terminal electrode 105C is formed on the side face 101b. The second terminal conductor portion 1502C of the second terminal electrode 105C is formed on the side face 101c. The second terminal conductor portion 1503C of the second terminal electrode 105C is formed on the side face 101d. The first terminal conductor portion 1501D of the second terminal electrode 105D is formed on the side face 101b. The second terminal conductor portion 1502D of the second terminal electrode 105D is formed on the side face 101c. The second terminal conductor portion 1503D of the second terminal electrode 105D is formed on the side face 101d.

The second terminal electrode 105E has a first terminal conductor portion 1501E covering a portion of the end face 101f of the multilayer body 101 in the laminating direction, a second terminal conductor portion 1502E bent to the side face 101c, and a second terminal conductor portion 1503E bent to the side face 101d. The first terminal conductor portion 1501E of the second terminal electrode 105E is formed on the end face 101f. The second terminal conductor portion 1502E of the second terminal electrode 105E is formed on the side face 101c. The second terminal conductor portion 1503E of the second terminal electrode 105E is formed on the side face 101d.

As shown in FIG. 23, the multilayer body 101 has the inner layer portion 130 and a pair of outer layer portions 110, 160 holding the inner layer portion 130 therebetween.

The outer layer portion 110 is constructed by alternately laminating a plurality of (3 in this embodiment) dielectric layers 111 to 113 with lead conductors 114A to 114E, 115A to 115E. In the actual multilayer capacitor C102, the plurality of dielectric layers 111 to 113 are integrated to such an extent that their boundaries are indiscernible.

Lead conductors 114A to 114E, 115A to 115E are laminated between the dielectric layers 111, 112 and between the dielectric layers 112, 113. Namely, the lead conductors 114A to 114E, 115A to 115E are laminated between a plurality of dielectric layers 111 to 113 within the outer layer portion 110 by way of one dielectric layer.

The lead conductors 114A, 114B extend so as to be led to the side face 101a of the multilayer body 101 formed with the first terminal electrodes 103A, 103B, while having respective one ends electrically connected to their corresponding first terminal electrodes 103A, 103B. The lead conductors 115A, 115B extend so as to be led to the side face 101a of the multilayer body 101 formed with the second terminal electrodes 105A, 105B, while having respective one ends electrically connected to their corresponding second terminal electrodes 105A, 105B. The lead conductor 114C extends so as to be led to the end face 101e of the multilayer body 101 formed with the first terminal electrode 103C, while having one end electrically connected to the first terminal electrode 103C. The lead conductors 115C, 115D extend so as to be led to the side face 101b of the multilayer body 101 formed with the second terminal electrodes 105C, 105D, while having respective one ends electrically connected to their corresponding second terminal electrodes 105C, 105D. The lead conductor 115E extends so as to be led to the end face 101f of the multilayer body 101 formed with the second terminal electrode 105E, while having one end electrically connected to the second terminal electrode 105E.

Through hole conductors 116a to 116e, 117a to 117e penetrating through the dielectric layer 111 in the thickness direction are formed at respective positions corresponding to the lead conductors 114A to 114E, 115A to 115E in the dielectric layer 111. The through hole conductors 116a to 116e have respective one ends connected to the second terminal conductor portions 1302A to 1302E of the first terminal electrodes 103A to 103E, and the respective other ends electrically connected to the lead conductors 114A to 114E positioned between the dielectric layers 111, 112. The through hole conductors 117a to 117e have respective one ends connected to the second terminal conductor portions 1502A to 1502E of the second terminal electrodes 105A to 105E, and the respective other ends electrically connected to the lead conductors 115A to 115E positioned between the dielectric layers 111, 112.

Through hole conductors 118a to 118e, 119a to 119e penetrating through the dielectric layer 112 in the thickness direction are formed at respective positions corresponding to the lead conductors 114A to 114E, 115A to 115E in the dielectric layer 112. The through hole conductors 118a to 118e, 119a to 119e have respective one ends electrically connected to the lead conductors 114A to 114E, 115A to 115E positioned between the dielectric layers 111, 112, and the respective other ends electrically connected to the lead conductors 114A to 114E, 115A to 115E positioned between the dielectric layers 112, 113.

Through hole conductors 1116a to 1116e, 1117a to 1117e penetrating through the dielectric layer 113 in the thickness direction are formed at respective positions corresponding to the lead conductors 114A to 114E, 115A to 115E in the dielectric layer 113. The through hole conductors 1116a to 1116e, 1117a to 1117e have respective one ends electrically connected to the lead conductors 114A to 114E, 115A to 115E positioned between the dielectric layers 112, 113.

As shown in FIG. 23, a first inner electrode 1121, a dielectric layer 1111, a second inner electrode 1122, and a dielectric layer 1112 are successively laminated in a second inner layer portion 1110. Each of the first inner electrode 1121 and second inner electrode 1122 has a rectangular form. The first inner electrode 1121 and second inner electrode 1122 are formed at respective positions separated by predetermined distances from side faces parallel to the laminating direction in the multilayer body 101.

The first inner electrode 1121 has lead conductors 1114A to 1114E integrally formed with the first inner electrode 1121. The lead conductors 1114A to 1114E are formed at respective positions corresponding to the lead conductors 114A to 114E. Therefore, the lead conductors 1114A to 1114E are electrically connected to respective one ends of their corresponding through hole conductors 1116a to 1116e.

The lead conductor 1114A extends so as to be led to the side face 101a of the multilayer body 101 formed with the first terminal electrode 103A, while having one end electrically connected to the first terminal conductor portion 1301A of the first terminal electrode 103A. The lead conductor 1114B extends so as to be led to the side face 101a of the multilayer body 101 formed with the first terminal electrode 103B, while having one end electrically connected to the first terminal conductor portion 1301B of the first terminal electrode 103B. The lead conductor 1114C extends so as to be led to the end face 101e of the multilayer body 101 formed with the first terminal electrode 103C, while having one end electrically connected to the first terminal conductor portion 1301C of the first terminal electrode 103C. The lead conductor 1114D extends so as to be led to the side face 101b of the multilayer body 101 formed with the first terminal electrode 103D, while having one end electrically connected to the first terminal conductor portion 1301D of the first terminal electrode 103D. The lead conductor 1114E extends so as to be led to the side face 101b of the multilayer body 101 formed with the first terminal electrode 103E, while having one end electrically connected to the first terminal conductor portion 1301E of the first terminal electrode 103E. The first inner electrode 1121 is electrically connected to the first terminal electrodes 103A to 103E through the lead conductors 1114A to 1114E.

The second inner electrode 1122 has lead conductors 1115A to 1115E integrally formed with the second inner electrode 1122. The lead conductors 1115A to 1115E are formed at respective positions corresponding to the lead conductors 115A to 115E.

The lead conductor 1115A extends so as to be led to the side face 101a of the multilayer body 101 formed with the second terminal electrode 105A, while having one end electrically connected to the first terminal conductor portion 1501A of the second terminal electrode 105A. The lead conductor 1115B extends so as to be led to the side face 101a of the multilayer body 101 formed with the second terminal electrode 105B, while having one end electrically connected to the first terminal conductor portion 1501B of the second terminal electrode 105B. The lead conductor 1115C extends so as to be led to the side face 101b of the multilayer body 101 formed with the second terminal electrode 105C, while having one end electrically connected to the first terminal conductor portion 1501C of the second terminal electrode 105C. The lead conductor 1115D extends so as to be led to the side face 101b of the multilayer body 101 formed with the second terminal electrode 105D, while having one end electrically connected to the first terminal conductor portion 1501D of the second terminal electrode 105D. The lead conductor 1115E extends so as to be led to the end face 101f of the multilayer body 101 formed with the second terminal electrode 105E, while having one end electrically connected to the first terminal conductor portion 1501E of the second terminal electrode 105E. The second inner electrode 1122 is electrically connected to the second terminal electrodes 105A to 105E through the lead conductors 1115A to 1115E.

Through hole conductors 1118a to 1118e, 1119a to 1119e penetrating through the dielectric layer 1111 in the thickness direction are formed at respective positions corresponding to the lead conductors 1114A to 1114E, 1115A to 1115E in the dielectric layer 1111.

The through hole conductors 1118a to 1118e have respective one ends electrically connected to the lead conductors 1114A to 1114E positioned between the dielectric layers 113, 1111. The through hole conductors 1119a to 1119e have respective one ends electrically connected to the lead conductors 1115A to 1115E positioned between the dielectric layers 1111, 1112.

In the first inner electrode 1121, areas corresponding to the through hole conductors 1117a to 1117e are formed so as to expose the dielectric layer 1111. Namely, the first inner electrode 1121 is electrically insulated from the through hole conductors 1117a to 1117e, 1119a to 1119e. In the second inner electrode 1122, areas corresponding to the through hole conductors 1118a to 1118e are formed so as to expose the dielectric layer 1112. Namely, the second inner electrode 1122 is electrically insulated from the through hole conductors 1116a to 1116e, 1118a to 1118e.

Therefore, when the dielectric layers 111 to 113, 1111, 1112 are laminated, a series of through hole conductors 116a, 118a, 1116a, 1118a, a series of through hole conductors 116b, 118b, 1116b, 1118b, a series of through hole conductors 116c, 118c, 1116c, 1118c, a series of through hole conductors 116d, 118d, 1116d, 1118d, a series of through hole conductors 116e, 118e, 1116e, 1118e, a series of through hole conductors 117a, 119a, 1117a, 1119a, a series of through hole conductors 117b, 119b, 1117b, 1119b, a series of through hole conductors 117c, 119c, 1117c, 1119c, a series of through hole conductors 117d, 119d, 1117d, 1119d, and a series of through hole conductors 117e, 119e, 1117e, 1119e are formed. The series of through hole conductors 116a, 118a, 1116a, 1118a, the series of through hole conductors 116b, 118b, 1116b, 1118b, the series of through hole conductors 116c, 118c, 1116c, 1118c, the series of through hole conductors 116d, 118d, 1116d, 1118d, the series of through hole conductors 116e, 118e, 1116e, 1118e, the series of through hole conductors 117a, 119a, 1117a, 1119a, the series of through hole conductors 117b, 119b, 1117b, 119b, the series of through hole conductors 117c, 119c, 1117c, 1119c, the series of through hole conductors 117d, 119d, 1117d, 1119d, and the series of through hole conductors 117e, 119e, 1117e, 1119e cooperate with their corresponding lead conductors 114A to 114E, 115A to 115E, so as to form 10 conduction paths in the outer layer portion 110.

Each conduction path electrically connects two different positions in its corresponding first or second terminal electrodes 103A to 103E, 105A to 105E to its corresponding first inner electrode 1121 or second inner electrode 1122.

As shown in FIG. 23, a first inner layer portion 120 is constructed by alternately laminating a plurality of (10 in this embodiment) dielectric layers 131 to 140 with a plurality of (5 each in this embodiment) first and second inner electrodes 141 to 145, 151 to 155. In the actual multilayer capacitor C102, the dielectric layers 131 to 140 are integrated to such an extent that their boundaries are indiscernible.

Each of the first inner electrodes 141 to 145 has a substantially rectangular form. The first inner electrodes 141 to 145 are formed at respective positions separated by predetermined distances from side faces parallel to the laminating direction in the multilayer body 101.

The first inner electrode 141 is electrically connected to the first terminal conductor portion 1301A of the first terminal electrode 103A through a lead conductor 146A. The first inner electrode 142 is electrically connected to the first terminal conductor portion 1301B of the first terminal electrode 103B through a lead conductor 146B. The first inner electrode 143 is electrically connected to the first terminal conductor portion 1301C of the first terminal electrode 103C through a lead conductor 146C. The first inner electrode 144 is electrically connected to the first terminal conductor portion 1301D of the first terminal electrode 103D through a lead conductor 146D. The first inner electrode 145 is electrically connected to the first terminal conductor portion 1301E of the first terminal electrode 103E through a lead conductor 146E. Consequently, the plurality of first terminal electrode portions 103A to 103E are each electrically connected to at least one of the plurality of first inner electrodes 141 to 145 through the lead conductors 146A to 146E.

The lead conductors 146A, 146B are integrally formed with their corresponding first inner electrodes 141, 142, and extend therefrom so as to reach the side face 101a of the multilayer body 101. The lead conductor 146C is integrally formed with the first inner electrode 143, and extends therefrom so as to reach the end face 101e of the multilayer body 101. The lead conductors 146D, 146E are integrally formed with their corresponding first inner electrodes 144, 145, and extend therefrom so as to reach the side face 101b of the multilayer body 101.

Each of the second inner electrodes 151 to 155 has a substantially rectangular form. The second inner electrodes 151 to 155 are formed at respective positions separated by predetermined distances from side faces parallel to the laminating direction in the multilayer body 101.

The second inner electrode 151 is electrically connected to the first terminal conductor portion 1501A of the second terminal electrode 105A through a lead conductor 156A. The second inner electrode 152 is electrically connected to the second terminal conductor portion 1501B of the second terminal electrode 105B through a lead conductor 156B. The second inner electrode 153 is electrically connected to the first terminal conductor portion 1501C of the second terminal electrode 105C through a lead conductor 156C. The second inner electrode 154 is electrically connected to the first terminal conductor portion 1501D of the second terminal electrode 105D through a lead conductor 156D. The second inner electrode 155 is electrically connected to the first terminal conductor portion 1501E of the second terminal electrode 105E through a lead conductor 156E. Consequently, the plurality of second terminal electrode portions 105A to 105E are each electrically connected to at least one of the plurality of second inner electrodes 151 to 155 through the lead conductors 156A to 156E.

The lead conductors 156A, 156B are integrally formed with their corresponding second inner electrodes 151, 152, and extend therefrom so as to reach the side face 101a of the multilayer body 101. The lead conductors 156C, 156D are integrally formed with their corresponding second inner electrodes 153, 154, and extend therefrom so as to reach the side face 101b of the multilayer body 101. The lead conductor 156E is integrally formed with the second inner electrode 155, and extends therefrom so as to reach the end face 101f of the multilayer body 101.

As shown in FIG. 23, a first inner electrode 1141, a dielectric layer 1131, and a second inner electrode 1142 are successively laminated in a second inner layer portion 1130. Each of the first inner electrode 1141 and second inner electrode 1142 has a rectangular form. The first inner electrode 1141 and second inner electrode 1142 are formed at respective positions separated by predetermined distances from side faces parallel to the laminating direction in the multilayer body 101.

The first inner electrode 1141 has lead conductors 1134A to 1134E integrally formed therewith. The lead conductors 1134A to 1134E are formed at respective positions corresponding to the lead conductors 114A to 114E.

The lead conductor 1134A extends so as to be led to the side face 101a of the multilayer body 101 formed with the first terminal electrode 103A, while having one end electrically connected to the first terminal conductor portion 1301A of the first terminal electrode 103A. The lead conductor 1134B extends so as to be led to the side face 101a of the multilayer body 101 formed with the first terminal electrode 103B, while having one end electrically connected to the first terminal conductor portion 1301B of the first terminal electrode 103B. The lead conductor 1134C extends so as to be led to the end face 101e of the multilayer body 101 formed with the first terminal electrode 103C, while having one end electrically connected to the first terminal conductor portion 1301C of the first terminal electrode 103C. The lead conductor 1134D extends so as to be led to the side face 101b of the multilayer body 101 formed with the first terminal electrode 103D, while having one end electrically connected to the first terminal conductor portion 1301D of the first terminal electrode 103D. The lead conductor 1134E extends so as to be led to the side face 101b of the multilayer body 101 formed with the first terminal electrode 103E, while having one end electrically connected to the first terminal conductor portion 1301E of the first terminal electrode 103E. The first inner electrode 1141 is electrically connected to the first terminal electrodes 103A to 103E through the lead conductors 1134A to 1134E.

The second inner electrode 1142 has lead conductors 1135A to 1135E integrally formed therewith. The lead conductors 1135A to 1135E are formed at respective positions corresponding to the lead conductors 115A to 115E.

The lead conductor 1135A extends so as to be led to the side face 101a of the multilayer body 101 formed with the second terminal electrode 105A, while having one end electrically connected to the first terminal conductor portion 1501A of the second terminal electrode 105A. The lead conductor 1135B extends so as to be led to the side face 101a of the multilayer body 101 formed with the second terminal electrode 105B, while having one end electrically connected to the first terminal conductor portion 1501B of the second terminal electrode 105B. The lead conductor 1135C extends so as to be led to the side face 101b of the multilayer body 101 formed with the second terminal electrode 105C, while having one end electrically connected to the first terminal conductor portion 1501C of the second terminal electrode 105C. The lead conductor 1135D extends so as to be led to the side face 101b of the multilayer body 101 formed with the second terminal electrode 105D, while having one end electrically connected to the first terminal conductor portion 1501D of the second terminal electrode 105D. The lead conductor 1135E extends so as to be led to the end face 101f of the multilayer body 101 formed with the second terminal electrode 105E, while having one end electrically connected to the first terminal conductor portion 1501E of the second terminal electrode 105E. The second inner electrode 1142 is electrically connected to the second terminal electrodes 105A to 105E through the lead conductors 1135A to 1135E.

Through hole conductors 1138a to 1138e, 1139a to 1139e penetrating through the dielectric layer 1131 in the thickness direction are formed at respective positions corresponding to the lead conductors 1134A to 1134E, 1135A to 1135E in the dielectric layer 1131.

The through hole conductors 1138a to 1138e have respective one ends electrically connected to the lead conductors 1134A to 1134E. The through hole conductors 1139a to 1139e have respective one ends electrically connected to the lead conductors 1135A to 1135E.

In the first inner electrode 1141, areas corresponding to the through hole conductors 1137a to 1137e are formed so as to expose the dielectric layer 1131. Namely, the first inner electrode 1141 is electrically insulated from the through hole conductors 1137a to 1137e, 1139a to 1139e. In the second inner electrode 1142, areas corresponding to the through hole conductors 1138a to 1138e are formed so as to expose the dielectric layer 161 adjacent to the second inner electrode 1142. Namely, the second inner electrode 1142 is electrically insulated from the through hole conductors 1136a to 1136e.

The outer layer portion 160 is constructed by alternately laminating a plurality of (3 in this embodiment) dielectric layers 161 to 163 with lead conductors 164A to 164D, 165A to 165D. In the actual multilayer capacitor C102, the dielectric layers 161 to 163 are integrated to such an extent that their boundaries are indiscernible.

The lead conductors 164A to 164D, 165A to 165D are laminated between the dielectric layers 161, 162 and between the dielectric layers 162, 163. Namely, the lead conductors 164A to 164D, 165A to 165D are laminated between the dielectric layers 161 to 163 by way of one dielectric layer.

The lead conductors 164A, 164B extend so as to be led to the side face 101a of the multilayer body 101 formed with the first terminal electrodes 103A, 103B, while having respective one ends electrically connected to the first terminal electrodes 103A, 103B. The lead conductors 165A, 165B extend so as to be led to the side face 101a of the multilayer body 101 formed with the second terminal electrodes 105A, 105B, while having respective one ends electrically connected to the second terminal electrodes 105A, 105B. The lead conductor 164C extends so as to be led to the end face 101e of the multilayer body 101 formed with the first terminal electrode 103C, while having one end electrically connected to the first terminal electrode 103C. The lead conductors 164D, 164E extend so as to be led to the side face 101b of the multilayer body 101 formed with the first terminal electrodes 103D, 103E, while having respective one ends electrically connected to the first terminal electrodes 103D, 103E. The lead conductors 165C, 165D extend so as to be led to the side face 101b of the multilayer body 101 formed with the second terminal electrodes 105C, 105D, while having respective one ends electrically connected to the second terminal electrodes 105C, 105D. The lead conductor 165E extends so as to be led to the end face 101f of the multilayer body 101, while having one end electrically connected to the second terminal electrode 105E.

Through hole conductors 1138a to 1138e, 1139a to 1139e penetrating through the dielectric layer 161 in the thickness direction are formed at respective positions corresponding to the lead conductors 164A to 164E, 165A to 165E in the dielectric layer 161. The through hole conductors 1138a to 1138e have respective one ends electrically connected to the lead conductors 164A to 164E positioned between the dielectric layers 161, 162. The through hole conductors 1139a to 1139e have respective one ends electrically connected to the lead conductors 1135A to 1135E and the respective other ends electrically connected to the lead conductors 165A to 165E positioned between the dielectric layers 161, 162.

Through hole conductors 166a to 166e, 167a to 167e penetrating through the dielectric layer 162 in the thickness direction are formed at respective positions corresponding to the lead conductors 164A to 164E, 165A to 165E in the dielectric layer 162. The through hole conductors 166a to 166e, 167a to 167e have respective one ends electrically connected to the lead conductors 164A to 164E, 165A to 165E positioned between the dielectric layers 161, 162, and the respective other ends electrically connected to the lead conductors 164A to 164E, 165A to 165E positioned between the dielectric layers 162, 163

Through hole conductors 168a to 168e, 169a to 169e penetrating through the dielectric layer 163 in the thickness direction are formed at respective positions corresponding to the lead conductors 164A to 164E, 165A to 165E in the dielectric layer 163. The through hole conductors 168a to 168e, 169a to 169e have respective one ends connected to the second terminal conductor portions 1303A to 1303E, 1503A to 1503E of the terminal electrodes 103A to 103E, 105A to 105E, and the respective other ends electrically connected to the lead conductors 164A to 164E, 165A to 165E positioned between the dielectric layers 162, 163.

Therefore, when the dielectric layers 1131, 161 to 163 are laminated, a series of through hole conductors 1136a, 1138a, 166a, 168a, a series of through hole conductors 1136b, 1138b, 166b, 168b, a series of through hole conductors 1136c, 1138c, 166c, 168c, a series of through hole conductors 1136d, 1138d, 166d, 168d, a series of through hole conductors 1136e, 1138e, 166e, 168e, a series of through hole conductors 1137a, 1139a, 167a, 169a, a series of through hole conductors 1137b, 1139b, 167b, 169b, a series of through hole conductors 1137c, 1139c, 167c, 169c, a series of through hole conductors 1137d, 1139d, 167d, 169d, and a series of through hole conductors 1137e, 1139e, 167e, 169e. The series of through hole conductors 1136a, 1138a, 166a, 168a, the series of through hole conductors 1136b, 1138b, 166b, 168b, the series of through hole conductors 1136c, 1138c, 166c, 168c, the series of through hole conductors 1136d, 1138d, 166d, 168d, the series of through hole conductors 1136e, 1138e, 166e, 168e, the series of through hole conductors 1137a, 1139a, 167a, 169a, the series of through hole conductors 1137b, 1139b, 167b, 169b, the series of through hole conductors 1137c, 1139c, 167c, 169c, the series of through hole conductors 1137d, 1139d, 167d, 169d, and the series of through hole conductors 1137e, 1139e, 167e, 169e cooperate with their corresponding lead conductors 114A to 114E, 115A to 115E, so as to form 10 conduction paths in the outer layer portion 160.

Each conduction path electrically connects two different positions in its corresponding first or second terminal electrodes 103A to 103E, 105A to 105E to its corresponding first inner electrode 1141 or second inner electrode 1142.

Figure 24:
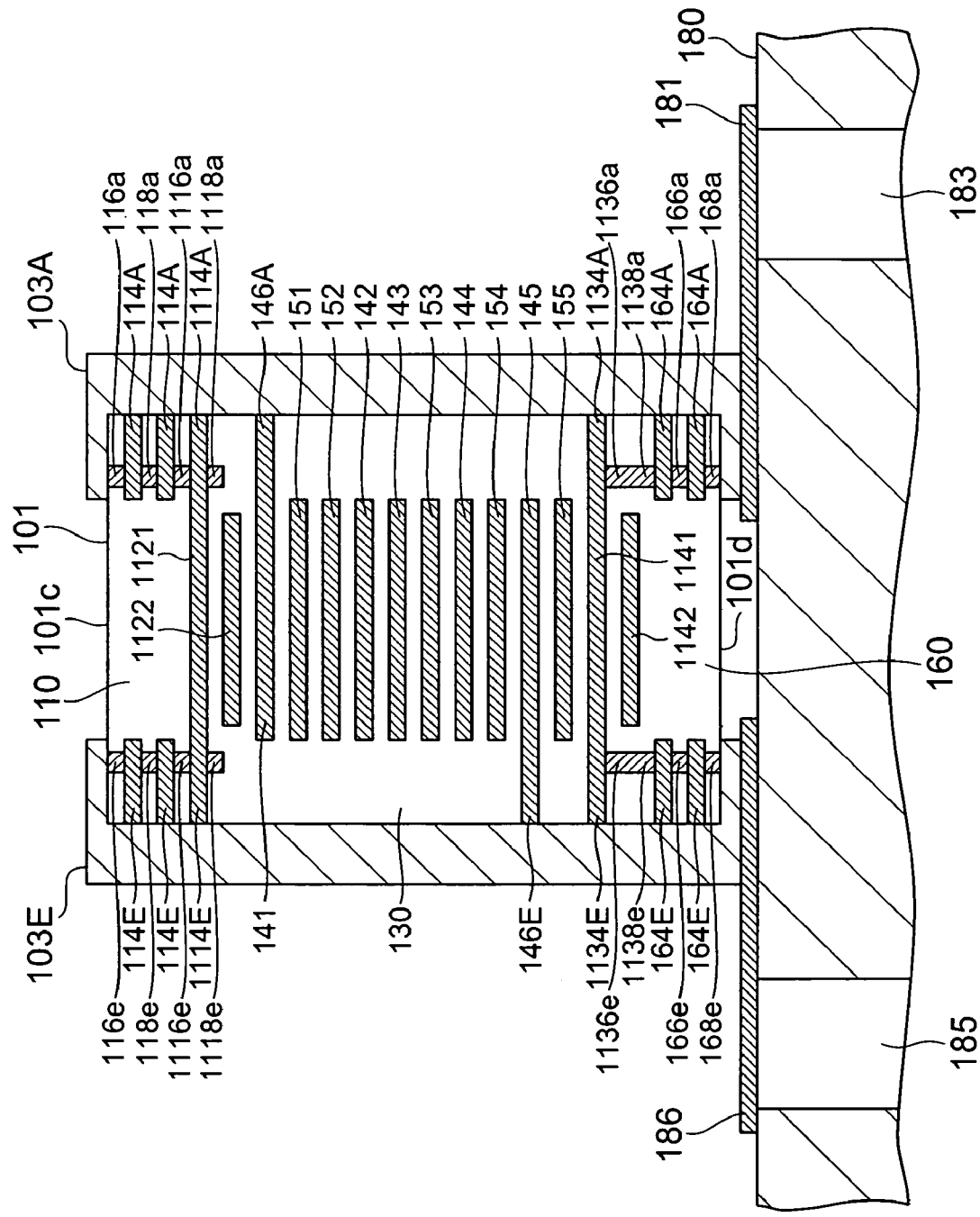
FIG. 24 is a sectional view showing the multilayer capacitor in accordance with the seventh embodiment mounted on a substrate.

FIG. 24 is a sectional view showing the multilayer capacitor C102 mounted on a substrate 180. The sectional view shown in FIG. 24 is obtained when the multilayer capacitor C102 is cut along a line corresponding to the line IV-IV shown in FIG. 22. The multilayer capacitor C102 is mounted such that the first terminal electrodes 103A, 103E of the multilayer capacitor C102 are connected to anode lands 181, 186 which are formed on the substrate 180, respectively. Leads 183, 185 provided in the substrate are connected to the anode lands 181, 186, respectively. In FIG. 24, areas corresponding to the dielectric layers 111 to 113, 1111, 1112, 131 to 140, 161 to 163 and leads 183, 185 are not hatched for easier viewing of the drawing.

The current flowing from the first terminal electrode 103A to the first inner electrode 1121 is shunted into a conduction path including a series of through hole conductors 116*a*, 118*a*, 1116*a*, 1118*a* and two lead conductors 114A, and the lead conductor 1114A. The current flowing through the conduction path is further shunted into a current flowing through the through hole conductors 116*a*, 118*a*, 1116*a*; a current flowing through the lead conductor 114A and through hole conductors 118*a*, 1116*a*; and a current flowing through the lead conductor 114A and through hole conductor 1116*a*. Namely, currents flow from four positions in the first terminal electrode 103A to the first inner electrode 1121.

The current flowing from the first terminal electrode 103A to the first inner electrode 1141 is shunted into a conduction path including a series of through hole conductors 1136*a*, 1138*a*, 166*a*, 168*a* and two lead conductors 164A, and the lead conductor 1134A. The current flowing through the conduction path is further shunted into a current flowing through the through hole conductors 168*a*, 166*a*, 1138*a*, 1136*a*; a current flowing through the lead conductor 164A and through hole conductors 166*a*, 1138*a*, 1136*a*; and a current flowing through the lead conductor 164A and through hole conductor 1138*a*, 1136*a*. Namely, currents flow from four positions in the first terminal electrode 103A to the first inner electrode 1141. The path of the current flowing through the through hole conductors 168*a*, 166*a*, 1138*a*, 1136*a* is shorter than the path of the current flowing into the first inner electrode 1141 through the lead conductor 1134A.

The current flowing from the first terminal electrode 103E to the first inner electrode 1121 is shunted into a conduction path including a series of through hole conductors 116*e*, 118*e*, 1116*a*, 1118*e* and two lead conductors 114E, and the lead conductor 1114E. The current flowing through the conduction path is further shunted into a current flowing through the through hole conductors 116*e*, 118*e*, 1116*e*; a current flowing through the lead conductor 114E and through hole conductors 118*e*, 1116*e*; and a current flowing through the lead conductor 114E and through hole conductor 1116*e*. Namely, currents flow from four positions in the first terminal electrode 103E to the first inner electrode 1121.

The current flowing from the first terminal electrode 103E to the first inner electrode 1141 is shunted into a conduction path including a series of through hole conductors 1136*e*, 1138*e*, 166*e*, 168*e* and two lead conductors 164E, and the lead conductor 1134E. The current flowing through the conduction path is further shunted into a current flowing through the through hole conductors 168*e*, 166*e*, 1138*e*, 1136*e*; a current flowing through the lead conductor 164E and through hole conductors 166*e*, 1138*e*, 1136*e*; and a current flowing through the lead conductor 164E and through hole conductors 1138*e*, 1136*e*. Namely, currents flow from four positions in the first terminal electrode 103E to the first inner electrode 1141. The path of the current flowing through the through hole conductors 168*e*, 166*e*, 1138*e*, 1136*e* is shorter than the path of the current flowing into the first inner electrode 1141 through the lead conductor 1134E.

Currents flowing from the other first terminal electrodes 103B to 103E, whose cross sections are not depicted, into the first inner electrodes 1121, 1141 and currents flowing from the other second inner electrodes 1122, 1142 into the second terminal electrodes 105A to 105E, whose cross sections are not depicted, are shunted by conduction paths as in the foregoing.

In the multilayer capacitor C102 in accordance with the seventh embodiment, as explained in the foregoing, conduction paths electrically connecting the first inner electrode 1121 to the first terminal electrodes 103A to 103E through the lead conductors 114A to 114E are formed. Therefore, currents flowing between the first terminal electrodes 103A to 103E and the first inner electrode 1121 are shunted into fractions flowing through the lead conductors 146A to 146E and fractions flowing through the above-mentioned conduction paths. In the multilayer capacitor C102, conduction paths electrically connecting the first inner electrode 1141 to the first terminal electrodes 103A to 103E through the lead conductors 164A to 164E are formed. Therefore, currents flowing between the first terminal electrodes 103A to 103E and the first inner electrode 1141 are shunted into fractions flowing through the lead conductors 146A to 146E and fractions flowing through the above-mentioned conduction paths. Consequently, the equivalent series inductance can be lowered.

Also, in the multilayer capacitor C102, conduction paths electrically connecting the second inner electrode 1122 to the second terminal electrodes 105A to 105E through the lead conductors 115A to 115E are formed. Therefore, currents flowing between the second inner electrode 1122 and the second terminal electrodes 105A to 105E are shunted into fractions flowing through the lead conductors 156A to 156E and fractions flowing through the above-mentioned conduction paths. In the multilayer capacitor C102, conduction paths electrically connecting the second inner electrode 1142 to the second terminal electrodes 105A to 105E through the lead conductors 165A to 165E are formed. Therefore, currents flowing between the second inner electrode 1142 and the second terminal electrodes 105A to 105E are shunted into fractions flowing through the lead conductors 156A to 156E and fractions flowing through the above-mentioned conduction paths. Consequently, the equivalent series inductance can further be lowered.

Each conduction path formed in the outer layer portion 110 is electrically connected to the first inner electrode 1121 positioned closest to the outer layer portion 110 in the first inner electrodes or the second inner electrode 1122 positioned closest to the outer layer portion 110 in the second inner electrodes. Consequently, the line length of each conduction path formed in the outer layer portion 110 can be made relatively short. Each conduction path formed in the outer layer portion 160 is electrically connected to the first inner electrode 1141 positioned closest to the outer layer portion 160 in the first inner electrodes or the second inner electrode 1142 positioned closest to the outer layer portion 160 in the second inner electrodes. Consequently, the line length of each conduction path formed in the outer layer portion 160 can be made relatively short. As a result, the equivalent series inductance generated in each conduction path can be suppressed. The multilayer capacitor C102 is simple to form conduction paths and can attain a structure which is relatively easy to manufacture.

The conduction paths physically and electrically connect their corresponding first terminal conductor portions 1302A to 1302E, 1303A to 1303E of the first terminal electrodes 103A to 103E to the first inner electrodes 1121, 1141, or their corresponding second terminal conductor portions 1502A to 1502E, 1503A to 1503E of the second terminal electrodes 105A to 105E to the second inner electrodes 1122, 1142. Consequently, each conduction path becomes shorter. Therefore, the equivalent series inductance generated in the conduction paths can further be lowered. As in the sixth embodiment, the through hole conductors 116*a* to 116*e*, 117*a* to 117*e*, 118*a* to 118*e*, 119*a* to 119*e*, 1116*a* to 1116*e*, 1117*a* to 1117*e*, 1118*a* to 1118*e*, 1119*a* to 1119*e*, 166*a* to 166*e*, 167*a* to 167*a*, 168*a* to 168*e*, 169*a* to 169*e*, 1136*a* to 1136*e*, 1137*a* to 1137*e*, 1138*a* to 1138*e*, 1139*a* to 1139*e* are simple to form and can attain a structure which is relatively easy to manufacture.

The conduction paths include the lead conductors 114A to 114E, 115A to 115E, 164A to 164E, 165A to 165E. The lead conductors 114A to 114E, 115A to 115E, 164A to 164E, 165A to 165E electrically connect their corresponding first terminal electrodes 103A to 103E or second terminal electrodes 105A to 105E to their corresponding through hole conductors 116a to 116e, 117a to 117e, 118a to 118e, 119a to 119e, 1116a to 1116e, 1117a to 1117e, 1118a to 1118e, 1119a to 1119e, 1136a to 1136e, 1137a to 1137e, 1138a to 1138e, 1139a to 1139e, 166a to 166e, 167a to 167e, 168a to 168e, 169a to 169e. Consequently, the equivalent series inductance can further be lowered.

Eighth Embodiment

Figure 25:
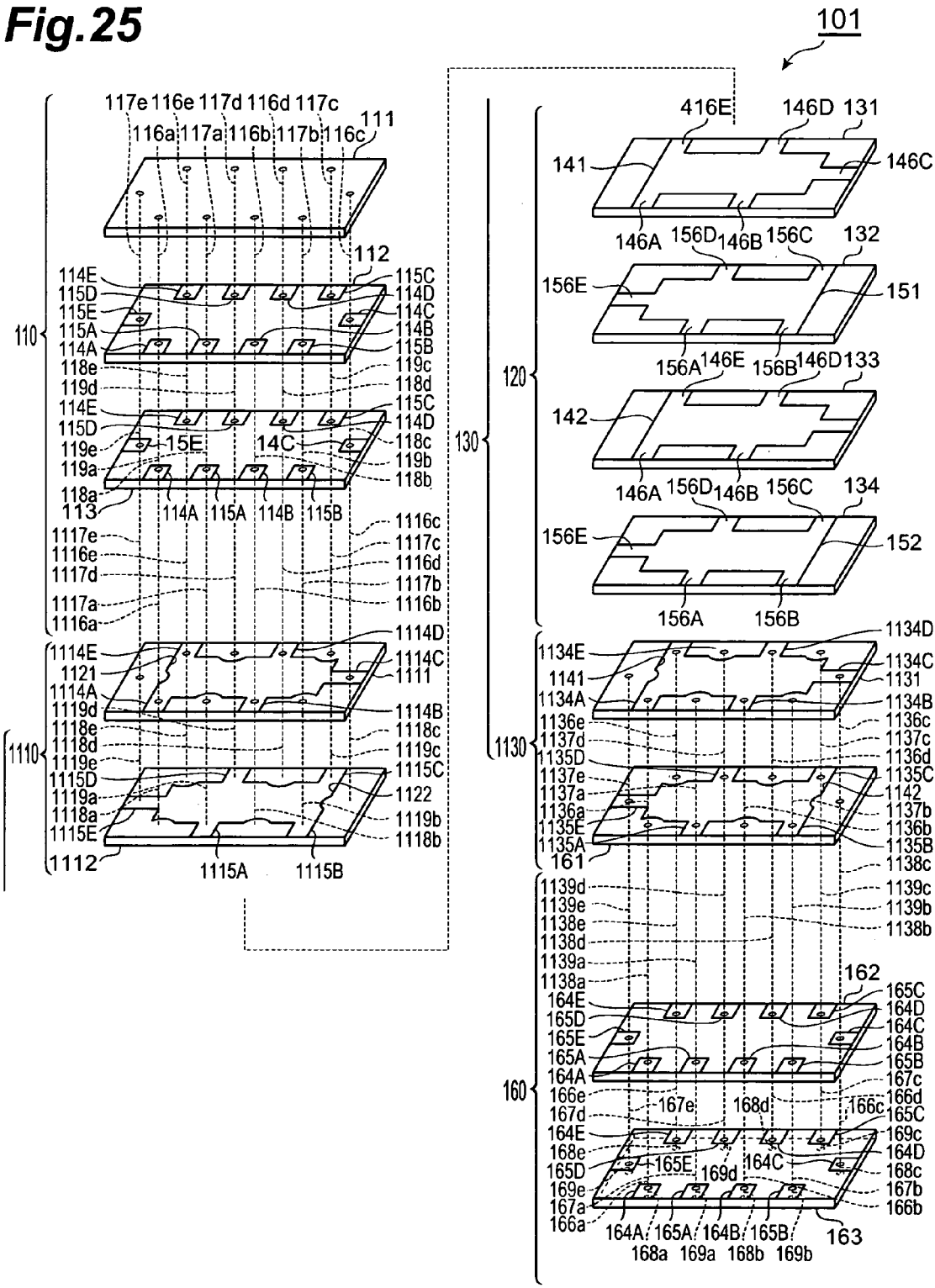
FIG. 25 is an exploded perspective view of the multilayer body included in the multilayer capacitor in accordance with an eighth embodiment.

With reference to FIG. 25, the structure of the multilayer capacitor in accordance with an eighth embodiment will be explained. The multilayer capacitor in accordance with the eighth embodiment differs from the multilayer capacitor C102 in accordance with the seventh embodiment in that first inner electrodes 141, 142 are each connected to a plurality of first terminal electrodes 103A to 103E through lead conductors and in that second inner electrodes 151, 152 are each connected to a plurality of second terminal electrodes 105A to 105E through lead conductors. FIG. 25 is an exploded perspective view of the multilayer body included in the multilayer capacitor in accordance with the eighth embodiment.

As with the multilayer capacitor C102 in accordance with the seventh embodiment, the multilayer capacitor in accordance with the eighth embodiment comprises a multilayer body 101, first terminal electrodes 103A to 103E formed on the multilayer body 101, and second terminal electrodes 105A to 105E formed on the multilayer body 101, which are not depicted. The first terminal electrodes 103A to 103E include first terminal conductor portions 1301A to 1301E, and second terminal conductor portions 1302A to 1302E, 1303A to 1303E. The second terminal electrodes 105A to 105E include first terminal conductor portions 1501A to 1501E, and second terminal conductor portions 1502A to 1502E, 1503A to 1503E.

As shown in FIG. 25, the multilayer body 101 includes an inner layer portion 130 and a pair of outer layer portions 110, 160 holding the inner layer portion 130 therebetween. The outer layer portions 110, 160 in the multilayer capacitor in accordance with the eighth embodiment are constructed as with the outer layer portions 110, 160 of the multilayer capacitor C102, respectively. The inner layer portion 130 has a first inner layer portion 120 and a pair of second inner layer portions 1110, 1130 holding the first inner layer portion 120 therebetween. The second inner layer portions 1110, 1130 in the multilayer capacitor in accordance with the eighth embodiment are constructed as with the second inner layer portions 1110, 1130 of the multilayer capacitor C102, respectively.

As is also shown in FIG. 25, the first inner layer portion 120 is constructed by alternately laminating a plurality of (4 in this embodiment) dielectric layers 131 to 134 with a plurality of (2 each in this embodiment) first inner electrodes 141, 142 and second inner electrodes 151, 152. In the actual multilayer capacitor in accordance with the eighth embodiment, the dielectric layers 131 to 134 are integrated to such an extent that their boundaries are indiscernible.

Each of the first inner electrodes 141, 142 has a substantially rectangular form. The first inner electrodes 141, 142 are formed at respective positions separated by predetermined distances from side faces parallel to the laminating direction in the multilayer body 101.

The first inner electrodes 141, 142 are each electrically connected to the first terminal conductor portions 1301A to 1301E of the plurality of first terminal electrodes 103A to 103E through lead conductors 146A to 146E. The lead conductors 146A, 146B are integrally formed with their corresponding first inner electrodes 141, 142, and extend therefrom so as to reach the side face 101a of the multilayer body 101. The lead conductors 146C are integrally formed with their corresponding first inner electrodes 141, 142, and extend therefrom so as to reach the end face 101e of the multilayer body 101. The lead conductors 146D, 146E are integrally formed with their corresponding first inner electrodes 141, 142, and extend therefrom so as to reach the side face 101b of the multilayer body 101.

Each of the second inner electrodes 151, 152 has a substantially rectangular form. The second inner electrodes 151, 152 are formed at respective positions separated by predetermined distances from side faces parallel to the laminating direction in the multilayer body 101.

The second inner electrodes 151, 152 are each electrically connected to the first terminal conductor portions 1501A to 1501E of the plurality of second terminal electrodes 105A to 105E through lead conductors 156A to 156E. The lead conductors 156A, 156B are integrally formed with their corresponding second inner electrodes 151, 152, and extend therefrom so as to reach the side face 101a of the multilayer body 101. The lead conductors 156C, 156D are integrally formed with their corresponding second inner electrodes 151, 152, and extend therefrom so as to reach the side face 101b of the multilayer body 101. The lead conductors 156E are integrally formed with their corresponding second inner electrodes 151, 152, and extend therefrom so as to reach the end face 101f of the multilayer body 101.

Figure 26:
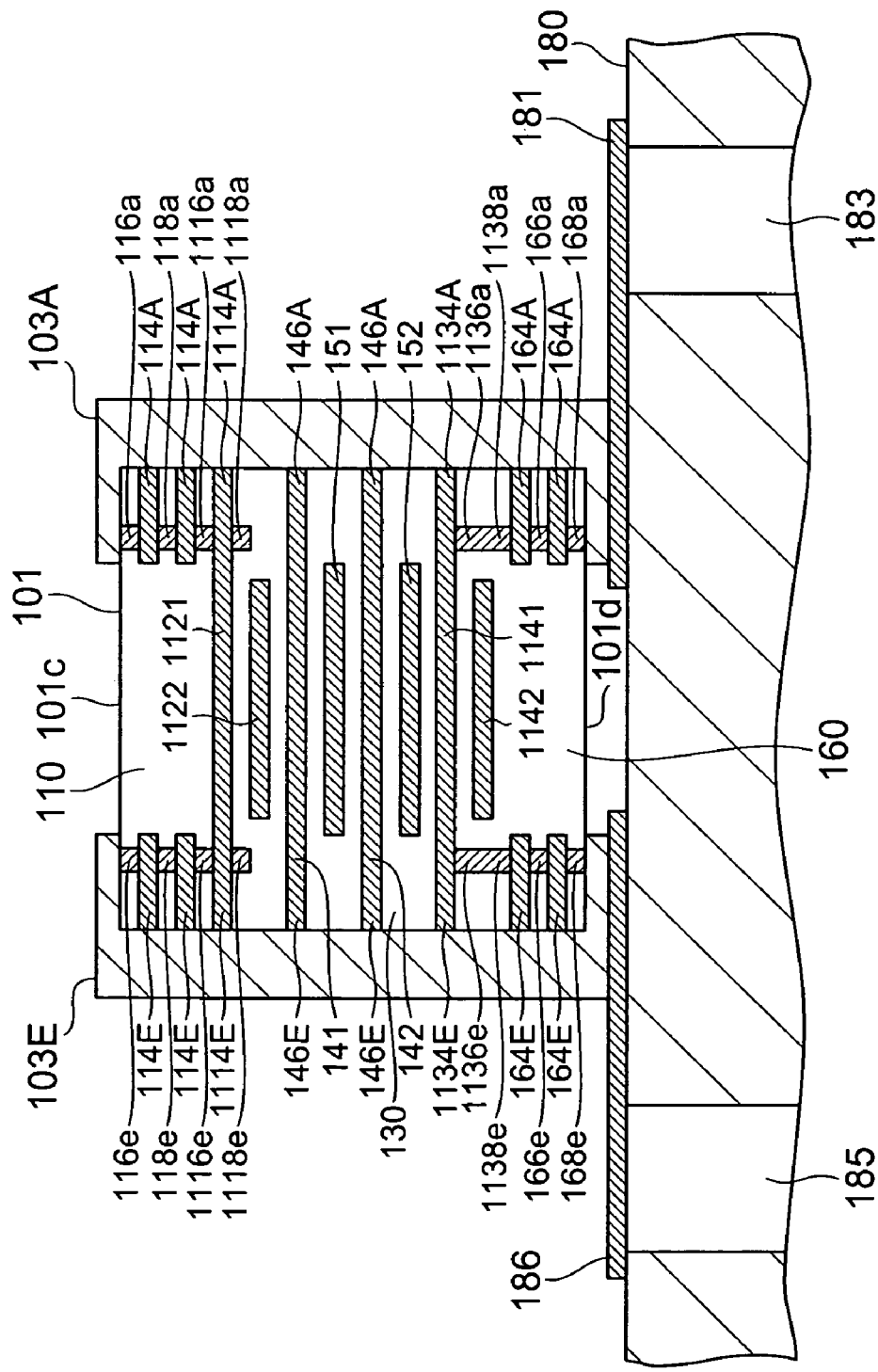
FIG. 26 is a sectional view showing the multilayer capacitor in accordance with the eighth embodiment mounted on a substrate.

FIG. 26 is a sectional view showing the multilayer capacitor in accordance with the eighth embodiment mounted on a substrate 180. The sectional view shown in FIG. 26 is obtained when the multilayer capacitor in accordance with the eighth embodiment is cut along a line corresponding to the line IV-IV shown in FIG. 22. In FIG. 26, areas corresponding to the dielectric layers 111 to 113, 1111, 1112, 131 to 134, 1131, 161 to 163 and leads 183, 185 are not hatched for easier viewing of the drawing.

In the multilayer capacitor in accordance with the eighth embodiment, 10 conduction paths are formed in each of the outer layer portions 110, 160 as in the multilayer capacitor C102 in accordance with the seventh embodiment. Therefore, conduction paths electrically connecting the first inner electrode 1121 to the first terminal electrodes 103A to 103E through the lead conductors 114A to 114E are formed in the multilayer capacitor in accordance with the eighth embodiment. Consequently, currents flowing between the first terminal electrodes 103A to 103E and the first inner electrode 1121 are shunted into fractions flowing through the lead conductors 146A to 146E and fractions flowing through the above-mentioned conduction paths. In the multilayer capacitor in accordance with the eighth embodiment, conduction paths electrically connecting the first inner electrode 1141 to the first terminal electrodes 103A to 103E through the lead conductors 164A to 164E are formed. Therefore, currents flowing between the first terminal electrodes 103A to 103E and the first inner electrode 1141 are shunted into fractions flowing through the lead conductors 146A to 146E and fractions flowing through the above-mentioned conduction paths. Consequently, the equivalent series inductance can be lowered.

Also, in the multilayer capacitor in accordance with the eighth embodiment, conduction paths electrically connecting the second inner electrode 1122 to the second terminal electrodes 105A to 105E through the lead conductors 115A to 115E are formed. Therefore, currents flowing between the second inner electrode 1122 and the second terminal electrodes 105A to 105E are shunted into fractions flowing through the lead conductors 156A to 156E and fractions flowing through the above-mentioned conduction paths. In the multilayer capacitor in accordance with the eighth embodiment, conduction paths electrically connecting the second inner electrode 1142 to the second terminal electrodes 105A to 105E through the lead conductors 165A to 165E are formed. Therefore, currents flowing between the second inner electrode 1142 and the second terminal electrodes 105A to 105E are shunted into fractions flowing through the lead conductors 156A to 156E and fractions flowing through the above-mentioned conduction paths. Consequently, the equivalent series inductance can further be lowered.

Each conduction path formed in the outer layer portion 110 is electrically connected to the first inner electrode 1121 positioned closest to the outer layer portion 110 in the first inner electrodes or the second inner electrode 1122 positioned closest to the outer layer portion 110 in the second inner electrodes. Consequently, the line length of each conduction path formed in the outer layer portion 110 can be made relatively short. Each conduction path formed in the outer layer portion 160 is electrically connected to the first inner electrode 1141 positioned closest to the outer layer portion 160 in the first inner electrodes or the second inner electrode 1142 positioned closest to the outer layer portion 160 in the second inner electrodes. Consequently, the line length of each conduction path formed in the outer layer portion 160 can be made relatively short. As a result, the equivalent series inductance generated in each conduction path can be suppressed. The multilayer capacitor in accordance with the eighth embodiment is simple to form conduction paths and can attain a structure which is relatively easy to manufacture.

The conduction paths physically and electrically connect their corresponding first terminal conductor portions 1302A to 1302E, 1303A to 1303E of the first terminal electrodes 103A to 103E to the first inner electrodes 1121, 1141, or their corresponding second terminal conductor portions 1502A to 1502E, 1503A to 1503E of the second terminal electrodes 105A to 105E to the second inner electrodes 1122, 1142. Consequently, each conduction path becomes shorter. Therefore, the equivalent series inductance generated in the conduction paths can further be lowered. As in the sixth embodiment, the through hole conductors 116a to 116e, 117a to 117e, 118a to 118e, 119a to 119e, 1116a to 1116e, 1117a to 1117e, 1118a to 1118e, 1119a to 1119e, 166a to 166e, 167a to 167a, 168a to 168e, 169a to 169e, 1136a to 1136e, 1137a to 1137e, 1138a to 1138e, 1139a to 1139e are simple to form and can attain a structure which is relatively easy to manufacture.

The conduction paths include the lead conductors 114A to 114E, 115A to 115E, 164A to 164E, 165A to 165E. The lead conductors 114A to 114E, 115A to 115E, 164A to 164E, 165A to 165E electrically connect their corresponding first terminal electrodes 103A to 103E or second terminal electrodes 105A to 105E to their corresponding through hole conductors 116a to 116e, 117a to 117e, 118a to 118e, 119a to 119e, 1116a to 1116e, 1117a to 1117e, 1118a to 1118e, 1119a to 1119e, 1136a to 1136e, 1137a to 1137e, 1138a to 1138e, 1139a to 1139e, 166a to 166e, 167a to 167e, 168a to 168e, 169a to 169e. Consequently, the equivalent series inductance can further be lowered.

Though the fifth to eighth embodiments are explained in detail as preferred embodiments of the present invention in the foregoing, the present invention is not limited to the above-mentioned fifth to eighth embodiments and modified example. For example, it is not necessary for the second terminal conductor portions 1302A to 1302E, 1303A to 1303E, 1502A to 1502E, 1503A to 1503E of the terminal electrodes 103A to 103E, 105A to 105E to be electrically connected to the lead conductors 114A to 114E, 115A to 115E, 164A to 164E, 165A to 165E. Namely, it is not necessary for the dielectric layers 111, 163 of the outer layer portions 110, 160 to be formed with the through hole conductors 116a to 116e, 117a to 117e, 118a to 118e, 119a to 119e, 1116a to 1116e, 1117a to 1117e, 1118a to 1118e, 1119a to 1119e, 166a to 166e, 167a to 167a, 168a to 168e, 169a to 169e, 1136a to 1136e, 1137a to 1137e, 1138a to 1138e, 1139a to 1139e.

The outer layer portions 110, 160 may be formed with three or more of any of the lead conductors 114A to 114E, 115A to 115E, 164A to 164E, 165A to 165E, while these three or more lead conductors may be electrically connected by any of the through hole conductors 116a to 116e, 117a to 117e, 118a to 118e, 119a to 119e, 1116a to 1116e, 1117a to 1117e, 1118a to 1118e, 1119a to 1119e, 166a to 166e, 167a to 167a, 168a to 168e, 169a to 169e, 1136a to 1136e, 1137a to 1137e, 1138a to 1138e, 1139a to 1139e. Since a substantially plurality of conduction paths are formed, the equivalent series inductance can further be lowered in this case.

Forms of the lead conductors 114A to 114E, 115A to 115E, 164A to 164E, 165A to 165E are not limited to those of the lead conductors provided in the multilayer capacitors in accordance with the above-mentioned embodiments and modified example.

The lead conductors 114A to 114E, 115A to 115E, 164A to 164E, 165A to 165E laminated in the outer layer portions 110, 160 may have a circular form with a tab as shown in (a) in FIGS. 13 and 14, a quadrangular form with a tab as shown in (b) in FIGS. 13 and 14, or a trapezoidal form as shown in (c) in FIGS. 13 and 14.

Though two layers each of the lead conductors 114A to 114E, 11A to 115E, 164A to 164E, 165A to 165E are laminated in the outer layer portions 110, 160 in each of the multilayer capacitors in accordance with the above-mentioned embodiments and modified example, this is not restrictive, whereby one layer each or three or more layers each of them may be laminated.

The number of through hole conductors 116a to 116e, 117a to 117e, 118a to 118e, 119a to 119e, 1116a to 1116e, 1117a to 1117e, 1118a to 1118e, 1119a to 1119e, 166a to 166e, 167a to 167a, 168a to 168e, 169a to 169e, 1136a to 1136e, 1137a to 1137e, 1138a to 1138e, 1139a to 1139e penetrating through the dielectric layers 111 to 113, 1111, 1131, 161 to 163 included in the outer layer portions 110, 160 and second inner layer portions 1110, 1130 while being electrically connected to their corresponding lead conductors 114A to 114E, 115A to 115E, 164A to 164E, 165A to 165E may be either 1 or 2 or more.

The number of laminated dielectric layers 111 to 113, 1111, 1112, 131 to 140, 1131, 161 to 163 and the number of laminated first and second inner electrodes 141 to 145, 151 to 155, 1121, 1122, 1141, 1142 are not limited to those described in the above-mentioned embodiments and modified example. The number of outer layer portions 110, 160 is not required to be 2, but the outer layer portion 160 may be provided alone. The numbers of first terminal electrodes 103A to 103E and second terminal electrodes 105A to 105E are not limited to those described in the above-mentioned embodiments and modified example. The first terminal electrodes 103A to 103E and second terminal electrodes 105A to 105E are not limited to the forms described in the above-mentioned embodiments and modified example. For example, the first terminal electrodes 103A to 103E and second terminal electrodes 105A to 105E are not required to have second terminal conductor portions.

Conduction paths may be formed only in the outer layer portion (e.g., outer layer portion 160) on the side of the side face opposing the mounting surface of a substrate 180 or the like, for example, instead of both of the outer layer portions 110, 160. Conduction paths are not needed to be formed in all the terminal electrodes provided in the multilayer capacitor. For example, conduction paths may be formed for a first or second terminal electrode alone. In this case, conduction paths may be formed for all or a portion of first or second terminal electrodes. For efficiently lowering the equivalent series inductance, conduction paths are formed preferably for the same number of first and second terminal electrodes, more preferably for all the first and second terminal electrodes.

The multilayer capacitor in accordance with the present invention is not always mounted on a substrate. Conduction paths may be formed not only by lead conductors and through hole conductors, but also by other conductors and the like.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A multilayer capacitor comprising:
    a multilayer body including an inner layer portion having a plurality of dielectric layers and a plurality of inner electrodes alternately laminated therein, and an outer layer portion having a plurality of dielectric layers laminated therein; and
    a plurality of terminal electrodes formed on a side face parallel to a laminating direction of the multilayer body;
    wherein a conduction path electrically connecting a plurality of different positions in at least one of the plurality of terminal electrodes to each other is formed within the outer layer portion.

2. A multilayer capacitor according to claim 1, wherein the conduction path is formed within the outer layer portion by a plurality of lead conductors laminated by way of at least one dielectric layer, and a through hole conductor electrically connecting the plurality of lead conductors;
    wherein each of the plurality of lead conductors extends so as to be led to the side face of the multilayer body formed with the terminal electrode electrically connected to the conduction path, and is electrically connected to each of the plurality of different positions in the terminal electrode.

3. A multilayer capacitor according to claim 2, wherein a plurality of through hole conductors are provided.

4. A multilayer capacitor according to claim 1, wherein the terminal electrode is formed on the side face of the multilayer body parallel to the laminating direction so as to cover both of at least a portion of the side face parallel to the laminating direction and at least a portion of a side face of the multilayer body intersecting the laminating direction;
    wherein the conduction path is formed by at least one lead conductor laminated between the dielectric layers within the outer layer portion and a through hole conductor electrically connected to the lead conductor;
    wherein the lead conductor extends so as to be led to the side face of the multilayer body formed with the terminal electrode electrically connected to the conduction path and is electrically connected to at least one of the plurality of different positions in the terminal electrode;
    wherein the through hole conductor is electrically connected to at least one of the plurality of different positions in the terminal electrode electrically connected to the conduction path;
    wherein the position of the terminal electrode electrically connected to the lead conductor is located at a portion of the terminal electrode covering at least a portion of the side face of the multilayer body parallel to the laminating direction; and
    wherein the position of the terminal electrode electrically connected to the through hole conductor is located at a portion of the terminal electrode covering at least a portion of the side face of the multilayer body intersecting the laminating direction.

5. A multilayer capacitor according to claim 4, wherein at least two lead conductors are provided and are laminated by way of at least one dielectric layer within the outer layer portion; and
    wherein the at least two lead conductors are electrically connected by the through hole conductor.

6. A multilayer capacitor according to claim 4, wherein a plurality of through hole conductors are provided.

7. A multilayer capacitor according to claim 1, wherein the outer layer portion formed with the conduction path is positioned closer to a side face of the multilayer body opposing a mounting surface than is the inner layer portion.

8. A multilayer capacitor comprising:
    a multilayer body including an inner layer portion having a plurality of dielectric layers and a plurality of inner electrodes alternately laminated therein, and an outer layer portion having a plurality of dielectric layers laminated therein; and
    a plurality of terminal electrodes formed on a side face of the multilayer body;
    wherein the plurality of inner electrodes include a plurality of first inner electrodes and a plurality of second inner electrodes alternately arranged with each other;
    wherein the plurality of terminal electrodes include a plurality of first terminal electrodes and a plurality of second terminal electrodes;
    wherein the plurality of first and second terminal electrodes are electrically insulated from each other;
    wherein each of the first inner electrodes is electrically connected to one of the plurality of first terminal electrodes through a lead conductor, while each of the plurality of first terminal electrodes is electrically connected to at least one of the plurality of first inner electrodes through the lead conductor;
    wherein each of the second inner electrodes is electrically connected to one of the plurality of second terminal electrodes through a lead conductor, while each of the plurality of second terminal electrodes is electrically connected to at least one of the plurality of second inner electrodes through the lead conductor; and
    wherein a conduction path electrically connecting a plurality of different positions in at least one of the plurality of terminal electrodes to each other is formed within the outer layer portion.

9. A multilayer capacitor comprising a multilayer body including an inner layer portion having a plurality of dielectric layers and a plurality of inner electrodes alternately laminated therein, and an outer layer portion having a plurality of dielectric layers laminated therein; and
    a plurality of terminal electrodes formed on a side face of the multilayer body;
    wherein a conduction path electrically connecting a plurality of different positions in at least one of the plurality of terminal electrodes to each other is formed within the outer layer portion.

* * * * *